US008715855B2

(12) United States Patent
Kawakami et al.

(10) Patent No.: US 8,715,855 B2
(45) Date of Patent: May 6, 2014

(54) METHOD OF PRODUCING LITHIUM ION-STORING/RELEASING MATERIAL, LITHIUM ION-STORING/RELEASING MATERIAL, AND ELECTRODE STRUCTURE AND ENERGY STORAGE DEVICE USING THE MATERIAL

(75) Inventors: Soichiro Kawakami, Machida (JP); Norishige Kakegawa, Chofu (JP); Akio Kashiwazaki, Yokohama (JP); Toshiaki Aiba, Fujisawa (JP); Rie Ueno, Hadano (JP); Mikio Shimada, Kawasaki (JP); Kaoru Ojima, Kawasaki (JP); Takashi Noma, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 13/601,272

(22) Filed: Aug. 31, 2012

(65) Prior Publication Data

US 2012/0321949 A1    Dec. 20, 2012

Related U.S. Application Data

(60) Division of application No. 12/394,736, filed on Feb. 27, 2009, now abandoned, which is a continuation of application No. PCT/JP2008/066506, filed on Sep. 8, 2008.

(30) Foreign Application Priority Data

Sep. 6, 2007  (JP) ................................ 2007-232090
Dec. 12, 2007  (JP) ................................ 2007-321373

(51) Int. Cl.
*H01M 4/131*    (2010.01)
(52) U.S. Cl.
USPC ...................................................... 429/218.1

(58) Field of Classification Search
None
See application file for complete search history.

(56) References Cited

U.S. PATENT DOCUMENTS

| 4,615,960 A | 10/1986 | Yata |
| 5,491,037 A | 2/1996 | Kawakami |

(Continued)

FOREIGN PATENT DOCUMENTS

| JP | 60-170163 A | 9/1985 |
| JP | 2-181365 A | 7/1990 |

(Continued)

OTHER PUBLICATIONS

PCT International Search Report and Written Opinion of the International Searching Authority in International Application No. PCT/JP2008/066506, Mailing Date Nov. 18, 2008.

(Continued)

*Primary Examiner* — Patrick Ryan
*Assistant Examiner* — Wyatt McConnell
(74) *Attorney, Agent, or Firm* — Fitzpatrick, Cella, Harper and Scinto

(57) ABSTRACT

A method of producing a material capable of electrochemically storing and releasing a large amount of lithium ions is provided. The material is used as an electrode material for a negative electrode, and includes silicon or tin primary particles composed of crystal particles each having a specific diameter and an amorphous surface layer formed of at least a metal oxide, having a specific thickness. Gibbs free energy when the metal oxide is produced by oxidation of a metal is smaller than Gibbs free energy when silicon or tin is oxidized, and the metal oxide has higher thermodynamic stability than silicon oxide or tin oxide. The method of producing the electrode material includes reacting silicon or tin with a metal oxide, reacting a silicon oxide or a tin oxide with a metal, or reacting a silicon compound or a tin compound with a metal compound to react with each other.

3 Claims, 24 Drawing Sheets

(56) References Cited

U.S. PATENT DOCUMENTS

| | | |
|---|---|---|
| 5,641,591 A | 6/1997 | Kawakami et al. |
| 5,658,689 A | 8/1997 | Kawakami et al. |
| 5,698,339 A | 12/1997 | Kawakami et al. |
| 5,702,845 A | 12/1997 | Kawakami et al. |
| 5,728,482 A | 3/1998 | Kawakami et al. |
| 5,795,679 A | 8/1998 | Kawakami et al. |
| 5,800,939 A | 9/1998 | Mishina et al. |
| 5,824,434 A | 10/1998 | Kawakami et al. |
| 5,882,811 A | 3/1999 | Kawakami |
| 5,888,666 A | 3/1999 | Kawakami |
| 5,919,589 A | 7/1999 | Kawakami et al. |
| 5,998,063 A | 12/1999 | Kobayashi et al. |
| 6,051,340 A | 4/2000 | Kawakami et al. |
| 6,063,142 A | 5/2000 | Kawakami et al. |
| 6,165,642 A | 12/2000 | Kawakami et al. |
| 6,235,427 B1 | 5/2001 | Idota et al. |
| 6,252,762 B1 | 6/2001 | Amatucci |
| 6,301,093 B1 | 10/2001 | Noguchi et al. |
| 6,329,096 B2 | 12/2001 | Kawakami et al. |
| 6,372,387 B1 | 4/2002 | Kawakami et al. |
| 6,377,030 B1 | 4/2002 | Asao et al. |
| 6,432,585 B1 | 8/2002 | Kawakami et al. |
| 6,475,664 B1 | 11/2002 | Kawakami et al. |
| 6,517,974 B1 | 2/2003 | Kobayashi et al. |
| 6,558,847 B1 | 5/2003 | Kawakami et al. |
| 6,558,848 B1 | 5/2003 | Kobayashi et al. |
| 6,569,568 B2 | 5/2003 | Kobayashi et al. |
| 6,596,432 B2 | 7/2003 | Kawakami et al. |
| 6,638,322 B1 | 10/2003 | Kawakami et al. |
| 6,649,304 B2 | 11/2003 | Tani et al. |
| 6,721,168 B2 | 4/2004 | Takeuchi et al. |
| 6,730,434 B1 | 5/2004 | Kawakami et al. |
| 6,835,332 B2 | 12/2004 | Yamamoto et al. |
| 6,902,845 B2 | 6/2005 | Tani et al. |
| 6,924,059 B1 | 8/2005 | Kawakami et al. |
| 6,932,955 B2 | 8/2005 | Yamamoto et al. |
| 6,949,312 B1 | 9/2005 | Kawakami et al. |
| 7,060,117 B2 | 6/2006 | Ogura et al. |
| 7,141,187 B2 | 11/2006 | Kosuzu et al. |
| 7,183,018 B2 | 2/2007 | Kawakami et al. |
| 7,190,171 B2 | 3/2007 | Kawakami et al. |
| 7,316,792 B2 | 1/2008 | Kosuzu et al. |
| 7,378,189 B2 | 5/2008 | Hagiwara et al. |
| 7,388,383 B2 | 6/2008 | Kawakami et al. |
| 7,458,996 B2 | 12/2008 | Ogura et al. |
| 7,491,378 B2 | 2/2009 | Yamamoto et al. |
| 7,510,805 B2 | 3/2009 | Inoue et al. |
| 7,534,528 B2 | 5/2009 | Kawakami et al. |
| 7,575,830 B2 | 8/2009 | Kawamura et al. |
| 2003/0211396 A1 | 11/2003 | Kobayashi et al. |
| 2004/0126659 A1* | 7/2004 | Graetz et al. ............... 429/218.1 |
| 2004/0241548 A1 | 12/2004 | Nakamoto et al. |
| 2006/0040182 A1 | 2/2006 | Kawakami et al. |
| 2006/0127773 A1 | 6/2006 | Kawakami et al. |
| 2006/0147797 A1* | 7/2006 | Wu et al. ..................... 429/218.1 |
| 2006/0154071 A1 | 7/2006 | Homma et al. |
| 2007/0023289 A1 | 2/2007 | Miyata et al. |
| 2007/0077483 A1 | 4/2007 | Kubo et al. |
| 2007/0087268 A1 | 4/2007 | Kim et al. |
| 2007/0122701 A1 | 5/2007 | Yamaguchi |
| 2007/0275302 A1* | 11/2007 | Sotowa et al. ................ 429/217 |
| 2008/0003503 A1 | 1/2008 | Kawakami et al. |
| 2008/0090152 A1 | 4/2008 | Kosuzu et al. |
| 2008/0131782 A1 | 6/2008 | Hagiwara et al. |
| 2009/0061322 A1 | 3/2009 | Kawakami et al. |
| 2009/0075175 A1 | 3/2009 | Inoue et al. |
| 2009/0157399 A1 | 6/2009 | Cho et al. |
| 2009/0272970 A1 | 11/2009 | Aiba et al. |

FOREIGN PATENT DOCUMENTS

| | | |
|---|---|---|
| JP | 4-34870 A | 2/1992 |
| JP | 8-107048 A | 4/1996 |
| JP | 11-283627 A | 10/1999 |
| JP | 2000-36323 A | 2/2000 |
| JP | 2000-268881 A | 9/2000 |
| JP | 2000-311681 A | 11/2000 |
| JP | 2000-340470 A | 12/2000 |
| JP | 2001-48699 A | 2/2001 |
| JP | 2002-25867 A | 1/2002 |
| JP | 2003-109873 A | 4/2003 |
| JP | 2003-168426 A | 6/2003 |
| JP | 2003-224037 A | 8/2003 |
| JP | 2003-246700 A | 9/2003 |
| JP | 2004-79321 A | 3/2004 |
| JP | 2004-103669 A | 4/2004 |
| JP | 2004-178828 A | 6/2004 |
| JP | 2004-296750 A | 10/2004 |
| JP | 2004-319469 A | 11/2004 |
| JP | 2004-335334 A | 11/2004 |
| JP | 2004-335335 A | 11/2004 |
| JP | 2005-86113 A | 3/2005 |
| JP | 2005-108595 A | 4/2005 |
| JP | 2005-112701 A | 4/2005 |
| JP | 2006-117475 A | 5/2006 |
| JP | 2006-190642 A | 7/2006 |
| JP | 2007-42393 A | 2/2007 |
| JP | 2007-59213 A | 3/2007 |
| JP | 2007-115687 A | 5/2007 |
| JP | 2008-16446 A | 1/2008 |
| WO | 00/17949 A1 | 3/2000 |

OTHER PUBLICATIONS

Amatucci, et al., "An Asymmetric Hybrid Nonaqueous Energy Storage Cell", Journal of the Electrochemical Society, vol. 148, No. 8, 2001, pp. A930-A939.

Morita, et al., "Nano Si Cluster-SiOx-C Composite Material as High-Capacity Anode Material for Rechargeable Lithium Batteries", Journal of the Electrochemical Society, vol. 153, No. 2, 2006, pp. A425-A430.

Kim, et al., "Enchanced cycle performance of SiO-C composite anode for lithium-ion batteries", Journal of Power Sources, vol. 170, 2007, pp. 456-459.

Chan, et al., "High-performance lithium battery anodes using silicon nanowires", Nature Nanotechnology, vol. 3, Jan. 2008, pp. 31-35.

Zhang, et al, "Silicon nanowires prepared by laser ablation at high temperature", Applied Physics Letters, vol. 72, No. 15, Apr. 13, 1998, pp. 1835-1837.

Wagner, et al., "Vapor-Liquid-Solid Mechanism of Single Crystal Growth", Applied Physics Letters, vol. 4, No. 5, Mar. 1, 1964, pp. 89-90.

European Search Report dated May 8, 2012 in European Application No. 08828936.8.

Chinese Office Action dated May 23, 2012 in Chinese Application No. 200880115010.2.

Lee, et al, "Carbon-coated nano-Si dispersed oxides/graphite composites as anode material for lithium ion batteries", Electrochemistry Communications, vol. 6, 2004, pp. 465-469.

* cited by examiner

Si-5%Al₂O₃

BEAD MILL TREATMENT Si+Al → MECHANICAL ALLOYING TREATMENT → 900°C

BEAD MILL-PULVERIZED Si

METHOD OF PRODUCING LITHIUM ION-STORING/RELEASING MATERIAL, LITHIUM ION-STORING/RELEASING MATERIAL, AND ELECTRODE STRUCTURE AND ENERGY STORAGE DEVICE USING THE MATERIAL

CROSS-REFERENCE TO RELATED APPLICATIONS

This application is a divisional of application Ser. No. 12/394,736, filed Feb. 27, 2009, which is a continuation of International Application No. PCT/JP2008/066506, filed Sep. 8, 2008, which claims the benefit of Japanese Patent Applications No. 2007-232090, filed Sep. 6, 2007, and No. 2007-321373, filed Dec. 12, 2007.

BACKGROUND OF THE INVENTION

1. Field of the Invention

The present invention relates to a method of producing a lithium ion-storing/releasing material mainly composed of a metal which alloys with lithium by an electrochemical reaction such as silicon or tin and a metal oxide, an electrode structure formed of the material, and an energy storage device having the electrode structure.

2. Description of the Related Arts

It has been pointed out that global warming may occur owing to a greenhouse effect because the amount of $CO_2$ gas in the air has been recently increasing. In addition, air pollution due to, for example, $CO_2$, $NO_x$, and a hydrocarbon exhausted from automobiles is of serious concern. Also in view of a run-up in crude oil prices, expectations have been placed from the viewpoint of environmental protection on hybrid vehicles and electric vehicles in each of which an electric motor to be actuated with electricity stored in an energy storage device and an engine are combined. Accordingly, the development of an energy storage device such as a capacitor or a secondary battery which has both high power density and high energy density has been desired in order that the performance of a hybrid vehicle or electric vehicle may be improved and a cost for the production of the hybrid vehicle or electric vehicle may be reduced.

Further, the functions of portable instruments such as a portable phone, a book type personal computer, a video camera, a digital camera, and a personal digital assistant (PDA) have become more and more sophisticated. The development of an energy storage device such as a secondary battery which not only has a small size, a light weight and a large capacity, but also can be charged quickly, has been desired in order that the device may be able to find use in applications including power sources for actuating the instruments.

Representative examples of the above energy storage device include the so-called "lithium ion batteries". Each of the batteries is of a rocking chair type in which lithium ions are released by a charging reaction from between the layers of a lithium intercalation compound and lithium ions are inserted in between the layers of a carbon material typified by graphite used as a negative electrode, having a laminated structure including six-membered network planes. The batteries have been in widespread use as power sources for a large number of portable instruments because of their high cell voltages and their high energy densities. In addition, investigation has been conducted on whether each of the batteries can be used as a power source for a hybrid vehicle.

However, each of the "lithium ion batteries" can theoretically intercalate only a maximum of one lithium atom per six carbon atoms because its negative electrode is formed of the carbon material. Accordingly, it is difficult to additionally increase the capacity of each of the batteries, and a new electrode material for an increase in capacity has been desired. Although the above "lithium ion batteries" have been expected to serve as power sources for hybrid vehicles and electric vehicles because of their high energy densities, each of the batteries involves the following problem: each of the batteries has so large an internal resistance as to be incapable of discharging a sufficient electrical quantity, that is, each of the batteries has so small a power density as to be unqualified for quick discharging. In view of the foregoing, the development of an energy storage device having a high power density and a high energy density has been demanded.

The inventors of the present invention have proposed Patent Document 1, Patent Document 2, Patent Document 3, Patent Document 4, Patent Document 5, Patent Document 6, Patent Document 7, and Patent Document 8 each concerning a negative electrode for a lithium secondary battery formed of a silicon or tin element for additional increases in capacities of lithium secondary batteries including the "lithium ion batteries".

Patent Document 1 proposes a lithium secondary battery using a negative electrode obtained by forming, on a current collector made of a metal material which does not alloy with lithium, an electrode layer formed of a metal which alloys with lithium such as silicon or tin and a metal which does not alloy with lithium such as nickel or copper.

Patent Document 2 proposes a negative electrode formed of an alloy powder made of an element such as nickel or copper and an element such as tin. Patent Document 3 proposes a lithium secondary battery using a negative electrode in which an electrode material layer contains 35 wt % or more of particles having an average particle diameter of 0.5 to 60 μm, formed of silicon or tin, and has a porosity of 0.10 to 0.86 and a density of 1.00 to 6.56 g/cm³.

Patent Document 4 proposes a lithium secondary battery using a negative electrode having silicon or tin having an amorphous phase. Patent Document 5 and Patent Document 6 each propose an active material lithium secondary battery having an amorphous phase obtained by turning a material mainly formed of a metal and inert to a material except Li into a composite with a positive electrode active material or negative electrode active material. Patent Document 7 proposes a lithium secondary battery using a negative electrode formed of amorphous tin-transition metal alloy particles having non-stoichiometric composition. Patent Document 8 proposes a lithium secondary battery using a negative electrode formed of amorphous silicon-transition metal alloy particles having non-stoichiometric composition.

A lithium secondary battery using the above amorphous alloy in its negative electrode can not only realize a large capacity but also reduce the expansion of the volume of the alloy at the time of charging. Although an approach referred to as mechanical alloying involving applying mechanical energy is an effective production method involving reducing the size of the crystallite of the above alloy to improve the amorphous property of the alloy, it cannot uniformize the composition of the alloy in a microscopic range, and cannot avoid the production of silicon oxide or tin oxide because of the following reason: a material for the alloy is turned into a fine powder to have an increased surface area, so there is no choice but to remove the material by slow oxidation. In the above alloy, lithium reacts with silicon oxide or tin oxide at the time of charging to change into an inert lithium compound such as lithium oxide which cannot release lithium reversibly, and the inert lithium compound is responsible for a reduction in charge and discharge efficiency of the battery. Further, alloy particles coated with the above inert lithium compound produced by a charging reaction each have increased electrical resistance because the compound is an insulator. In addition, when each of the alloy particles is coated with the compound non-uniformly, the intensity of an electric field applied to the particles at the time of charging become non-uniform, so alloying with lithium also becomes non-uniform, and local expansion of the volume of the alloy occurs. Moreover, it cannot be said that a reaction for alloying with lithium by storage of lithium in the silicon alloy or tin alloy lattice occurs uniformly because the alloy produced by mechanical alloying originally has non-uniform alloy composition. Accordingly, the volume expansion is still present, and an increase in internal resistance of the battery caused by the repetition of charging and discharging cannot be completely suppressed. In addition, it can never be said that the rate at which lithium is turned into an alloy at the time of charging is high, so, in quick charging, at least one of the decomposition of an electrolyte solution and the precipitation of metal lithium onto the surface of the negative electrode may occur with a certain possibility depending on the design of the structure of the battery. In view of the foregoing, the development of an energy storage device has been desired which maintains a large capacity, has a high power density, and can be charged quickly.

An electric double layer capacitor which: uses active carbon having a large specific surface area in each of its negative electrode and positive electrode; and stores electricity in its electric double layer has been expected to find use in applications including power sources for hybrid vehicles because the capacitor can be charged quickly, and has a large capacity. The electric double layer capacitor has the following major advantages: the capacitor has a long lifetime, specifically, the number of repeated uses of the capacitor is about 10 to 100 times as many as that of the "lithium ion battery", and the capacitor has a power density about five times as high as that of the battery. However, the above electric double layer capacitor has not yet been adopted as a power source for a movable body owing to the following disadvantages: the capacitor has low energy densities, specifically, the capacitor has a weight energy density about one tenth to one half as high as that of each of the "lithium ion battery", and has a volume energy density about one fiftieth to one twentieth as high as that of the battery. In view of the foregoing, the development of an energy storage device having increased energy densities while taking advantage of good characteristics of the above electric double layer capacitor, in other words, maintaining the following advantages has been desired: the device can be charged quickly, can be repeatedly used a large number of times, and has a high power density. A proposal concerning the use of a carbon material capable of storing and releasing lithium ions and anions at the time of charging and discharging in an electrode, and a proposal concerning a hybrid type capacitor using a metal oxide material capable of storing and releasing lithium ions at the time of charging and discharging in an electrode have been made in order that the shortcomings of the above-mentioned electric double layer capacitor may be alleviated. For example, Patent Documents 9 to 21 and Non-patent Document 1 have been proposed.

Patent Document 9 proposes a battery (an energy storage device) using a polyacene-based material capable of being doped with an ion electrochemically in at least one of its negative electrode and positive electrode. Patent Document 10 proposes a capacitor using a polyacene-based aterial in each of its positive and negative electrodes and using a quaternary ammonium salt as an electrolyte. Patent Document 11 proposes a battery (an energy storage device) using a polyacene-based material carrying lithium in advance in its negative electrode.

Patent Document 12 proposes a capacitor using a carbon material which has been caused to absorb lithium in its negative electrode and active carbon in its positive electrode. Patent Document 13 proposes a capacitor using an electrode made of a carbon material containing a metal or metal compound and having micropores in each of its positive and negative electrodes. Patent Document 14 proposes an electric double layer capacitor using, in each of its negative and positive electrodes, an electrode formed of non-porous carbon having graphite-like microcrystalline carbon in which electrolyte ions are intercalated between layers together with a solvent.

Patent Document 15 proposes an energy storage device in which a composite porous material obtained by adhering a carbon material to the surface of active carbon is used in its negative electrode and active carbon is used in its positive electrode. Patent Document 16 proposes an electric double layer capacitor formed of an electrode member obtained by electrochemically activating a carbon member and having pores larger than electrolyte ions.

A proposal in which a metal oxide is used as an electrode material has also been made. Patent Document 17 proposes an electrochemical capacitor using an electrode formed of a lithium vanadium oxide and a conductive agent as its negative electrode and an electrode formed of active carbon as its positive electrode. Patent Document proposes an electric double layer capacitor using a porous conductive ceramic having a mesoporous structure in an electrode. Patent Document 19 proposes an electric double layer capacitor using an electrode obtained by coating the surface of a porous material with a conductive ceramic.

Patent Document 20 proposes a capacitor using a carbon fine powder coated with a metal oxide, metal nitride, or metal carbide as an electrode material. Patent Document 21 proposes a lithium non-aqueous electrolyte energy storage device which: uses a composite porous material obtained by adhering a carbonaceous material to the surface of active carbon in its negative electrode and an amorphous metal oxide containing at least one of Mn and V in its positive electrode; and contains a lithium salt as an electrolyte. Patent Document 22 proposes an electrode for an electrochemical element containing an octatitanate nanosheet represented by $H_2Ti_8O_{17}.nH_2O$ (n=0 to 2.0) and a carbon material. Patent Document 23 proposes a rechargeable energy battery system using a material which reversibly intercalates a cation of, for electrochemical insertion/ example, an alkali metal such as $Li_4Ti_5O_{12}$ in its negative electrode and a material which reversibly adsorbs an anion in its positive electrode. In addition, Non-patent Document 1 reports a nonaqueous battery cell produced from a negative electrode formed of $Li_4Ti_5O_{12}$ and a positive electrode formed of active carbon.

However, each of the above proposed energy storage devices such as a capacitor has an energy density not more than one tenth as high as that of the lithium secondary battery (including the lithium ion battery), so an additional increase in energy density of the device has been desired.

In addition, Patent Document 24, Patent Document 25, Non-patent Document 2, and Non-patent Document 3 each propose a secondary battery using carbon composite particles in which SiO is heated to cause a disproportionation reaction and Si crystals nanometers in size are dispersed in $SiO_2$ as a negative electrode material and having good charging and discharging cycle properties. However, the above electrode using silicon dispersed in a silicon oxide involves the following problem: the amount of Li that cannot be desorbed in an extraction reaction for Li (irreversible amount) is large.

Patent Document 26 proposes that a silicon compound such as silicon from which a metal has been removed, or a material obtained by adhering a ceramic to the silicon compound be used as a negative electrode material. Si—$SiO_2$ is obtained by mixing and heating silicon and colloidal silica, and Si—$Al_2O_3$ is obtained by mixing and heating silicon and alumina sol.

Patent Document 27 proposes, as a negative electrode material for a nonaqueous electrolyte solution secondary battery, a material formed of composite particles obtained by coating the whole surfaces, or part of the surfaces, of inorganic particles (Si, Sn, or Zn) capable of absorbing and desorbing lithium ions with a ceramic (oxide, nitride, or carbide of a material selected from Si, Ti, Al, and Zr). The above composite particles have an average particle diameter of 1 μm to 50 μm, and are prepared by: adding and mixing the inorganic particles into sol as a source of the ceramic; drying the mixture; and subjecting the dried product to heat treatment.

Each of Patent Document 26 and Patent Document 27 described above involves the following problem: the oxidation of silicon is promoted in the step of adhering the ceramic to the surfaces, so the content of silicon oxide to be produced increases, and the amount of Li that reacts with silicon oxide so as to be incapable of being desorbed in an initial electrochemical insertion/extraction reaction for Li (irreversible amount) is large.

Non-patent Document 4 announces the following: when a repetitive experiment on electrochemical insertion/extraction of Li is performed by using an electrode, which is obtained by forming a silicon nanowire on a stainless substrate with gold Au as a catalyst, as a working electrode and metal lithium as a counter electrode, coulomb efficiency for the first insertion is 73%, efficiency for each of the second and subsequent insertions is 90%, and a reduction in amount of Li to be inserted/desorbed during a period from the second insertion to the tenth insertion is small. The coulombic efficiency of the extraction of Li for the first insertion of Li is low probably because silicon oxide is formed at the time of forming the silicon nanowire.

Patent Document 28 proposes a nonaqueous electrolyte secondary battery using fibrous silicon the surface of which is coated with a carbon material as a negative electrode material. However, the document discloses neither a method of obtaining fibrous silicon nor a method of preparing fibrous silicon. Moreover, the document does not disclose any specific method of coating the surface with the carbon material.

Patent Document 29 proposes a negative electrode active material formed of: metal core particles each having a carbon-based coating layer on its surface and each containing a metal capable of forming an alloy with lithium (Si, Sn, Al, Ge, Pb, Bi, Sb, and alloys of them); and metal nanowires formed integrally to the metal core particles. The document discloses that the active material is obtained by the following procedure: a metal particle powder, a polymer material, and a pore-forming substance are mixed and baked so that the polymer material carbonizes to provide the carbon-based coating layer, and the metal nanowires grow from metal particles each contacting the carbon-based coating layer, whereby the active material is obtained. However, the document does not disclose any analysis for the shape and material of each of the metal nanowires. In addition, the document does not disclose any large-capacity negative electrode material having a charged and discharged capacity in excess of 900 mAh/g.

On the other hand, a method of producing a whisker-, wire-, or needle-like nanosilicon is proposed as described below.

Patent Document 30 proposes a production method in which a metal serving as a catalyst (Au, Cu, Pt, Pd, Ni, Gd, or Mg) is heated to melt under reduced pressure in an atmosphere containing an oxygen element as an oxidation source for silicon, and a silicon gas molecule is brought into contact with the molten metal so that a whisker-like chain is formed in which silicon crystal nanospheres each coated with an $SiO_2$ oxide film are arrayed by the network of the $SiO_2$ oxide film.

Non-patent Document 5 announces that the whisker of crystalline silicon is formed by: mounting a gold small particle on a silicon wafer; heating the resultant to 950° C.; and introducing a mixed gas of hydrogen and silane tetrachloride into the heated product.

Non-patent Document 6 announces that an Si Powder mixed with 0.5% of Fe is irradiated with excimer laser light in a quartz tube in an Ar gas flow at 500 Torr and 50 sccm so that nanowires each using crystalline silicon in its core and amorphous silicon oxide in its surface layer, and each having a diameter of 3 to 43 nm and a length of 2 to 3 μm are formed on the inner wall of the quartz tube.

Patent Document 31 proposes a method of growing a silicon nanoneedle involving: providing a thin film of a metal (gold, silver, or copper) that forms an alloy droplet with silicon on a silicon substrate; and heating the resultant to 1,200° C. or higher in the presence of sulfur in a vacuum inclusion closed vessel to produce silicon in a vapor phase.

Patent Document 32 proposes a production method involving evaporating silicon or a silicon/germanium alloy at a temperature equal to or lower than the melting point of silicon or the alloy, specifically a temperature in excess of 1,300° C. and 1,400° C. or lower in a stream of a carrier gas (an argon gas, a hydrogen gas, or a mixed gas of them) to grow nanowires of silicon or the silicon/germanium alloy in the temperature range of 900° C. or higher and 1,300° C. or lower. The document discloses that the produced nanowires each have a diameter of 50 nm to 100 nm and a length of several millimeters.

Patent Document 33 proposes a production method involving: evaporating sintered body of a silicon powder in a stream of an inert gas; and forming a silicon nanowire on a substrate placed at a position where a temperature gradient of 10° C/cm or more is formed in the range of 1,200° C. to 900° C. on a downstream side of the stream of the inert gas.

Patent Document 34 proposes a method of producing silicon nanowires by the heat decomposition of a polysilane gas (such as a disilane gas) with a metal that forms a low-melting eutectic alloy with silicon (gold, silver, iron, or nickel) as a catalyst under reduced pressure. The formation of silicon nanowires each having a diameter of about 50 nm and each having a length of up to 4 μm has been initiated.

However, any method of producing such nanoscale silicon as described above involves problems in that a large amount of the nanoscale silicon cannot be produced at a low cost, and the content of silicon oxide inevitably increases.

Therefore, it has been desired to develop a negative electrode material capable of providing an energy storage device having high energy density close to the energy density of a lithium secondary battery, showing high initial charge and discharge efficiency, and capable of being repeatedly used a large number of times; an electrode using the negative electrode material; and an energy storage device adopting the electrode has been desired. It has been desired to develop also a method by which a large amount of the negative electrode material can be produced at a low cost.

Patent Document 1: U.S. Pat. No. 6051340
Patent Document 2: U.S. Pat. No. 5795679
Patent Document 3: U.S. Pat. No. 6432585
Patent Document 4: Japanese Patent Application Laid-Open No. H11-283627
Patent Document 5: U.S. Pat. No. 6517974
Patent Document 6: U.S. Pat. No. 6569568
Patent Document 7: Japanese Patent Application Laid-Open No. 2000-311681
Patent Document 8: International Publication WO2000/17949
Patent Document 9: Japanese Patent Application Laid-Open No. 560-170163
Patent Document 10: Japanese Patent Application Laid-Open No. H02-181365
Patent Document 11: Japanese Patent Application Laid-Open No. H04-034870
Patent Document 12: Japanese Patent Application Laid-Open No. H08-107048
Patent Document 13: Japanese Patent Application Laid-Open No. 2000-340470
Patent Document 14: Japanese Patent Application Laid-Open No. 2002-25867
Patent Document 15: Japanese Patent Application Laid-Open No. 2004-079321
Patent Document 16: Japanese Patent Application Laid-Open No. 2005-086113
Patent Document 17: Japanese Patent Application Laid-Open No. 2000-268881
Patent Document 18: Japanese Patent Application Laid-Open No. 2003-109873
Patent Document 19: Japanese Patent Application Laid-Open No. 2003-224037
Patent Document 20: Japanese Patent Application Laid-Open No. 2004-103669
Patent Document 21: Japanese Patent Application Laid-Open No. 2004-178828
Patent Document 22: Japanese Patent Application Laid-Open No. 2005-108595
Patent Document 23: U.S. Pat. No. 6252762
Patent Document 24: Japanese Patent Application Laid-Open No. 2007-42393
Patent Document 25: Japanese Patent Application Laid-Open No. 2007-59213
Patent Document 26: Japanese Patent Application Laid-Open No. 2000-36323
Patent Document 27: Japanese Patent Application Laid-Open No. 2004-335334
Patent Document 28: Japanese Patent Application Laid-Open No. 2003-168426
Patent Document 29: Japanese Patent Application Laid-Open No. 2007-115687
Patent Document 30: Japanese Patent Application Laid-Open No. 2001-48699
Patent Document 31: Japanese Patent Application Laid-Open No. 2003-246700
Patent Document 32: Japanese Patent Application Laid-Open No. 2004-296750
Patent Document 33: Japanese Patent Application Laid-Open No. 2005-112701
Patent Document 34: Japanese Patent Application Laid-Open No. 2006-117475
Non-Patent Document 1: Journal of the Electrochemical Society, 148 A930-A939 (2001)
Non-Patent Document 2: Journal of the Electrochemical Society, 153 A425-A430 (2006)
Non-Patent Document 3: Journal of Power Sources, 170 456-459 (2007)
Non-Patent Document 4: Nature Nanotechnology 3, 31-35 (2008)
Non-Patent Document 5: Applied Physics Letters 4, 89-90 (1998)
Non-Patent Document 6: Applied Physics Letters 72, 1835-1837 (1998)

SUMMARY OF THE INVENTION

In view of the foregoing, an object of the present invention is to provide a method of producing a material, in particular, a silicon material or tin material capable of electrochemically storing and releasing a large amount of lithium ions and having a high ratio of the amount of lithium ions to be released to the initial amount of lithium ions to be stored.

Another object of the present invention is to provide a material prepared by the above production method and capable of electrochemically storing or releasing a large amount of lithium ions, an electrode structure formed of the material, and an energy storage device provided with the electrode structure and having such a characteristic that a reduction in capacity is small even when charging and discharging are repeatedly performed, in conjunction with high power density and a high energy density.

It should be noted that the term "energy storage device" refers to a capacitor, a secondary battery, a device obtained by combining a capacitor and a secondary battery, and a device obtained by imparting a power-generating function to any one of them.

Si and Sn capable of electrochemically absorbing and releasing a large amount of Li has conventionally involved such problems that they show a large volume expansion at the time of the absorption of Li, and are turned into a fine powder by volume expansion or shrinkage due to the absorption or release of Li to increase the resistance of an electrode, and a reduction in performance of a cell occurs owing to the repetition of charging and discharging. The following attempts have been made to solve the above problems: the particles of Si or Sn are reduced in size in advance, or are made amorphous so that crystallites are additionally reduced in size. The problem referred to as the reduction in performance of the cell due to the repetition of charging and discharging has been alleviated by those approaches, but the extent to which the problem is alleviated is still insufficient. The reason for the insufficient extent is that a ratio of the amount of Li to be released to the amount of Li to be inserted for the first charging and discharging is low. The low ratio is due to the following fact: Si or Sn has an increased specific surface area and is oxidized at the stage of reducing the size of the particles of Si or Sn, so the amount of the oxide of Si or Sn to be produced increases. For example, in the case of Si, the production of $SiO_2$ leads to the occurrence of an irreversible reaction for the production of lithium oxide by an electrochemical insertion reaction for Li.

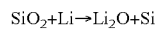

$SiO_2 + Li \rightarrow Li_2O + Si$

As a result of various experiments, the inventors of the present invention have found the following: the oxide of Si or Sn in particles formed of Si, Sn, or an alloy of any one of such elements is allowed to react with a metal so that a metal oxide stabler than the oxide of Si or Sn is produced, and the particles formed of Si, Sn, or an alloy of any one of such elements are coated with the metal oxide stabler than the oxide of Si or Sn, whereby the content of the oxide of Si or Sn can be reduced, and hence the oxidation of the particles formed of Si, Sn, or an alloy of any one of such elements can be suppressed, and the coulombic efficiency of a cell for the first charging and discharging can be improved. In addition, the inventors have found that an electrode produced by using an active material having a network structure made up from Si particles with fibrous (filamentous) substances each having a diameter of a nanometer to submicron size shows an additional improvement in durability.

A method of producing a lithium ion-storing/releasing material according to the first invention for solving the above problems is a method of producing an electrode material for a negative electrode of an energy storage device capable of electrochemically storing and releasing lithium ions, the method being characterized by including any one of the following steps: (i) reacting silicon or tin with a metal oxide; (ii) reacting a silicon oxide or a tin oxide with a metal; and (iii) reacting a silicon compound or a tin compound with a metal compound.

It should be noted that Gibbs free energy at the time of producing a metal oxide by oxidation of a metal element included in the metal oxide or the metal is smaller than Gibbs free energy at the time of oxidizing silicon or tin, and the metal oxide has higher thermodynamic stability than silicon oxide or tin oxide.

In addition, the reaction of silicon or tin with a metal oxide in the above (i) is one of (A) a reaction performed by introducing at least silicon or tin and the metal oxide in a powder state into thermal plasma obtained by turning an inert gas or a hydrogen gas into plasma, and (B) a sintering reaction in spark plasma instantaneously generated by a spark discharge phenomenon caused by subjecting at least silicon or tin and the metal oxide to mechanical alloying treatment, pressing a powder obtained by the mechanical alloying treatment, and applying a pulsed current to gaps between the pressed powder particles at a low voltage under reduced pressure.

The reaction of silicon oxide or tin oxide with a metal in the above (ii) is at least one of (C) a reaction performed by introducing the metal, and the silicon oxide or the tin oxide, or silicon containing the silicon oxide or tin containing the tin oxide in a powder state into thermal plasma, (D) a sintering reaction in spark plasma instantaneously generated by a spark discharge phenomenon caused by subjecting the metal, and the silicon oxide or the tin oxide, or silicon containing the silicon oxide or tin containing the tin oxide in a powder state to mechanical alloying treatment, pressing a powder obtained by the mechanical alloying treatment (including mechanically milling treatment), and applying a pulsed large current to gaps between the pressed powder particles at a low voltage under reduced pressure, (E) a heating reaction in an inert gas or a hydrogen gas or under reduced pressure for a powder obtained by subjecting the metal, and the silicon oxide or the tin oxide, or silicon containing the silicon oxide or tin containing the tin oxide in a powder state to mechanical alloying treatment, and (F) a heating reaction for a composite layer formed on a substrate by vapor deposition of the metal, and the silicon oxide or the tin oxide, or silicon containing the silicon oxide or tin containing the tin oxide. The metal element of the metal oxide or of the metal is preferably one or more types of metal elements selected from Li, Be, Mg, Al, Ca, Zr, Ba, Th, La, Ce, Nd, Sm, Eu, Dy, and Er.

In the reaction of a silicon compound or a tin compound with a metal compound in the above (iii), the silicon compound is a compound selected from silane, disilane, dichlorosilane, trichlorosilane, tetrachlorosilane, tetramethoxysilane, tetraethoxysilane and tetrabutoxysilane, the tin compound is a compound selected from tin tetrachloride, tetraethoxytin, tetrapropoxytin and tetrabutoxytin, the metal compound is a compound selected from trichloroaluminum, trimethoxyaluminum, triethoxyaluminum, tripropoxyaluminum, tributoxyaluminum, and aluminum isoproxide, and the compounds are heated in an inert gas atmosphere or hydrogen gas atmosphere so that a reaction temperature reaches 400 to 1,300° C.

The heating in the above (E) or (F) or in the above (iii) may be performed by irradiation with laser light or infrared light. The atmosphere in the above (iii) is more preferably an atmosphere under reduced pressure.

An electrode material for a negative electrode of a lithium ion-storing/releasing energy storage device according to the second invention for solving the above problems is a material capable of electrochemically storing and releasing lithium ions, including silicon or tin primary particles composed of crystal particles each having a diameter of 5 nm to 200 nm and an amorphous surface layer having a thickness of 1 nm to 10 nm, wherein the amorphous surface layer of each of the primary particles is formed of at least a metal oxide; Gibbs free energy when the metal oxide is produced by oxidation of a metal is smaller than Gibbs free energy when silicon or tin is oxidized; and the metal oxide has higher thermodynamic stability than silicon oxide or tin oxide.

Further, it is preferred that the primary particles of the above electrode material are silicon particles, the crystal particles of silicon are formed into a network structure with fibrous (filamentous) substances, and the surface of each of the fibrous (filamentous) materials is coated with at least an oxide. In addition, the fibrous (filamentous) substances making up the networking structure each preferably have a diameter in a range of 5 nm to 70 nm and a length in a range of 100 nm to 2 μm. It is also preferred that the fibrous (filamentous) substances each have a core-shell structure, the core portion includes a silicon crystal, and the shell portion includes an amorphous silicon oxide or an amorphous metal oxide. It should be noted that Gibbs free energy when the metal oxide is produced by oxidation of a metal is smaller than Gibbs free energy when silicon or tin is oxidized, and the metal oxide has higher thermodynamic stability than silicon oxide or tin oxide.

An electrode structure according to the third invention for solving the above problems includes a current collector and an electrode material layer formed of an active material including a material capable of storing and releasing lithium ions by an electrochemical reaction, wherein the active material is the above lithium ion-storing/releasing material.

An energy storage device according to the fourth invention for solving the above problems includes a negative electrode using the above electrode structure, a lithium ion conductor, and a positive electrode including a positive electrode active material layer and a current collector, wherein the energy storage device utilizes an oxidation reaction of lithium and a reduction reaction of lithium ions.

According to the method of producing a lithium ion-storing/releasing material of the present invention, a material capable of electrochemically storing and releasing a large amount of lithium ions can be produced without using any complicated production step.

In addition, the energy storage device of the present invention utilizing the electrochemical oxidation-reduction reaction of lithium ions using the electrode structure of the present invention can provide high initial charge and discharge efficiency, high power density and high energy density, and the long cycle life of the device for charging and discharging can be ensured. In addition, the energy storage device thus obtained can be charged quickly.

Further features of the present invention will become apparent from the following description of exemplary embodiments with reference to the attached drawings.

Figure 1A:
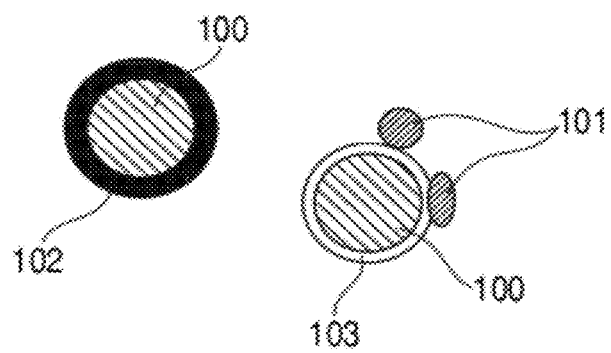
FIGS. 1A and 1B are each a schematic sectional view of an example of a powder material of the present invention.

DESCRIPTION OF REFERENCE NUMERALS 100 silicon or tin crystal particle
101 coating layer formed of an amorphous oxide of a metal
102 surface layer formed of silicon and an amorphous oxide of a metal or formed of tin and an amorphous oxide of a metal
103 surface layer formed of an amorphous oxide of silicon or tin
200 silicon or tin crystal particle
201 amorphous oxide layer as a surface layer
202, 205 fibrous (filamentous) substance
203 primary particle in the present invention
204 secondary particle as an aggregate of primary particles
300 current collector
301 silicon or tin crystal particle
302 metal oxide
303 material powder particle containing silicon or tin crystal particles
304 conductive auxiliary material
305 binder
306 electrode material layer (active material layer)
307 electrode structure
401, 501, 603 negative electrode
402, 503, 606 positive electrode
403, 502, 607 ion conductor
404 negative electrode terminal
405 positive electrode terminal
406 battery case (cell housing)
504 negative electrode cap
505 positive electrode can
506, 610 gasket
601 negative electrode current collector
602 negative electrode active material layer
604 positive electrode current collector
605 positive electrode active material layer
608 negative electrode can (negative electrode terminal)
611 insulating plate
612 negative electrode lead
613 positive electrode lead
614 safety valve

DESCRIPTION OF THE EMBODIMENTS

Hereinafter, the present invention will be described in detail.

A method of producing a lithium ion-storing/releasing material according to the present invention is a method of producing an electrode material for the negative electrode of an energy storage device capable of electrochemically storing and releasing lithium ions, the method being characterized by including any one of the following steps: (i) causing silicon or tin and a metal oxide to react with each other; (ii) causing a silicon oxide or a tin oxide and a metal to react with each other; and (iii) causing a silicon compound or a tin compound and a metal compound to react with each other. It should be noted that the silicon oxide or the tin oxide in the above (ii) may be silicon oxide as an impurity in silicon or a surface natural oxide film on silicon, or tin oxide as an impurity in tin or a surface natural oxide film on tin.

Further, the reaction between silicon or tin and the metal oxide in the above (i) is one of (A) a reaction performed by introducing at least silicon or tin and the metal oxide each in a powder state into thermal plasma obtained by turning an inert gas or a hydrogen gas into plasma, and (B) a sintering reaction in spark plasma instantaneously generated by a spark discharge phenomenon caused by subjecting at least silicon or tin and the metal oxide to mechanical alloying treatment, pressing a powder obtained by the mechanical alloying treatment, and applying a pulsed current into gaps between pressed powder particles at a low voltage under reduced pressure.

The reaction between the silicon oxide or the tin oxide and the metal in the above (ii) is at least one of (C) a reaction performed by introducing the metal, and the silicon oxide or the tin oxide, or silicon containing the silicon oxide or tin containing the tin oxide each in a powder state into thermal plasma, (D) a sintering reaction with spark plasma instantaneously generated by a spark discharge phenomenon caused by subjecting the metal, and the silicon oxide or the tin oxide, or silicon containing the silicon oxide or tin containing the tin oxide each in a powder state to mechanical alloying treatment, pressing a powder obtained by the mechanical alloying treatment, and applying a pulsed current into gaps between pressed powder particles at a low voltage under reduced pressure, (E) a heating reaction in an inert gas or a hydrogen gas or under reduced pressure for a powder obtained by subjecting the metal, and the silicon oxide or the tin oxide, or silicon containing the silicon oxide or tin containing the tin oxide each in a powder state to mechanical alloying treatment, and (F) a heating reaction for a composite layer formed on a substrate by vapor deposition of the metal, and the silicon oxide or the tin oxide, or silicon containing the silicon oxide or tin containing the tin oxide.

The metal element of the metal oxide or of the metal is preferably at least one type of metal element selected from Li, Be, Mg, Al, Ca, Zr, Ba, Th, La, Ce, Nd, Sm, Eu, Dy, and Er. Further, the metal element is more preferably Li, Mg, Al, Ca, Zr, La, or Nd, or is most preferably Al or Zr because any such metal element is available at a low cost, and can be easily handled.

In the reaction between the silicon compound or the tin compound and the metal compound in the above (iii), the silicon compound is a compound selected from silane, disilane, dichlorosilane, trichlorosilane, tetrachlorosilane, tetramethoxysilane, tetraethoxysilane, and tetrabutoxysilane, the tin compound is a compound selected from tin tetrachloride, tetraethoxytin, tetrapropoxytin, and tetrabutoxytin, the metal compound is a compound selected from trichloroaluminum, trimethoxyaluminum, triethoxyaluminum, tripropoxyaluminum, tributoxyaluminum, and aluminum isoproxide, and the compounds are heated in an inert gas atmosphere or hydrogen gas atmosphere so that a reaction temperature reaches 400 to 1,300° C.

The heating in the above (E) or (F) or in the above (iii) may be performed by irradiation with laser light or infrared light. The atmosphere in the above (iii) is more preferably an atmosphere under reduced pressure. The above laser light has a wavelength of preferably 532 nm or less because the above materials to be deposited can easily absorb the energy of the light. At least one type of gas selected from an argon gas, a helium gas and a nitrogen gas can be used as the above inert gas.

The thermal plasma in the above (A) and (C) is generated by an approach selected from arc discharge, high-frequency discharge, microwave discharge, and laser light irradiation.

A method for the vapor deposition in the above (F) is preferably at least one type of method selected from the group consisting of electron-beam deposition, laser ablation, sputtering, cluster ion beam deposition, chemical vapor deposition (CVD), plasma CVD, and resistance heating deposition. In the above (F), the materials are preferably deposited onto a conductor layer.

The temperature at which the heating in the above (E) or (F) is performed is preferably equal to or higher than the melting temperature of silicon, tin, or the metal. The heated product is more preferably cooled quickly, and a rate for the above cooling is preferably $10^3$ K/sec or more, or more preferably $10^4$ K/sec or more.

When silicon or tin and the metal oxide are caused to react with each other in the above (i), a ratio of the metal oxide as a raw material to silicon or tin as another raw material falls within the range of preferably 1 to 30 wt %, or more preferably 3 to 15 wt %.

When the silicon oxide or the tin oxide and the metal are caused to react with each other in the above (ii), a ratio of the metal as a raw material to the silicon oxide or the tin oxide as another raw material is preferably equal to or higher than a ratio in which the total amount of oxygen constituting the silicon oxide or the tin oxide and the metal react with each other to form a metal oxide.

When the silicon compound or the tin compound and the metal compound are caused to react with each other in the above (iii), a ratio of the metal compound as a raw material to the silicon compound or the tin compound as another raw material falls within the range of preferably 1 to 30 atomic %, or more preferably 3 to 15 atomic %.

The ratio between the raw materials is determined from a range in which, while the amount of lithium ions to be electrochemically stored and released is prevented from significantly decreasing, the silicon or tin particles are each coated with the stable metal oxide so that the oxidation of silicon or tin can be suppressed.

In the above (A) and (C), a slow oxidation step is preferably performed before a reaction product is exposed to the air. To be specific, the above slow oxidation is performed by exposing the above reaction product to an inert gas atmosphere containing a trace amount of oxygen.

In the above (B) and (D), a fine powder is preferably obtained by pulverization after the sintering.

Another method of producing a lithium ion-storing/releasing material including the step of causing a silicon oxide or a tin oxide and a metal to react with each other in the above (ii) is, for example, a method involving: mixing an oxide-containing silicon and a metal or an oxide-containing tin and a metal; melting the mixture to form a molten metal; quenching the molten metal by an atomization method, a gun method, a single-roll method, or a twin-roll method to provide a powder material of a lithium ion-storing/releasing material in a powder or ribbon state; finely pulverizing the material; and slowly oxidizing the finely pulverized products. As the above raw material metal, a metal is used in which Gibbs free energy at the time of producing a metal oxide by oxidation is smaller than Gibbs free energy at the time of oxidizing silicon or tin and the metal oxide has higher thermodynamic stability than silicon oxide or tin oxide.

Thermal Plasma Method:

The thermal plasma method is a method in which raw materials are introduced into generated thermal plasma to allow the materials to react with each other in the high-temperature plasma.

The thermal plasma can be generated by, for example, any one of the following methods: (1) a gas is inductively subjected to heating by electric discharge by utilizing a radiofrequency electromagnetic field; (2) a gas is irradiated with a microwave so as to be subjected to heating by electric discharge; and (3) arc discharge is performed between electrodes. The discharge by radiofrequency (RF) in the above method (1) is non-polar discharge, and has such an advantage that an electrode substance is not included as an impurity into plasma. An inductively coupled plasma torch based on a radiofrequency is basically inductively coupled discharge where a gas-introducing portion is provided at one end of a water-cooled torch made of an insulating material such as a quartz tube, and a gas in the torch is brought into a plasma state with an induction coil outside the torch. A high-temperature region of 10,000 K or higher is generated inside the induction coil. A raw material introduced into the plasma is instantaneously brought into an atom or ion state in the above high-temperature region. For example, when the raw material is a metal oxide, a metal element and an oxygen element each dissociate into an atom or ion state, and react during cooling to solidify.

Spark Plasma Sintering

A spark plasma sintering (SPS) process is involved in the effective application of high energy of spark plasma instantaneously generated by a spark discharge phenomenon caused by applying a large pulsed current into gaps between pressed powder particles at a low voltage (high-temperature plasma: a high-temperature field of several thousands to ten thousand degrees centigrade is instantaneously generated between the particles) to, for example, thermal diffusion or electric field diffusion. Sintering is completed within a time period as short as about 5 to 20 minutes including a temperature-increase time and a retention time in a temperature region about 200 to 500° C. lower than that of a conventional method in a range from a low temperature to an ultra-high-temperature of 2,000° C. or higher. Vaporization and a melting phenomenon occur locally on the surface of each particle, and a constricted portion called a neck is formed at a portion where particles come in contact with each other so that the particles are brought into a welded state. The neck formed between adjacent particles gradually develops, and expands a diffused portion while undergoing plastic deformation, whereby a high-density sintered body having a density of 99% or more can be finally formed. Since the temperature of each of the particles can be quickly increased by the self-heating of only the surface of each particle, the grain growth of a starting material can be suppressed, and a dense sintered body can be obtained within a short time period. Of course, a porous body can be produced. In addition, a powder having an amorphous structure or nanocrystal texture can be made into a bulk without being processed because a texture in pressed powder can be prevented from changing.

A lithium ion-storing/releasing material obtained by the production method is preferably as follows: the material is formed of at least silicon or tin primary particles formed of crystal particles having a diameter of 5 nm to 200 nm and an amorphous surface layer having a thickness of 1 nm to 10 nm, and the amorphous surface layer of each of the primary particles is formed of at least a metal oxide. It should be noted that Gibbs free energy when the metal oxide is produced by the oxidation of a metal is smaller than Gibbs free energy when silicon or tin is oxidized, and the metal oxide has higher thermodynamic stability than silicon oxide or tin oxide.

A composite powder of silicon or tin and the metal oxide may be formed of fine particles each having a core-shell structure in which the periphery of a silicon or tin crystal particle having a diameter of 5 nm to 200 nm is coated with the amorphous metal oxide of the amorphous surface layer having a thickness of 1 nm to 10 nm.

A metal element accounts for preferably 0.3 atomic % or more, or more preferably 0.3 atomic % or more and 30 atomic % or less of the metal oxide of the primary particles.

The lithium ion-storing/releasing material is preferably composed of silicon particles.

A crystallite size calculated from a half width of a Si(111) peak in an X-ray diffraction chart of the silicon particles and Sherrer's equation falls within a range of 20 to 60 nm.

A molar ratio of silicon oxide to Si calculated from an X-ray photoelectron spectroscopy (XPS) measurement spectrum is preferably 0.05 to 7.0. In addition, a ratio of an oxygen element to an Si element measured with an energy dispersive X-ray spectrometer (EDX) of a scanning transmission electron microscope (STEM) is preferably 0.05 to 0.8.

It is preferred that the crystal particles of the silicon primary particles are formed into a network structure with fibrous (filamentous) substances, and the surface of each of the fibrous (filamentous) materials is coated with at least an oxide. The fibrous (filamentous) substances constituting the network structure preferably have a diameter in a range of 5 nm to 70 nm and a length in a range of 100 nm to 2 µm. It is preferred that the fibrous (filamentous) substances each have a core-shell structure, the core portion is composed of a silicon crystal, and the shell portion is composed of an amorphous silicon oxide or an amorphous metal oxide. In addition, Gibbs free energy when the metal oxide is produced by oxidation of a metal is smaller than Gibbs free energy when silicon or tin is oxidized, and the metal oxide has higher thermodynamic stability than silicon oxide or tin oxide.

The fibrous (filamentous) substances may each be amorphous silicon oxide or aluminum oxynitride.

The metal element of the metal oxide is preferably at least one type of metal selected from Li, Be, Mg, Al, Ca, Zr, Ba, Th, La, Ce, Nd, Sm, Eu, Dy, and Er, or more preferably at least one type of metal selected from Li, Mg, Al, Ca, Zr, Ba, La, Ce, and Nd. Of the above metal elements, Al or Zr is the most preferable element in consideration of the fact that any such element is available at a low cost, and can be easily handled.

The content of the oxide of a metal except silicon and tin in the lithium ion-storing/releasing material falls within the range of preferably 1 wt % or more to 50 wt % or less, or more preferably 10 wt % or more to 35 wt % or less.

The content of silicon or tin in the lithium ion-storing/releasing material falls within the range of preferably 30 wt % or more and 98 wt % or less, or more preferably 50 wt % or more and 90 wt % or less.

In the lithium ion-storing/releasing material, silicon or tin and a metal except tin preferably form a eutectic crystal.

According to the Ellingham diagrams of oxides in which the abscissa indicates temperature T and the axis of ordinate indicates change $\Delta G^0$ in standard Gibbs energy of oxide formation reaction for 1 mol of oxygen, for example, $Cr_2O_3$, $MnO$ and $V_2O_3$ each have higher thermodynamic stability than $SnO_2$ because a line for "$Sn+O_2 \rightarrow SnO_2$" is positioned above ($\Delta G^0$ is larger) each of a line for "$4/3Cr+O_2 \rightarrow 2/3Cr_2O_3$", a line for "$2Mn+O_2 \rightarrow 2MnO$", and a line for "$3/4V+O_2 \rightarrow 2/3V_2O_3$". In addition, the line for "$Si+O_2 \rightarrow SiO_2$" is positioned below the line for "$3/4V+O_2 \rightarrow 2/3V_2O_3$". In addition, a line for "$Ti+O_2 \rightarrow TiO_2$" is positioned below, but considerably close to, the line for "$Si+O_2 \rightarrow SiO_2$". Since a line for "$4/3Al+O_2 \rightarrow 2/3Al_2O_3$", a line for "$2Mg+O_2 \rightarrow 2MgO$" and a line for "$2Ca+O_2 \rightarrow 2CaO$" are each positioned distantly below ($\Delta G^0$ is smaller) the line for "$Si+O_2 \rightarrow SiO_2$", $SiO_2$ is stabler than $SnO_2$, and furthermore, $TiO_2$, $Al_2O_3$, $MgO$ and $CaO$ are stabler than $SiO_2$. Similarly, the Ellingham diagrams of oxides show that $Nb_2O_3$ and $Ta_2O_3$ are each stabler than $SnO_2$, and $B_2O_3$, $CeO_2$, $BaO$, $ZrO_2$, $SrO$, $ThO_2$, $BeO$ and $La_2O_3$ are also stabler than $SiO_2$. Exemplary metal oxides stabler than tin monoxide, tin dioxide, or silicon dioxide are shown below using inequality signs.

$SnO < MoO_2, WO_2, WO_3$
$SnO_2 < MoO_2, WO_2, V_2O_3$
$SiO_2 < Al_2O_3, ZrO_2, Li_2O, MgO, CaO, BaO, CeO_2, La_2O_3$
  $Nd_2O_3, Sm_2O_3, ThO_2, Tm_2O_3, Yb_2O_3, Dy_2O_3, Er_2O_3,$
  $Eu_2O_3, Eu_3O_4$
$SnO < SnO_2 < SiO_2$

In this connection, known examples of numerical values for the standard Gibbs energies of formation $\Delta G^0_f$'s per mole of representative metal oxides at a temperature of 298.15 K are as follows: −251.9 kJ/mol for SnO, −515.8 kJ/mol for $SnO_2$, −1,582.3 kJ/mol for $Al_2O_3$, −888.8 kJ/mol for $TiO_2$, −569.3 kJ/mol for MgO, −561.2 kJ/mol for $Li_2O$, −1,042.8 kJ/mol for $ZrO_2$, −1,816.6 kJ/mol for $Y_2O_3$, −1,789.0 kJ/mol for $La_2O_3$, and −1,720.8 kJ/mol for $Nd_2O_3$ (as the absolute values of the negative values of the above standard Gibbs energy of formation are larger, the metal oxides become stabler).

For example, when the metal is titanium, zirconium or aluminum, a reaction with silicon oxide or tin oxide proceeds as shown below in consideration of the Ellingham diagrams.

$SiO_2 + Zr \rightarrow Si + ZrO_2$
$3SiO_2 + 4Al \rightarrow 3Si + 2Al_2O_3$
$3SiO + 2Al \rightarrow 3Si + Al_2O_3$
$SnO_2 + Ti \rightarrow Sn + TiO_2$
$3SnO_2 + 4Al \rightarrow 3Sn + 2Al_2O_3$
$2SnO + Ti \rightarrow 2Sn + TiO_2$
$3SnO + 2Al \rightarrow 3Sn + Al_2O_3$ Since the weight ratio of silicon or tin in a metal oxide in which silicon or tin crystals obtained only by the above reduction reaction of silicon oxide or tin oxide are dispersed, is not large, the amount of lithium ions to be electrochemically stored and released cannot be increased so much when the metal oxide is used as an active material for an electrode of an energy storage device. In order to increase the amount of lithium ions to be electrochemically stored and released, it is necessary to increase the above ratio of silicon or tin. To this end, in the above step, it is preferable that the above reduction reaction of silicon oxide or tin oxide is brought about by adding extra silicon or tin in addition to silicon oxide or tin oxide and the metal, and it is more preferable that silicon oxide included in silicon or tin oxide included in tin are allowed to react with the metal. In this case, it is also desirable that a metal species that forms a eutectic crystal with silicon or tin is selected as the metal, and the amount of the metal remaining without being oxidized by the above reduction reaction of silicon oxide or tin oxide is such a composition amount that the metal forms a eutectic crystal with silicon or tin.

In addition, silicon and a metal, or tin and a metal are mixed, the mixture is melted to form a molten metal, and the molten metal is quenched by an atomization method, a gun method, a single-roll method, or a twin-roll method, whereby a powder material of a lithium ion-storing/releasing material in a powder or ribbon state is obtained. Next, the powder material obtained by the above method can be additionally finely pulverized with a pulverizing apparatus. For example, a ball mill such as a planetary ball mill, a vibrating ball mill, a conical mill or a tube mill, a media mill of, for example, an attritor type, sand grinder type, annealer mill type or tower mill type, or an apparatus for pulverizing slurry in which a raw material is dispersed by causing the slurry to collide at a high pressure can be used as the above pulverizing apparatus. The metal in the finely pulverized particles formed of silicon and the metal or of tin and the metal is preferentially oxidized, whereby silicon or tin particles coated with the metal oxide are obtained.

The material capable of storing and releasing lithium ions may be turned into a composite with carbon, and a weight ratio of the carbon element to be used in the composite to the material is preferably 0.05 or more and 1.0 or less.

An electrode structure according to the present invention includes a current collector and an electrode material layer formed of an active material as a material capable of storing and releasing lithium ions by an electrochemical reaction, wherein the active material is the above lithium ion-storing/releasing material.

To be specific, the electrode structure is constituted of a current collector and an electrode material layer formed of an active material as a material capable of storing and releasing lithium ions by an electrochemical reaction, and is characterized in that the material capable of storing and releasing lithium ions includes a composite material including silicon or tin primary particles composed of crystal particles each having a diameter of 5 nm to 200 nm and an amorphous surface layer having a thickness of 1 nm to 10 nm, and the amorphous surface layer of each of the primary particles is formed of at least a metal oxide. In addition, Gibbs free energy when the metal of the metal oxide is oxidized is smaller than Gibbs free energy when silicon or tin is oxidized. Further, the metal may form a eutectic crystal with silicon or tin as well as the metal oxide.

In particular, the electrode structure of the present invention is characterized in that the material capable of storing and releasing lithium ions is formed of silicon having a crystallite size of 20 to 60 nm.

In addition, the electrode structure is characterized in that the crystal particles of the silicon primary particles are formed into a network structure with fibrous (filamentous) substances, and the surface of each of the fibrous (filamentous) substances is coated with at least an oxide.

The electrode material layer is preferably formed of the active material and a binder. The active material is formed of the above material capable of storing and releasing lithium ions.

The electrode material layer is preferably formed of the active material, a conductive auxiliary material, and a binder.

The density of the electrode material layer is preferably in a range of 0.5 g/cm$^3$ or more and 3.5 g/cm$^3$ or less.

The content of silicon or tin in the lithium ion-storing/releasing material constituting the electrode structure preferably falls within the range of 30 wt % or more to 98 wt % or less of the material.

The content of the oxide of a metal except silicon and tin (metal oxide) in the lithium ion-storing/releasing material falls within the range of preferably 1 wt % or more and 50 wt % or less, or more preferably 10 wt % or more and 35 wt % or less.

The content of silicon or tin in the lithium ion-storing/releasing material preferably falls within the range of 50 wt % or more and 90 wt % or less.

An energy storage device according to the present invention includes a negative electrode using the above electrode structure, a lithium ion conductor, and a positive electrode including a positive electrode substance layer and a current collector, wherein the energy storage device utilizes an oxidation reaction of lithium and a reduction reaction of lithium ions.

The content of silicon or tin in the lithium ion-storing/releasing material constituting the negative electrode preferably falls within the range of 30 wt % or more and 98 wt % or less of the material.

A metal oxide content in the lithium ion-storing/releasing material constituting the negative electrode falls within the range of preferably 1 wt % or more and 50 wt % or less, or more preferably 10 wt % or more and 35 wt % or less.

The positive electrode is preferably formed of at least a powder material which includes particles formed of a transition metal compound selected from a transition metal oxide, a transition metal phosphate compound, a lithium-transition metal oxide and a lithium-transition metal phosphate compound, and is turned into a composite with at least one of particles each having an amorphous phase and an oxide containing a metal oxide semimetal.

The positive electrode active material is composed of a transition metal compound selected from a transition metal oxide, a transition metal phosphate compound, a lithium-transition metal oxide and a lithium-transition metal phosphate compound, or a carbon material. Further, the above positive electrode active material is more preferably turned into a composite with an oxide or composite oxide having an amorphous phase and primarily composed of an element selected from Mo, W, Nb, Ta, V, B, Ti, Ce, Al, Ba, Zr, Sr, Th, Mg, Be, La, Ca and Y. Further, it is preferred that the content of the oxide or composite oxide to be used in the composite is 1 wt % or more and 20 wt % or less of the above positive electrode active material turned into the composite, and the contribution ratio of the oxide or composite oxide to the charge and discharge electrical quantity is 20% or less.

The positive electrode active material is preferably turned into a composite also with a carbon material having a specific surface area in the range of 10 to 3,000 m$^2$/g.

The carbon material is preferably selected from active carbon, mesoporous carbon, carbon fiber and carbon nanotube.

The positive electrode active material turned into the composite preferably has a crystallite size of 100 nm or less.

A method of producing the positive electrode active material turned into the composite is, for example, a method in which a metal oxide material to be turned into a composite with the selected active material is mixed and the mixture is milled using a mill such as a vibrating mill or an attritor to produce a composite (mechanical alloying).

The inventors of the present invention have reached the present invention by detailed investigation into an alloy-based negative electrode for a lithium secondary battery. In the case of a lithium secondary battery using as a negative electrode an electrode obtained by forming, on a current collector made of metal foil, an electrode material layer (active material layer) formed of a powder made of a metal or alloy of silicon or tin and a binder, the internal resistance of the battery increases owing to the repetition of charging and discharging, with the result that a reduction in performance of the battery occurs. In particular, when a charging current density is increased, the influence of the increase is large, so the reduction in performance is large. The inventors of the present invention have assumed, by the observation and analysis of the active material of the above negative electrode, that the following is responsible for the above reduction in performance. At the time of charging, electric field intensity on the particles each formed of the metal or alloy of silicon or tin is non-uniform, and the precipitation of lithium is more liable to occur at a portion where electric field intensity is large than at a portion where an electric field intensity is small, and the diffusion of lithium occurs non-uniformly in an alloy lattice, so non-uniform expansion and collapse of the alloy particles seem to occur. Accordingly, the precipitation of a lithium metal in direct contact with an electrolyte solution must be suppressed by uniformizing the electric field intensity on the alloy particles. The addition of, for example, a vinyl monomer capable of forming a coating film capable of functioning as a solid electrolyte interface (SEI) or passivating film to the electrolyte solution upon charging and discharging is effective for the suppression to some extent. However, the rate at which lithium diffuses in the alloy is not high, so the non-uniform expansion and collapse of the alloy particles become remarkable at high charging current density, and the addition serves also as a cause for the occurrence of an irreversible side reaction. As a result, a reduction in discharge capacity and a reduction in the cycle life of the repetition of charging and discharging are accelerated.

In consideration of the above assumed cause, the inventors of the present invention have found a method of suppressing the non-uniform precipitation or diffusion of lithium at the time of charging to metal particles each formed of silicon or tin or alloy particles each formed of any such element, with the metal particles or the alloy particles being capable of electrochemically storing lithium.

The inventors of the present invention had as the above method the idea that the diffusion of lithium ions at the time of charging and discharging can be rendered more uniform and faster by making as fine as possible the primary particles of the metal particles formed of silicon or tin, or the alloy particles formed of any such element. However, when the primary particles of the metal particles formed of silicon or tin, or the alloy particles formed of any such element is made as fine as possible, a problem is raised in that the particles have an increased specific surface area, and become easily oxidized, with the result that the production of a large amount of silicon oxide or tin oxide becomes inevitable. Silicon oxide or tin oxide thus produced reacts with lithium to form irreversible lithium oxide, so the initial charge and discharge coulombic efficiency of a lithium secondary battery formed of a negative electrode using fine silicon or tin metal particles containing a large amount of silicon oxide or tin oxide described above as an active material is reduced, and a subsequent electrical quantity which can be charged into or discharged from the battery is reduced.

To solve the above problem, the inventors of the present invention had the idea that the fine silicon or tin metal particles are coated with a metal oxide having higher thermodynamic stability than silicon oxide or tin oxide in order that the oxidation of the particles may be suppressed.

A material capable of maintaining the performance of silicon or tin metal particles which store a large amount of lithium ions by a charging reaction and realizing such performance that the diffusion of lithium ions at the time of charging and discharging is more uniform and faster is obtained by coating fine silicon or tin crystal particles as an active material with a thermodynamically stable metal oxide, and is produced by the above-mentioned production method in the present invention such as the oxidation-reduction reaction between silicon oxide or tin oxide and a metal or a reaction between silicon or tin and the stable metal oxide.

The silicon or tin metal particles are separated into finer regions by the metal oxide. Even when primary particles aggregate to form secondary particles, the crystal particles remain isolated by the metal oxide.

In addition, when an energy storage device is produced by using the electrode of the present invention formed of a powder material obtained by reducing the sizes of silicon or tin metal particles, and lithium is electrochemically stored in the electrode by a charging reaction, lithium can easily diffuse uniformly to the above fine regions, and the specific surface area increases, so substantial current density is reduced, and the device can be charged more quickly. In addition, reserved lithium can be released uniformly at a higher rate by a discharging reaction. In addition, the content of silicon oxide or tin oxide can be reduced, so the initial charge and discharge coulombic efficiency is improved. As a result, a large-capacity energy storage device such as a secondary battery can be provided.

In addition, the above metal oxide (including the composite oxide) should be stable at temperature at the time of forming the composite, and the silicon or tin metal particles storing lithium should not be oxidized by depriving oxides of metals other than silicon and tin of oxygen. The thermodynamically stable metal oxide (oxide containing a semimetal) can be selected from the Ellingham diagrams of oxides representing the stability of oxides as a function of temperature. First, it is desirable that the oxides are thermodynamically more stable than tin oxide, that is, the oxides have larger absolute values of negative values of Gibbs free energy in the oxidation reaction of the metals than Gibbs free energy in the oxidation reaction of tin. To be specific, oxides or composite oxides mainly composed of metal elements selected from Li, Be, B, Mg, Al, Ca, Sc, Ti, V, Cr, Mn, Zn, Ga, Y, Zr, Nb, Mo, Ba, Hf, Ta, W, Th, La, Ce, Nd, Sm, Eu, Dy and Er are preferable as the above oxides. Further, it is desirable that the oxides are thermodynamically more stable than silicon oxide, that is, the oxides have larger absolute values of negative values of Gibbs free energy in the oxidation reaction of the metals than Gibbs free energy in the oxidation reaction of silicon. As the above oxides of the specific metals, oxides or composite oxides mainly composed of metal elements selected from Li, Mg, Al, Zr, Th, La, Ce, Nd, Sm, Eu, Dy, and Er are more preferable.

In general, the surfaces of particles formed of a silicon or tin metal or of an alloy of one of these metals to be handled in the air are coated with an oxide film. In an energy storage device using an electrode formed of those particles and utilizing the oxidation-reduction reaction of lithium ions, the conduction of electrons between the particles and the conduction of lithium ions between the particles are suppressed to low levels by the oxide coating film.

In addition, at the time of charging, oxygen atoms of silicon oxide or tin oxide in the coating film reacts with lithium to form lithium oxide which cannot reversibly release any Li ion by a discharging reaction, so the performance of discharge may be suppressed.

However, silicon or tin crystal particles produced by the production method of the present invention are coated with an oxide of a metal other than silicon and tin at the time of the production, so the particles are not easily oxidized, silicon oxide or tin oxide is difficult to newly form, and the change of the particles over time at the time of storage is small. In addition, the silicon or tin crystal particles are produced in minute states at the time of the production. As a result, an energy storage device using an electrode formed of the above composite material obtained by the present invention has the following characteristics: an electrochemical reaction in a discharging reaction occurs uniformly at a higher rate, the device can be quickly charged and discharged, the quantity of electricity comparable to the electrical quantity charged into the device can be discharged with high efficiency, and the device has high energy density and high power density.

It is also preferred that the oxide of a metal to be turned into a composite with the above positive electrode active material is an oxide or composite oxide mainly formed of a metal element selected from Mo, W, Nb, Ta, V, B, Ti, Ce, Al, Ba, Zr, Sr, Th, Mg, Be, La, Ca and Y. The weight ratio of the oxide containing a metal oxide semimetal to be turned into a composite with the positive electrode active material falls within the range of preferably 0.01 to 0.2, or more preferably 0.02 to 0.1 with respect to 1 of the positive electrode active material. Additionally, specific examples of the oxide containing a metal oxide semimetal to be turned into a composite include $WO_2$, $TiO_2$, $MoO_2$, $Nb_2O_5$, $MoO_3$, $WO_3$, $Li_4Ti_5O_{12}$, $Li_2Nb_2O_5$, $LiNbO_3$, $LiWO_2$, $LiMoO_2$, $LiTi_2O_4$, $Li_2Ti_2O_4$, $H_2Ti_{12}O_{25}$, $Na_2Ti_{12}O_{25}2$, $VO_2$, $V_6O_{13}$, $Al_2O_3$, $Al_2O_3.Na_2O$, $MgO$, $ZrO_2$, and $La_2O_3$. The ratio between the elements of those oxides is not necessarily needed to be a stoichiometric ratio.

Hereinafter, embodiments of the present invention will be described with reference to FIGS. 1A to 6.

(Lithium Ion-Storing/Releasing Material)

Figure 1B:
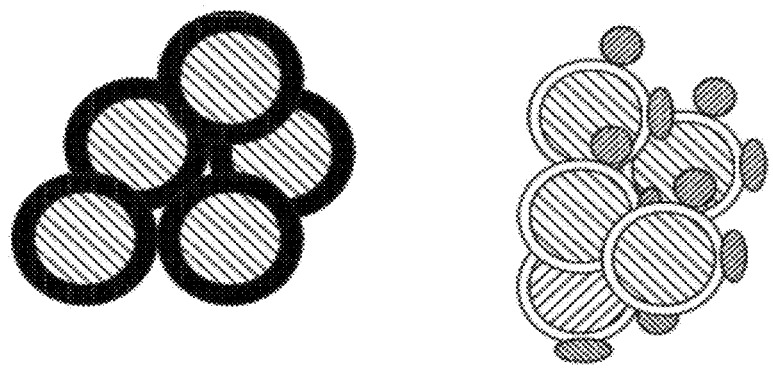

FIG. 1A is a conceptual view showing the structures of two types of primary particles capable of electrochemically reserving and releasing Li of the present invention. FIG. 1B is a conceptual view showing the structures of two types of secondary particles formed by aggregation of the primary particles shown in FIG. 1A. In FIG. 1A, reference numeral 100 represents a silicon or tin crystal particle; 101, a coating layer formed of an amorphous oxide of a metal; 102, a surface layer formed of silicon and an amorphous oxide of a metal or formed of tin and an amorphous oxide of a metal; and 103, a surface layer formed of an amorphous oxide of silicon or tin. The whole or part of the surface of each of the primary particles capable of electrochemically storing and releasing Li in the present invention is coated with 101, 102, or 101 and 102. FIG. 1B is a conceptual view showing the constitutions of two types of secondary particles formed by aggregation of the primary particles shown in FIG. 1A. The particles capable of electrochemically storing and releasing Li of the present invention may be formed of either the two types of primary particles shown in FIG. 1A or the two types of secondary particles shown in FIG. 1B alone, or may be formed of a mixture of them.

Figure 2C:
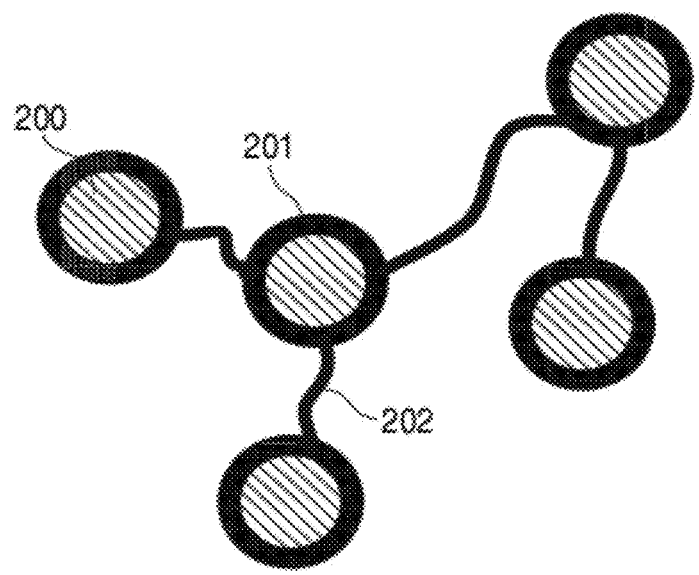
FIGS. 2C and 2D are each a schematic sectional view of an example of the powder material of the present invention.
Figure 2D:
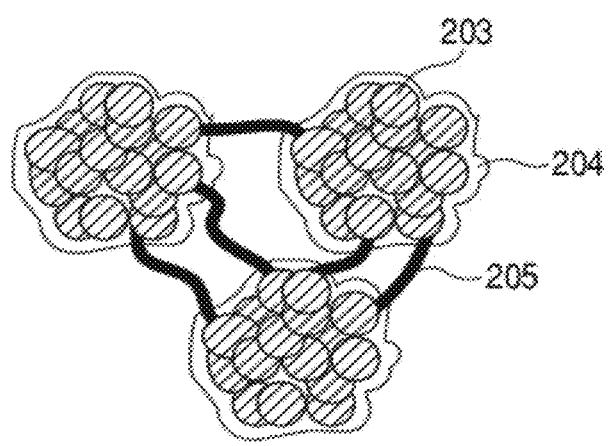

FIGS. 2C and 2D are conceptual structural views when the primary particles capable of electrochemically storing and releasing Li in the present invention are connected with fibrous substances to form a network structure. FIG. 2C is a conceptual structural view when the primary particles in the present invention of one type shown in FIG. 1A are connected with fibrous substances to form a network structure. FIG. 2D is a conceptual structural view when parts of the secondary particles formed by aggregation of the primary particles in the present invention and other parts of the secondary particles are connected with fibrous substances to form a network structure. In FIGS. 2C and 2D, reference numeral 200 represents a silicon or tin crystal particle; 201, an amorphous oxide layer as a surface layer; 202 and 205, fibrous substances; 203, a primary particle in the present invention; and 204, a secondary particle as an aggregate of the primary particles. It should be noted that the particle, which appears to have a surface entirely coated with the amorphous oxide in FIG. 2C, may be partly coated.

It is preferable in terms of the easiness of production and the performance of the electrode that the above silicon or tin crystal particles 100 and 200 have a diameter of 5 nm to 200 nm, and the amorphous oxide layers 102, 103, and 201 have a thickness of 1 nm to 10 nm. The crystallite size of each of the above silicon or tin crystal particles preferably falls within the range of 20 to 60 nm in terms of the performance of the electrode. When the above particle size or the above crystallite size is excessively large, upon electrochemical insertion/extraction of lithium into/from the formed electrode, a local reaction is apt to occur, and is responsible for a reduction in lifetime of the electrode. When the crystallite size is excessively small, the resistance of the electrode increases.

In addition, a metal element accounts for preferably 0.3 atomic % or more, or more preferably 0.3 atomic % or more and 30 atomic % or less of the metal oxide in the primary particles shown in FIG. 1A and the secondary particles shown in FIG. 1B in order that the electrode may provided with the performance of favorably storing and releasing lithium ions.

When the crystal particles of the primary particles are formed of silicon, a molar ratio of silicon oxide to Si of the secondary particles by XPS as a surface analysis approach is preferably 0.05 to 7.0, and a ratio of an oxygen element to an Si element by analysis with the EDX of an STEM is preferably 0.05 to 0.8 in order that the electrode may be provided with the performance of favorably storing and releasing lithium ions.

Further, the fibrous substances 202 and 205 shown in FIGS. 2C and 2D preferably have a diameter in the range of 5 nm to 70 nm and a length in the range of 100 nm to 2 µm in terms of the easiness of production and an increase in mechanical strength of the electrode. A material of the fibrous substances is preferably amorphous silicon oxide or crystalline aluminum oxynitride. In addition, the fibrous substances are preferably selected from materials having a core-shell structure in which the core portion is crystalline silicon and the shell portion is an amorphous silicon oxide, an amorphous metal oxide or a composite oxide of a metal and silicon. It is preferred that Gibbs free energy when a metal oxide is produced by oxidation of the metal element of the metal oxide or composite oxide is smaller than Gibbs free energy when silicon or tin is oxidized, and the metal oxide have higher thermodynamic stability than silicon oxide or tin oxide. To be specific, the metal element is preferably at least one type of metal selected from Li, Be, Mg, Al, Ca, Zr, Ba, Th, La, Ce, Nd, Sm, Eu, Dy and Er, or more preferably at least one type of metal selected from Li, Mg, Al, Ca, Zr, Ba, La, Ce and Nd; the metal element is most preferably Al or Zr because any such element is available at a low cost, is stable in the air, and can be easily handled.

The content of the oxide of a metal other than silicon and tin in the lithium ion-storing/releasing material falls within the range of preferably 1 wt % or more and 50 wt % or less, or more preferably 10 wt % or more and 35 wt % or less.

The content of silicon or tin in the lithium ion-storing/releasing material falls within the range of preferably 30 wt % or more and 98 wt % or less, or more preferably 50 wt % or more and 90 wt % or less.

The above powder material is used as an active material for the electrode of an electrochemical device, in particular, an energy storage device. The above powder material can be used as an electrode material for an electrode for other electrolysis or an electrode for electrochemical synthesis. In addition, the above powder material can be used also as a photocatalyst for decomposing water or organic matter by photoirradiation or a material for a photovoltaic device.

(Electrode Structure)

Figure 3A:
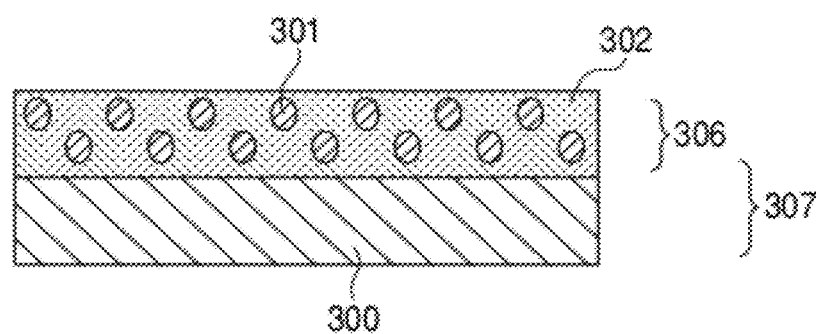
FIGS. 3A and 3B are each a schematic sectional view of an example of an electrode structure of the present invention.
Figure 3B:
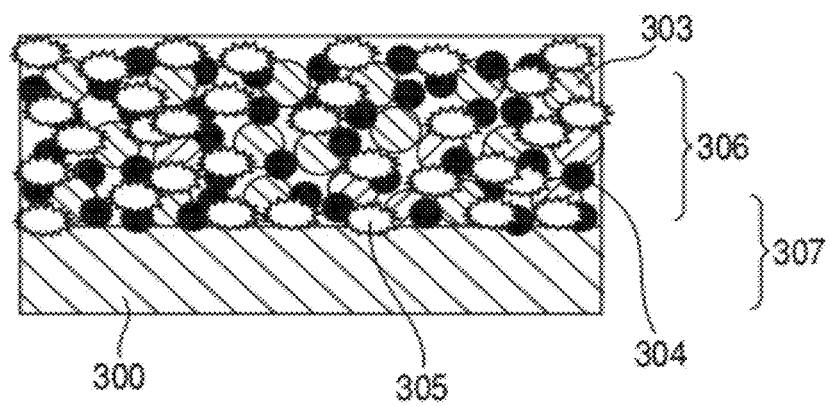

FIGS. 3A and 3B are each a schematic view showing the sectional structure of an electrode structure formed of the lithium ion-storing/releasing material produced by the method of the present invention.

FIG. 3A shows a state in which the layer of the lithium ion-storing/releasing material is formed by vapor deposition on a current collector in the reaction (F) in the production method of the present invention. In FIGS. 3A and 3B, reference numeral 300 denotes the current collector; 301, a silicon or tin crystal particle; 302, a metal oxide; 306, an electrode material layer (active material layer); and 307, an electrode structure. The metal oxide 302 shown in FIG. 3A may contain an unoxidized metal, the electrode material layer 306 may contain a metal crystal (not shown), and the composition of the crystal is preferably the eutectic composition of silicon or tin. In FIG. 3A, the surface layer of the silicon or tin crystal particle 301 is coated with an amorphous oxide.

An electrode structure shown in FIG. 3B is obtained by forming, on the current collector, the electrode material layer (active material layer) from the powder of the lithium ion-storing/releasing material shown in FIG. 1A or 1B, or FIG. 2C or 2D produced by the method of the present invention. In FIG. 3B, reference numeral 300 denotes the current collector; 303, a material powder particle containing silicon or tin crystal particles; 304, a conductive auxiliary material; 305, a binder; 306, the electrode material layer (active material layer); and 307, the electrode structure. The electrode structure shown in FIG. 3B is produced by: mixing the material powder particles 303 containing silicon or tin crystal particles, the conductive auxiliary material 304, and the binder 305; appropriately adding, for example, a solvent for the binder to the mixture to prepare slurry; applying the prepared slurry onto the current collector 300 with an application apparatus; drying the resultant; and appropriately adjusting the thickness and density of the electrode material layer with an apparatus such as a roll press after the drying.

The electrode material layer shown in FIG. 3B preferably has density in the range of 0.5 g/cm$^3$ or more to 3.5 g/cm$^3$ or less in order that an energy storage device having high energy density and high power density can be obtained.

(Energy Storage Device)

Figure 4:
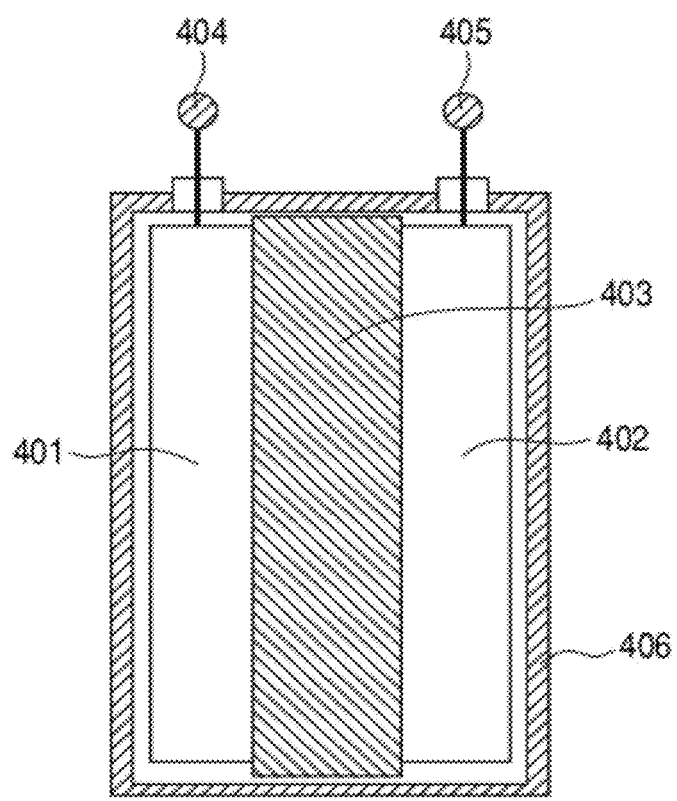
FIG. 4 is a conceptual sectional view of an energy storage device of the present invention.

FIG. 4 is a view showing the basic constitution of an energy storage device utilizing the reduction-oxidation reaction of lithium ions. In the energy storage device shown in FIG. 4, reference numeral 401 represents a negative electrode; 403, a lithium ion conductor; 402, a positive electrode; 404, a negative electrode terminal; 405, a positive electrode terminal; and 406, a battery case (housing). When the above electrode structure shown in FIG. 3A or 3B is used in the negative electrode 401, in consideration of an electrochemical reaction at the time of charging and discharging with reference to FIGS. 1A and 1B, 2C and 2D, and 3A, in the case where the device is charged by connecting the negative electrode terminal 401 and the positive electrode terminal 405 to an external power source, silicon or tin in which lithium is stored has been turned into fine particles in the material layer of the negative electrode 401 in the present invention upon inserting lithium ions into the active material for the negative electrode to prompt a reduction reaction at the time of charging. Since the particles have a large specific surface area, substantial current density at the time of the charging is reduced, and the electrochemical reaction is performed moderately and uniformly. In addition, the initial charge and discharge efficiency of the device is high because the content of silicon oxide or tin oxide which reacts with lithium to inactivate lithium is reduced to the uppermost. As a result of the foregoing, the expansion of the volume of the negative electrode 401 due to the insertion of lithium is suppressed, so the lifetime of the electrode is lengthened. In addition, the suppression means that a larger current can be flowed into the electrode than that in the case of an electrode in which silicon or tin has not been turned into fine particles. Accordingly, the energy storage device of the present invention can be more quickly charged. When the device is discharged by connecting the negative electrode terminal 401 and the positive electrode terminal 405 to an external load, discharging current density per silicon or tin particle is reduced by turning silicon or tin into fine particles, so the energy storage device of the present invention can be discharged at a larger current per electrode, and provide high power.

(Regarding Storage Characteristic of Electrode Material)

Although fine particles formed of silicon or tin alone react with oxygen and moisture in the air and are easily oxidized, the oxidation is suppressed, and the particles can be easily handled in the air when the periphery of each of the particles is coated with a metal oxide as in the material powders 100 and 200 shown in FIGS. 1A and 1B and FIGS. 2C and 2D, and the electrode material layer 306 shown in FIG. 3A. In addition, even when the particles are stored for a long time period, the particles show smaller chemical changes, and are stable, so the particles can show stable performance when used as an electrode material for an energy storage device.

(Evaluation of Lithium Ion-Storing/Releasing Material for Crystallite Size)

In the present invention, the crystallite size of a particle can be determined by means of a transmission electron microscope image or selected area electron diffraction, or from the half width of a peak in an X-ray diffraction curve and a diffraction angle by using Scherrer's equation described below.

$$Lc = 0.94\lambda/(\beta \cos\theta) \qquad \text{(Scherrer's equation)}$$

Lc: crystallite size
$\lambda$: wavelength of an X-ray beam
$\beta$: half width (radian) of a peak
$\theta$: Bragg angle of a diffraction beam The half width of diffraction intensity with respect to 2θ of the main peak in the X-ray diffraction chart of the silicon or tin metal region of the lithium ion-storing/releasing material of the present invention is preferably 0.1° or more, or more preferably 0.2° or more. The crystallite size of silicon or tin of the lithium ion-storing/releasing material of the present invention calculated by using Scherrer's equation described above preferably falls within the range of 20 nm or more and 60 nm or less. In this case, an amorphous region may be included. An insertion/extraction reaction for lithium may occur from a crystal grain boundary. Since silicon or tin crystals have a large number of grain boundaries when being made microcrystalline or amorphous, so that an insertion/extraction reaction for lithium is uniformly performed, thereby increasing battery capacity and improving charge and discharge efficiency. When the crystals are made microcrystalline or amorphous, the structure of the crystal loses its long-range order, so the crystalline structure shows an increased degree of freedom and a reduced change at the time of the insertion of lithium. As a result, the expansion of the structure at the time of the insertion of lithium is also reduced.

The primary particles constituting the composite particles as the powder material in the present invention have an average particle diameter in the range of preferably 1 nm to 500 nm, or more preferably 5 nm to 200 nm.

(Energy Storage Device)

The energy storage device according to the present invention includes a negative electrode using the above-mentioned powder material of the present invention as an active material, an ion conductor (electrolyte), and a positive electrode, and utilizes the oxidation reaction of lithium and the reduction reaction of lithium ions. An electrode structure formed of a lithium ion-storing/releasing material including at least primary particles composed of silicon or tin crystal particles and the oxide of a metal other than silicon and tin is used in the negative electrode. Examples of the energy storage device according to the present invention include a secondary battery and a capacitor.

(Negative Electrode 401)

The negative electrode to be used in the energy storage device of the present invention includes a current collector and an electrode material layer (active material layer) provided on the current collector. The above electrode material layer is formed of the above-mentioned active material using the powder material in the present invention. An electrode structure adopting a schematic sectional structure shown in FIG. 3B or 3A is used as the electrode structure for a negative electrode in the present invention.

The electrode structure shown in FIG. 3B to be used in the negative electrode is produced through the following procedure.

A conductive auxiliary material powder and a binder are mixed into the powder material in the present invention. A solvent for the binder is appropriately added to the mixture, and the mixture is kneaded, whereby slurry is prepared. In this case, a foaming agent such as azodicarbonamide or P,P'-oxybisbenzenesulfonyl dihydrazide which produces a nitrogen gas at the time of heating may be added in order that voids of the electrode layer may be actively formed.

The slurry is applied onto the current collector, whereby the electrode material layer (active material layer) is formed. The layer is dried, whereby the electrode structure is formed. Further, as required, the resultant is dried in the range of 100 to 300° C. under reduced pressure, and the thickness and density of the electrode material layer are adjusted with a pressing machine.

The electrode structure obtained in the above (2) is appropriately cut in accordance with the housing of the energy storage device so that an electrode shape is adjusted. Then, as required, an electrode tab for current extraction is welded to the resultant, whereby the negative electrode is produced.

For example, a coater application method or a screen printing method is applicable as the above application method. Alternatively, the electrode material layer can be formed by press-forming the above powder material as an active material, the conductive auxiliary material, and the binder on the current collector without adding any solvent. It should be noted that the electrode material layer for the negative electrode of the energy storage device of the present invention has density in the range of preferably 0.5 to 3.5 $g/cm^3$, or more preferably 0.9 to 2.5 $g/cm^3$. When the density of the electrode material layer is excessively large, the expansion of the layer at the time of inserting lithium becomes large, so the peeling of the layer from the current collector occurs. In addition, when the density of the electrode material layer is excessively small, the resistance of the electrode increases, so a reduction in charge and discharge efficiency and a voltage drop at the time of the discharging of the battery become remarkable.

When the electrode material slurry to which the foaming agent has been added is used, the foaming agent is decomposed after the application or the drying in an inert atmosphere or under reduced pressure to foam so that voids are formed in the electrode layer. As a result, voids are formed in the resin as the binder in the electrode layer so that the resin is brought into a sponge state. The density of the electrode layer formed into a network structure with the above sponge-like binder is adjusted by pressing. However, in association with the expansion of the active material particles in the electrode layer at the time of charging, the pressed sponge is elongated, that is, the resin as the binder having a network structure is elongated, and the expanded particles are fitted into voids formed by elongation. As a result, even when the expansion and shrinkage are repeated owing to the repetition of the charging and discharging, the resin used as the binder in the electrode layer is inhibited from being broken due to fatigue, whereby the lifetime of the electrode is lengthened.

[Conductive Auxiliary Material for Negative Electrode]

For example, amorphous carbon such as acetylene black or ketjen black, a carbon material such as graphite structure carbon, carbon nanofiber, or carbon nanotube, nickel, copper, silver, titanium, platinum, cobalt, iron, or chromium can be used as the conductive auxiliary material of the electrode material layer (active material layer). The above carbon material is more preferable because the material can retain an electrolyte solution, and has a large specific surface area. A shape selected from, for example, a spherical shape, a flaky shape, a filamentous shape, a fibrous shape, a spike shape, and a needle shape can be preferably adopted as the shape of the above conductive auxiliary material. Further, the adoption of powders having two or more different types of shapes can increase packing density at the time of forming the electrode material layer to reduce the impedance of the electrode structure. The average particle size of (the secondary particles of) the above conductive auxiliary material is preferably 10 μm or less, or more preferably 5 μm or less.

[Current Collector for Negative Electrode]

The current collector of the negative electrode in the present invention serves to efficiently supply a current to be consumed by an electrode reaction at the time of charging or to collect a current to be generated at the time of discharging. In particular, when the electrode structure is applied to the negative electrode of the energy storage device, a material of which the current collector is formed is desirably a material which has high electric conductivity and is inert to the electrode reaction of the energy storage device. A preferable material for the current collector is, for example, at least one type of metal material selected from copper, nickel, iron, stainless steel, titanium, platinum, and aluminum; of these materials, copper is more preferably used because copper is available at a low cost, and has low electrical resistance. Aluminum foil having an increased specific surface area can also be used. In addition, the current collector is of a plate shape; the "plate shape" is not limited in terms of its thickness as long as the shape can be put into practical use, and a shape called "foil" having a thickness of about 5 μm to 100 μm is also included in the category of the shape. When copper foil is used in the above current collector, copper foil appropriately containing, for example, Zr, Cr, Ni, or Si and having high mechanical strength (high proof stress) is particularly preferably used as the copper foil because the copper foil is resistant to the repeated expansion and shrinkage of the electrode layer at the time of charging and discharging. Alternatively, for example, a plate member of a mesh, sponge or fibrous shape, a plate punching metal, a plate metal having a three-dimensional indented pattern formed on the front and rear surfaces, or a plate expanded metal can be adopted. The above plate or foil metal having a three-dimensional indented pattern formed on the surface can be produced, for example, by applying pressure to a metallic or ceramic roll having a microarray pattern or line-and-space pattern on the surface to transfer the pattern onto a plate or foil metal. In particular, an energy storage device adopting a current collector on which a three-dimensional indented pattern has been formed exerts the following effects: the reduction of substantial current density per electrode area at the time of charging and discharging, an improvement in adhesiveness to the electrode layer, an increase in mechanical strength, improvements in charging and discharging current characteristics, and an increase in charging and discharging cycle lifetime.

[Binder for Negative Electrode]

A material for the binder in the active material layer of the negative electrode is, for example, an organic polymer material such as: a fluorine resin such as polytetrafluoroethylene or polyvinylidene fluoride; polyamideimide; polyimide; a polyimide precursor (polyamic acid before being turned into polyimide, or polyamic acid which is incompletely turned into polyimide); a styrene-butadiene rubber; a modified polyvinyl alcohol type resin with its water absorbing property reduced; a polyacrylate type resin; or a polyacrylate type resin-carboxymethylcellulose. When the polyimide precursor (polyamic acid before being turned into polyimide, or polyamic acid which is incompletely turned into polyimide) is used, it is preferable that after the application of the electrode layer, the precursor is subjected to a heat treatment in the range of 150 to 300° C. so that the extent to which the precursor is turned into polyimide is enlarged.

In order that the negative electrode may exert such performance that even after the repetition of charging and discharging, the binding of the active material is maintained and a larger electrical quantity is stored, the content of the above binder in the electrode material layer is preferably 2 to 30 wt %, or more preferably 5 to 20 wt %. When the component ratio of the metal oxide (containing a semimetal oxide) in the active material of the negative electrode is large, the expansion of the volume of the negative electrode layer at the time of charging is small, so a fluorine resin such as polytetrafluoroethylene or polyvinylidene fluoride, or a polymer material such as a styrene-butadiene rubber having the following characteristics may be used as the binder, in which adhesive force is not high, the ratio at which the surface of the active material is coated with the binder is small, and a large surface area effective in a reaction is provided. When the component ratio of a silicon or tin metal in the material layer (active material layer) of the negative electrode is large, the volume expansion at the time of charging is large, so a binder having high adhesive force is preferable. In this case, polyamideimide, polyimide, a polyimide precursor, a modified polyvinyl alcohol type resin, polyvinylidene fluoride, or the like is preferably used as the binder.

(Positive Electrode 402)

The positive electrode 402 serving as a counter electrode for an energy storage device using the above-mentioned active material of the present invention in its negative electrode is roughly classified into the following three cases.

(1) In order that the energy density may be increased, a crystalline lithium-transition metal oxide or a lithium-transition metal phosphate compound having a relatively flat electric potential at the time of discharging is used as an active material for the positive electrode. Ni, Co, Mn, Fe, Cr, or the like is more preferably mainly used as a transition metal element to be incorporated into the above positive electrode active material.

(2) When the power density is intended to be increased as compared with the case of the positive electrode in the above (1), a transition metal oxide, a transition metal phosphate compound, a lithium-transition metal oxide or a lithium-transition metal phosphate compound, which is amorphous, is used as an active material for the positive electrode. The above positive electrode active material has a crystallite size of preferably 10 nm or more and 100 nm or less, or more preferably 10 nm or more and 50 nm or less. An element selected from Mn, Co, Ni, Fe, and Cr is suitably used as a transition metal element serving as the main element of the above positive electrode active material. The above positive electrode active material can increase the power density as compared with the case of the positive electrode in the above (1) probably because the material has small crystal particles and a large specific surface area, and is hence capable of utilizing not only an intercalation reaction for lithium ions but also an adsorption reaction of ions to the surface. The above positive electrode active material is preferably turned into a composite with an oxide or composite oxide mainly formed of an element selected from Mo, W, Nb, Ta, V, B, Ti, Ce, Al, Ba, Zr, Sr, Th, Mg, Be, La, Ca, and Y. As in the case of the negative electrode active material, the crystal particles of the positive electrode active material can be reduced in size by turning the material into a composite with the above oxide, and the extent to which the material is made amorphous is enlarged. In addition, the positive electrode active material is preferably turned into a composite with a carbon material such as amorphous carbon, carbon nanofiber (carbon fibers each having a diameter of the order of nanometers), carbon nanotube, or a graphite powder in order that the electronic conductivity of the positive electrode active material may be improved.

(3) When high power density is intended to be provided, a carbon material which has a large specific surface area and/or is porous such as active carbon, mesoporous carbon (carbon in which a large number of pores in a meso region develop, in other words, a carbon material having a large number of pores in a meso region), carbon nanofiber (carbon fibers each having a diameter of the order of nanometers), carbon nanotube, or graphite with its specific surface area increased by pulverization or the like, or a metal oxide (containing a semimetal oxide) having a large specific surface area is used as an active material for the positive electrode. In this case, at the time of the assembly of the cell of the energy storage device, lithium must be stored in the negative electrode in advance, or lithium must be stored in the positive electrode in advance. A method of storing lithium is a method involving bringing a lithium metal into contact with the negative electrode or positive electrode to result in short-circuit so that lithium is introduced, or a method involving introducing lithium in the form of a lithium-metal oxide or lithium-semimetal oxide into the active material.

In addition, the power density can be additionally increased by making the above positive electrode active material porous. Further, the material in the above (3) may be turned into a composite. When the above positive electrode active material does not contain lithium which can be deintercalated, lithium must be stored by, for example, bringing metal lithium into contact with the negative electrode or positive electrode in advance as in the case of the above (3). In addition, the positive electrode active material in each of the above (1), (2), and (3) can be turned into a composite with a polymer capable of electrochemically storing ions such as a conductive polymer.

(Positive Electrode Active Material)

An oxide or phosphate compound of a transition metal element such as Co, Ni, Mn, Fe, or Cr which can be used in a lithium secondary battery can be used as the crystalline lithium-transition metal oxide or lithium-transition metal phosphate compound to be used in the positive electrode active material in the above (1). The above compound can be obtained by mixing a lithium salt or lithium hydroxide and a salt of the transition metal at a predetermined ratio (and, furthermore, adding phosphoric acid or the like when the phosphate compound is prepared) and subjecting the mixture to a reaction at a high temperature of 700° C. or higher. Alternatively, the fine powder of the above positive electrode active material can be obtained by employing an approach such as a sol-gel method.

A lithium-transition metal oxide, lithium-transition metal phosphate compound, transition metal oxide, or transition metal phosphate compound the transition metal element of which is Co, Ni, Mn, Fe, Cr, V, or the like is used as the positive electrode active material in the above (2), and the material preferably has an amorphous phase having a small crystallite size. A transition metal oxide or transition metal phosphate compound having the above amorphous phase is obtained by making amorphous a lithium-transition metal oxide, lithium-transition metal phosphate compound, transition metal oxide, or transition metal phosphate compound, which is crystalline, by mechanical milling using, for example, a planetary ball mill, a vibrating mill, or an attritor. A lithium-transition metal oxide, lithium-transition metal phosphate compound, transition metal oxide, or transition metal phosphate compound which is amorphous can be prepared also by directly mixing raw materials with the above mill, subjecting the mixture to mechanical alloying and appropriately subjecting the resultant to heat treatment. Alternatively, such amorphous material can be obtained by subjecting, for example, an oxide obtained by a reaction in a sol-gel method from a solution of a salt, a complex, and an alkoxide as raw materials to heat treatment in the temperature range of preferably 100 to 700° C., or more preferably 150 to 550° C. Heat treatment at a temperature in excess of 700° C. reduces the pore volume of the above transition metal oxide to promote the crystallization of the oxide, with the result that the specific surface area is reduced and charge and discharge characteristics at high current density deteriorate. The positive electrode active material has a crystallite size of preferably 100 nm or less, or more preferably 50 nm or less. A positive electrode in which reactions for the intercalation and deintercalation of lithium ions, and for the adsorption and extraction of lithium ions are quicker, is produced from a positive electrode active material having such a crystallite size.

Examples of the carbon material which has a large specific surface area and/or is porous, to be used as the positive electrode active material in the above (3), include a carbon material obtained by carbonizing an organic polymer under an inert gas atmosphere and a carbon material obtained by forming pores in the carbonized material by treatment with an alkali or the like. Mesoporous carbon obtained by inserting an organic polymer material into a mold made of, for example, an oxide in which pores are aligned, produced in the presence of an amphiphilic surfactant to carbonize the material and removing a metal oxide by etching, can also be used as the positive electrode active material. The above carbon material preferably has a specific surface area in the range of 10 to 3,000 $m^2/g$. A transition metal oxide having a large specific surface area such as a manganese oxide as well as the above carbon material can be used.

In addition, the positive electrode active material in the present invention having high energy density and a certain degree of power density is composed of an active material selected from a lithium-transition metal oxide, a lithium-transition metal phosphate compound, a transition metal oxide and a transition metal phosphate compound whose transition metal elements are Co, Ni, Mn, Fe, Cr, V, or the like. The active material is composed of particles each having an amorphous phase, and is turned into a composite with an oxide or composite oxide whose main component is an element selected from Mo, W, Nb, Ta, V, B, Ti, Ce, Al, Ba, Zr, Sr, Th, Mg, Be, La, Ca, and Y. The oxide or composite oxide added for forming the composite accounts for preferably 1 wt % or more and 20 wt % or less, or more preferably 2 wt % or more and 10 wt % or less of the above entire positive electrode active material turned into the composite. When the oxide or composite oxide for forming the composite is incorporated to exceed the above weight range, the battery capacity of the positive electrode is lowered. The contribution of the above oxide or composite oxide to the charge and discharge electrical quantity is desirably 20% or less. Since the particle size of the above positive electrode active material can be reduced by turning the positive electrode active material into a composite as in the case of the negative electrode material in the present invention, the ratio at which the positive electrode active material is utilized in charging and discharging increases, and an electrochemical reaction in charging and discharging occurs in a more uniform and quick fashion. As a result, both the energy density and power density increase. In addition, the above oxide is desirably a lithium ion conductor such as a composite oxide with lithium.

At the time of the above formation of the composite, it is also preferable that the positive electrode material is further turned into a composite with a carbon material such as amorphous carbon, mesoporous carbon (carbon material having a large number of pores in a meso region), carbon nanofiber (carbon fibers each having a diameter of the order of nanometers), carbon nanotube, or graphite with its specific surface area increased by pulverization treatment or the like.

Further, a mixture of two or more types of materials selected from the materials in the above (1), (2), and (3) may be used as the above positive electrode active material.

Method of Producing Positive Electrode:

The positive electrode to be used in the energy storage device of the present invention is produced by forming an electrode material layer (layer of a positive electrode active material) on a current collector. The electrode structure 307 having a schematic sectional structure shown in FIG. 3B described for the negative electrode and adopting the above-mentioned positive electrode active material instead of the material powder particles 303 each containing silicon or tin microcrystals is used in the positive electrode of the present invention.

The electrode structure to be used in the positive electrode is produced by the following procedure.

(1) A conductive auxiliary material powder and a binder are mixed with the positive electrode active material. A solvent for the binder is appropriately added to the mixture, and the mixture is kneaded, whereby slurry is prepared.

(2) The slurry is applied onto the current collector, whereby the electrode material layer (active material layer) is formed. The layer is dried, whereby the electrode structure is formed. Further, as required, the resultant is dried in the range of 100 to 300° C. under reduced pressure, and the thickness and density of the electrode material layer are adjusted with a pressing machine.

(3) The electrode structure obtained in the above (2) is appropriately cut in accordance with the housing of the energy storage device so that an electrode shape is adjusted. Then, as required, an electrode tab for current extraction is welded to the resultant, whereby the positive electrode is produced.

For example, a coater application method or a screen printing method is applicable as the above application method. Alternatively, the electrode material layer can be formed by press-forming the above positive electrode active material, the conductive auxiliary material and the binder on the current collector without adding any solvent. It should be noted that the electrode material layer of the present invention has density in the range of preferably 0.5 to 3.5 g/cm$^3$, or more preferably 0.6 to 3.5 g/cm$^3$. In the above density range of the electrode layer, the density of the electrode layer is set to be low in the case of an electrode for high power density, and the density of the electrode layer is set to be high in the case of an electrode for high energy density.

[Conductive Auxiliary Material for Positive Electrode]

The same material as the conductive auxiliary material for the negative electrode can be used.

[Current Collector for Positive Electrode]

The current collector of the positive electrode of the present invention also serves to efficiently supply a current to be consumed by an electrode reaction at the time of charging or to collect a current to be generated at the time of discharging as in the case of the negative electrode. In particular, when the electrode structure is applied to the positive electrode of a secondary battery, a material of which the current collector is formed is desirably a material which has a high electric conductivity and is inert to a cell reaction. A preferable material for the current collector is, for example, at least one type of metal material selected from aluminum, nickel, iron, stainless steel, titanium, and platinum; of these materials, aluminum is more preferably used because aluminum is available at a low cost and has low electrical resistance. In addition, the current collector is of a plate shape; the "plate shape" is not limited in terms of its thickness as long as the current collector can be put into practical use, and a shape called "foil" having a thickness of about 5 μm to 100 μm is also included in the category of the shape. Alternatively, for example, a plate member of a mesh, sponge or fibrous shape, a plate punching metal, a plate metal having a three-dimensional indented pattern formed on the front and rear surfaces, or a plate expanded metal can be adopted. The above plate or foil metal having a three-dimensional indented pattern formed on the surface can be produced, for example, by applying pressure to a metallic or ceramic roll having a microarray pattern or line-and-space pattern on the surface to transfer the pattern onto a plate or foil metal. In particular, an energy storage device adopting a current collector on which a three-dimensional indented pattern has been formed exerts the following effects: the reduction of a substantial current density per electrode area at the time of charging and discharging, an improvement in adhesiveness to the electrode layer, an increase in mechanical strength, improvements in charging and discharging current characteristics, and an increase in charging and discharging cycle lifetime.

[Binder for Positive Electrode]

The binder for the negative electrode can be used also as a binder for the positive electrode. In order that a surface area effective in the reaction of the active material may be enlarged, a polymer material with which the surface of the active material is difficult to coat, for example, a fluorine resin such as polytetrafluoroethylene or polyvinylidene fluoride; styrene-butadiene rubber; modified acrylic resin; polyimide; or polyamideimide is preferably used as the binder. In order that the positive electrode may exert such performance that even after repeating charging and discharging, the binding of the active material is maintained, and a larger electrical quantity is stored, the content of the above binder in the electrode material layer (active material layer) of the positive electrode is preferably 1 to 20 wt %, or more preferably 2 to 10 wt %.

(Ion Conductor 403)

A lithium ion conductor such as a separator holding an electrolyte solution (electrolyte solution prepared by dissolving an electrolyte in a solvent), a solid electrolyte, a solidified electrolyte obtained by causing an electrolyte solution to gel with polymer gel or the like, a composite of polymer gel and a solid electrolyte, or an ionic liquid can be used as the ion conductor of the lithium secondary battery of the present invention.

The conductivity of the ion conductor to be used in the secondary battery of the present invention at 25° C. is preferably $1 \times 10^{-3}$ S/cm or more, or more preferably $5 \times 10^{-3}$ S/cm or more.

Examples of the electrolyte include salts each formed of lithium ions (Li$^+$) and Lewis acid ions (BF$_4^-$, PF$_6^-$, AsF$_6^-$, ClO$_4^-$, CF$_3$SO$_3^-$, or BPh$_4^-$ (Ph: phenyl group)) and a mixture of these salts, and ionic liquids. Each of the above salts is desirably dehydrated and deoxygenated sufficiently by heating under reduced pressure. Further, an electrolyte prepared by dissolving any one of the above lithium salts in an ionic liquid can also be used.

As a solvent of the electrolyte, the following can be used: for example, acetonitrile, benzonitrile, propylene carbonate, ethylene carbonate, dimethyl carbonate, diethyl carbonate, ethyl methyl carbonate, dimethyl formamide, tetrahydrofuran, nitrobenzene, dichloroethane, diethoxyethane, 1,2-dimethoxyethane, chlorobenzene, γ-butyrolactone, dioxolane, sulfolane, nitromethane, dimethyl sulfide, dimethyl sulfoxide, methyl formate, 3-methyl-2-oxydazolidinone, 2-methyltetrahydrofuran, 3-propylsydnone, sulfur dioxide, phosphoryl chloride, thionyl chloride, sulfuryl chloride, or a mixture thereof. Further, an ionic liquid can also be used.

The above solvent is desirably dehydrated with, for example, active alumina, a molecular sieve, phosphorus pentoxide, or calcium chloride; depending on the type of solvent, the solvent is desirably distilled in the coexistence of an alkali metal in an inert gas so that impurities are removed from the solvent and the solvent is dehydrated. The electrolyte concentration of the electrolyte solution prepared by dissolving the electrolyte in the solvent preferably falls within the range of 0.5 to 3.0 mol/l in order that the electrolyte solution may have high ionic conductivity.

In addition, it is also preferable to add a vinyl monomer which easily undergoes an electropolymerization reaction to the above electrolyte solution in order that a reaction between the electrode and the electrolyte solution may be suppressed. The addition of the vinyl monomer to the electrolyte solution results in the formation of a polymerized coating film capable of functioning as a solid electrolyte interface (SEI) or passivating film on the surface of the above active material for the electrode in a charging reaction for the battery, whereby the charging and discharging cycle lifetime can be lengthened. When the amount in which the vinyl monomer is added to the electrolyte solution is excessively small, the above effect does not appear. When the amount is excessively large, the ionic conductivity of the electrolyte solution is reduced, and the thickness of the polymerized coating film to be formed at the time of charging increases, so the resistance of the electrode increases. Accordingly, the amount in which the vinyl monomer is added to the electrolyte solution preferably falls within the range of 0.5 to 5 wt %.

Specific and preferable examples of the vinyl monomer include styrene, 2-vinylnaphthalene, 2-vinylpyridine, N-vinyl-2-pyrrolidone, divinyl ether, ethyl vinyl ether, vinyl phenyl ether, methyl methacrylate, methyl acrylate, acrylonitrile, and vinylene carbonate. More preferable examples include styrene, 2-vinylnaphthalene, 2-vinylpyridine, N-vinyl-2-pyrrolidone, divinyl ether, ethyl vinyl ether, vinyl phenyl ether, and vinylene carbonate. Those vinyl monomers are preferred when having an aromatic group, because the affinity thereof with lithium ions is high. Further, it is also preferred to use N-vinyl-2-pyrrolidone, divinyl ether, ethyl vinyl ether, vinyl phenyl ether, vinylene carbonate, or the like, which has high affinity with the solvent of the electrolyte, in combination with the vinyl monomer having an aromatic group.

A solid electrolyte or a solidified electrolyte is preferably used in order that the electrolyte solution may be prevented from being leaked. Examples of the solid electrolyte include: glass such as an oxide formed of a lithium element, a silicon element, an oxygen element, and a phosphorus element or a sulfur element; and a polymer complex of an organic polymer having an ether structure. The solidified electrolyte is preferably a product obtained by causing the electrolyte solution to gel with a gelling agent to solidify. A porous material having large liquid absorption which absorbs the solvent of the electrolyte solution to swell, such as a polymer or silica gel, is desirably used as the gelling agent. Polyethylene oxide, polyvinyl alcohol, polyacrylonitrile, polymethyl methacrylate, a vinylidene fluoride-hexafluoropropylene copolymer, or the like is used as the above polymer. Further, the above polymer more preferably has a crosslinked structure.

The separator functioning also as a holding member for the electrolyte solution as an ion conductor serves to prevent short-circuit due to direct contact between the negative electrode 401 and the positive electrode 403 in the energy storage device. The separator should have a large number of pores through which lithium ions can move and be insoluble in, and stable against, the electrolyte solution. Therefore, a film of a micropore structure or non-woven fabric structure having fine pores and made of a material such as glass, polyolefin such as polypropylene or polyethylene, fluorine resin, cellulose, or polyimide is suitably used as the separator. Alternatively, a metal oxide film having fine pores, or a resin film turned into a composite with a metal oxide can be used.

Assembly of the Energy Storage Device:

The above energy storage device is assembled by superposing the ion conductor 403, the negative electrode 401 and the positive electrode 402 so that the conductor is interposed between the electrodes to form a group of electrodes, inserting the group of electrodes into the battery case 406 under a dry air or dry inert gas atmosphere with the dew point temperature sufficiently controlled, connecting the respective electrodes and respective electrode terminals after the insertion, and hermetically sealing the battery case 406. When a product obtained by causing a microporous polymer film to hold the electrolyte solution is used as the ion conductor, the battery is assembled by interposing the microporous polymer film as a separator for preventing short-circuit between the negative electrode and the positive electrode to form a group of electrodes, inserting the group of electrodes into the battery case; connecting the respective electrodes and the respective electrode terminals, injecting the electrolyte solution into the battery case and hermetically sealing the battery case.

As described above, the discharge voltage, battery capacity, power density, and energy density of the energy storage device of the present invention can be optimally designed in accordance with applications by using the material capable of storing and releasing lithium ions in the present invention in the negative electrode of the device and appropriately selecting a material for the positive electrode of the device from the above-mentioned types of materials. As a result, an energy storage device having high power density and high energy density can be obtained.

In an application in which the highest priority is given to high energy density, and a certain level of high power density is required, and besides, a certain degree of quick charging and discharging are required, a crystalline lithium-transition metal oxide or lithium-transition metal phosphate compound is adopted as an active material for the positive electrode in the energy storage device of the present invention. As a result, an energy storage device having high energy density and a certain level of high power density can be provided.

In an application in which both high energy density and high power density are required, a transition metal oxide having an amorphous phase is adopted as an active material for the positive electrode in the energy storage device of the present invention, so that an energy storage device having a certain level of high energy density and a certain level of high power density can be provided.

In an application in which the highest priority is given to high power density and quick charging, and a certain level of high energy density is required, a carbon material or metal oxide which has a large specific surface area and/or is porous is adopted as an active material for the positive electrode in the energy storage device of the present invention, so that an energy storage device having a high power density and a somewhat high energy density can be provided. Further, a product obtained by turning the powder material of the material capable of storing and releasing lithium ions of the present invention into a composite with the carbon material which has a large specific surface area and/or is porous may be adopted for the negative electrode.

Therefore, in the case of an energy storage device using an electrode structure formed of the powder material of the present invention in its negative electrode, an energy storage device having optimum energy density, optimum power density, and optimum charge and discharge characteristics can be produced by selecting the component ratio of the powder material and selecting a positive electrode formed of an optimum positive electrode active material species in accordance with desired characteristics.

[Shape and Structure of Cell]

The cell shape of the energy storage device of the present invention is specifically, for example, a flat shape, a cylindrical shape, a rectangular shape, or a sheet shape. In addition, the cell structure is of, for example, a monolayer type, a multilayer type, or a spiral type. Of those, a spiral, cylindrical cell has the following characteristics: a separator is sandwiched between and wound with a negative electrode and a positive electrode, so an electrode area can be increased, and a large current can be flowed at the time of charging and discharging. In addition, a rectangular cell or sheet cell has the following characteristic: the storage space of an instrument in which multiple cells are placed can be effectively utilized.

Figure 5:
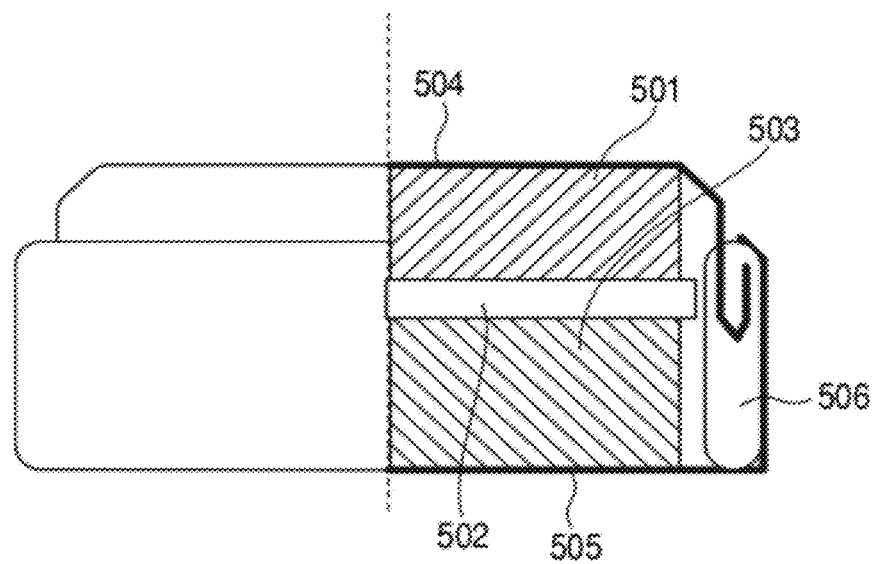
FIG. 5 is a schematic cell sectional view of a monolayer, flat (coin) type energy storage device.
Figure 6:
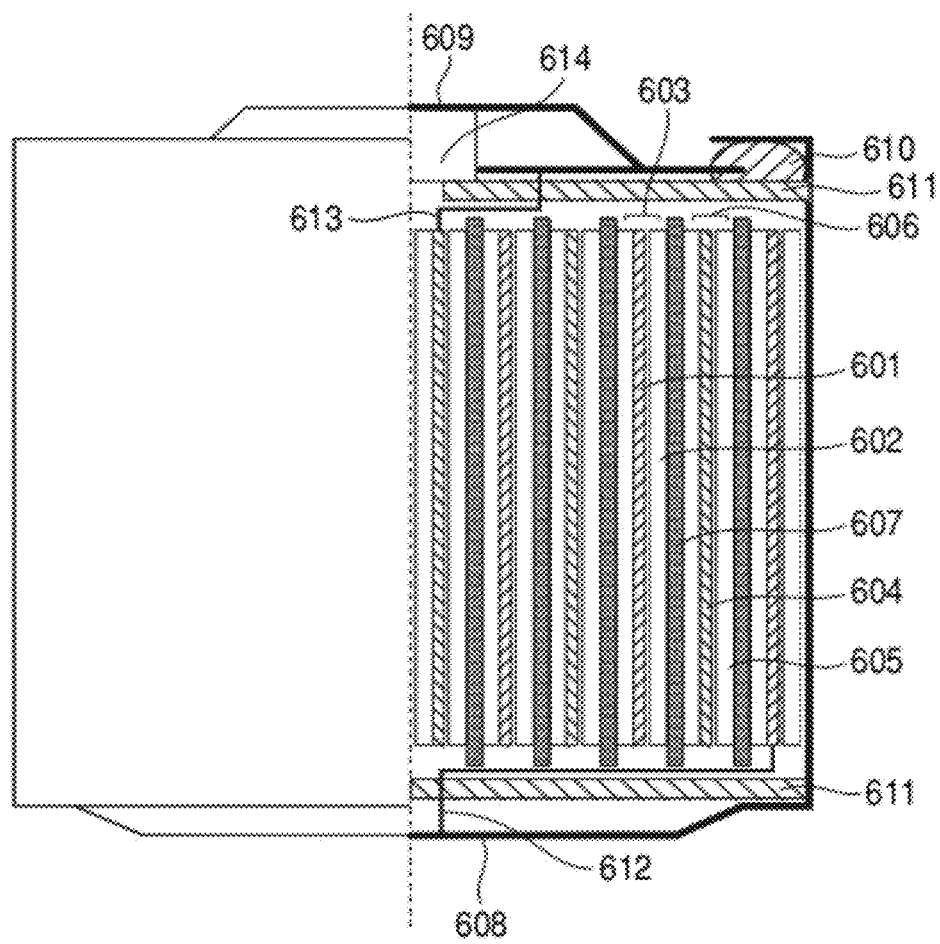
FIG. 6 is a schematic cell sectional view of a spiral, cylindrical energy storage device.

Hereinafter, the shape and structure of a cell will be described in more detail with reference to FIGS. 5 and 6. FIG. 5 is a sectional view of a monolayer, flat (coin type) cell, and FIG. 6 is a sectional view of a spiral, cylindrical cell. An energy storage device having such a shape as described above is basically of the same constitution as shown in FIG. 4, and has a negative electrode, a positive electrode, an ion conductor, a battery case (cell housing), and an output terminal.

In FIGS. 5 and 6, reference numerals 501 and 603 each denote a negative electrode; 503 and 606, a positive electrode; 504 and 608, a negative electrode terminal (a negative electrode cap or a negative electrode can); 505 and 609, a positive electrode terminal (a positive electrode can or a positive electrode cap); 502 and 607, an ion conductor; 506 and 610, a gasket; 601, a negative electrode current collector; 604, a positive electrode current collector; 611, an insulating plate; 612, a negative electrode lead; 613, a positive electrode lead; and 614, a safety valve.

In the flat (coin) type cell as shown in FIG. 5, the positive electrode 503 including a positive electrode material layer and the negative electrode 501 including a negative electrode material layer are superposed through, for example, the ion conductor 502 formed of a separator holding at least an electrolyte solution. Such a laminate is placed in the positive electrode can 505 as a positive electrode terminal from the positive electrode side, and the negative electrode side is covered with the negative electrode cap 504 as a negative electrode terminal. In addition, the gasket 506 is placed at the other portion in the positive electrode can.

In the spiral, cylindrical cell as shown in FIG. 6, the positive electrode 606 having a positive electrode active material layer 605 formed on the positive electrode current collector 604 and the negative electrode 603 having a negative electrode active material layer 602 formed on the negative electrode current collector 601 are opposite to each other through, for example, the ion conductor 607 formed of a separator holding at least an electrolyte solution, and the combination of the positive electrode, the ion conductor, and the negative electrode is wound up multiple times, whereby a laminate of a cylindrical structure is formed.

The laminate of a cylindrical structure is placed in the negative electrode can 608 as a negative electrode terminal. In addition, the positive electrode cap 609 as a positive electrode terminal is provided on the opening portion side of the negative electrode can 608, and the gasket 610 is placed at the other portion in the negative electrode can. The electrode laminate of a cylindrical structure is separated from the side of the positive electrode cap through the insulating plate 611. The positive electrode 606 is connected to the positive electrode cap 609 through the positive electrode lead 613. In addition, the negative electrode 603 is connected to the negative electrode can 608 through the negative electrode lead 612. The safety valve 614 for adjusting the internal pressure of the cell is provided on the side of the positive electrode cap. The above-mentioned electrode structure of the present invention is used in the negative electrode 603.

Hereinafter, an example of a method of assembling the energy storage device shown in FIG. 5 or 6 will be described.

(1) The separator (502 or 607) is sandwiched between the negative electrode (501 or 603) and the formed positive electrode (503 or 606), and the resultant is incorporated into the positive electrode can (505) or the negative electrode can (608).

(2) After the electrolyte solution has been injected, the negative electrode cap (504) or the positive electrode cap (609) and the gasket (506 or 610) are assembled.

(3) The product obtained in the above (2) is caulked, whereby an energy storage device is completed.

It should be noted that the preparation of a material for the above-mentioned energy storage device, and the assembly of the cell are desirably performed in dry air or a dry inert gas from which moisture has been sufficiently removed.

The members constituting such an energy storage device as described above will be described.

(Gasket)

For example, a fluorine resin, a polyolefin resin, a polyamide resin, a polysulfone resin, and various types of rubbers can be used as a material for the gasket (506 or 610). A method such as glass sealing, an adhesive, welding, or soldering as well as "caulking" using the gasket as shown in FIG. 5 or 6 is employed as a method of sealing the cell. In addition, various types of organic resin materials or ceramics are used as a material for the insulating plate (611) shown in FIG. 6.

(External Can)

The external can of a cell is composed of the positive electrode can or negative electrode can (505 or 608) of the cell, and the negative electrode cap or positive electrode cap (504 or 609) of the cell. Stainless steel is suitably used as a material for the external can. An aluminum alloy, a titanium clad stainless metal, a copper clad stainless metal, a nickel-plated steel plate, or the like is also frequently used as another material for the external can.

Stainless steel described above is preferable because the positive electrode can (605) doubles as the battery case (cell housing) and the terminal in FIG. 5, and the negative electrode can (608) doubles as the battery case (cell housing) and the terminal in FIG. 6; provided that when the positive electrode can or the negative electrode can does not double as the battery case and the terminal, in addition to stainless steel, a metal such as zinc, a plastic such as polypropylene, a composite of a metal or glass fiber and plastic, or a film obtained by superposing a plastic film on metal foil made of aluminum or the like can be used as a material for the battery case.

(Safety Valve)

The lithium secondary battery is provided with a safety valve as a security measure when the internal pressure of the battery increases. For example, rubber, a spring, a metal ball, or rupture foil can be used as the safety valve.

EXAMPLES

Hereinafter, the present invention will be described in more detail by way of examples.

[Preparation of an Electrode Material (Active Material) for the Negative Electrode of the Energy Storage Device]

An example of a method of preparing a powder material to be used as an active material for the negative electrode of the energy storage device in the present invention will be given below.

Examples of Procedure for Preparation of Powder Material Preparation by Thermal Plasma Method Here, nanoparticles serving as a negative electrode material were synthesized with a radiofrequency (RF) inductively coupled thermal plasma-generating apparatus in accordance with the following procedure. The above inductively coupled thermal plasma-generating apparatus is constituted of a reactor connected with a vacuum pump and a thermal plasma torch. The thermal plasma torch is provided with a gas introducing portion for generating plasma and a raw material powder-introducing portion at one end of a water-cooled torch composed of a quartz double tube, and is connected to the reactor. An induction coil for applying radiofrequency is provided outside the torch. The pressure in the reactor connected with the torch is reduced with the vacuum pump, a gas for generating plasma such as an argon gas is flowed at a predetermined flow rate from the gas-introducing portion, and a radiofrequency of 3 to 40 MHz (4 MHz in general) is applied to the induction coil, whereby plasma is inductively generated in the torch by a magnetic field generated by a radiofrequency current. Next, a raw material is introduced into the generated plasma to react, thereby preparing silicon nanoparticles. When the raw material is a solid powder material, the raw material is introduced together with a carrier gas.

Example TP1

The above radiofrequency (RF) inductively coupled thermal plasma-generating apparatus was used. First, the inside of the reactor was evacuated to a vacuum with the vacuum pump, and an argon gas and a hydrogen gas as gases for generating plasma were flowed at flow rates of 200 liters/min and 10 liters/min, respectively, and the total pressure of the gases was controlled to 50 kPa. A radiofrequency of 4 kHz was applied to the induction coil with an electric power of 80 kW so that plasma was generated. Next, a powder raw material obtained by mixing 97 parts by weight of a silicon powder having an average particle diameter of 4 μm and 3 parts by weight of zirconia having an average particle diameter of 1 μm was fed into the thermal plasma at a feeding rate of about 500 g/h together with an argon gas flowed at a flow rate of 15 liters/min as a carrier gas. The raw material was subjected to a reaction for a predetermined reaction time, whereby a fine powder material was obtained. Then, the application of the radiofrequency was stopped, the introduction of the gases for generating plasma was stopped, and slow oxidation was carried out. After that, nanoparticles were taken out. It should be noted that the slow oxidation was performed by flowing an argon gas containing oxygen as an impurity and having a purity of 999.99% into the reactor.

The material powder obtained by the above method was irradiated with an ultrasonic wave in isopropyl alcohol so as to be dispersed. The resultant droplets were dropped to a microgrid obtained by coating a copper mesh with a carbon membrane having pores, and were dried, whereby a sample for observation with an electron microscope was produced. The shape of the above composite powder was observed by using the sample for observation with a scanning electron microscope (SEM), a scanning transmission electron microscope (STEM), or a transmission electron microscope (TEM), and the composite powder was analyzed for its composition by using the sample with an energy dispersive characteristic X-ray spectrometer (EDX).

Figure 7:
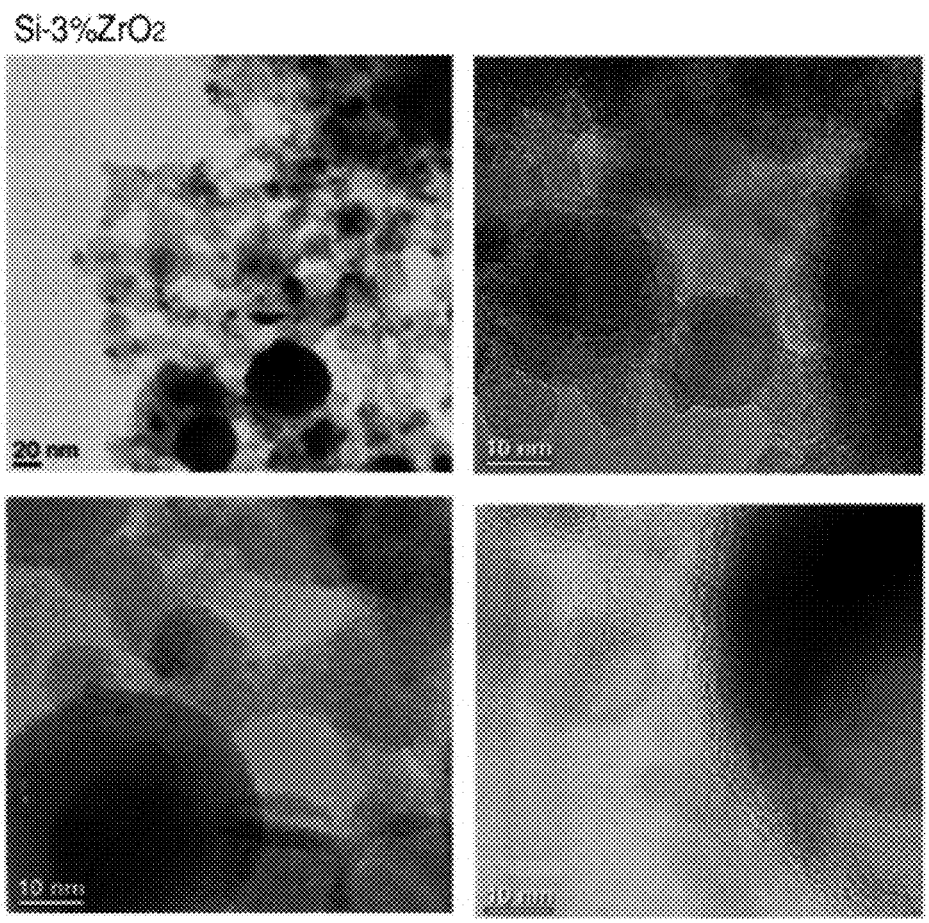
FIG. 7 is an image as a result of observation with an electron microscope in Example TP1.

FIG. 7 shows the bright field image and high-resolution image of the resultant powder with a TEM. In the high-resolution image of FIG. 7, lattice fringes of silicon were observed. In the TEM image of FIG. 7, an amorphous phase having a thickness of several nanometers to ten nanometers was observed on the surface of crystalline silicon having a diameter of 10 nm to 80 nm.

Example TP2

Nanoparticles were obtained by the same operations as in Example TP1 described above except that a powder raw material obtained by mixing 95 parts by weight of a silicon powder having an average particle diameter of 4 μm and 5 parts by weight of zirconia having an average particle diameter of 1 μm was used instead of the powder raw material obtained by mixing 97 parts by weight of a silicon powder having an average particle diameter of 4 μm and 3 parts by weight of zirconia having an average particle diameter of 1 μm.

Figure 8:
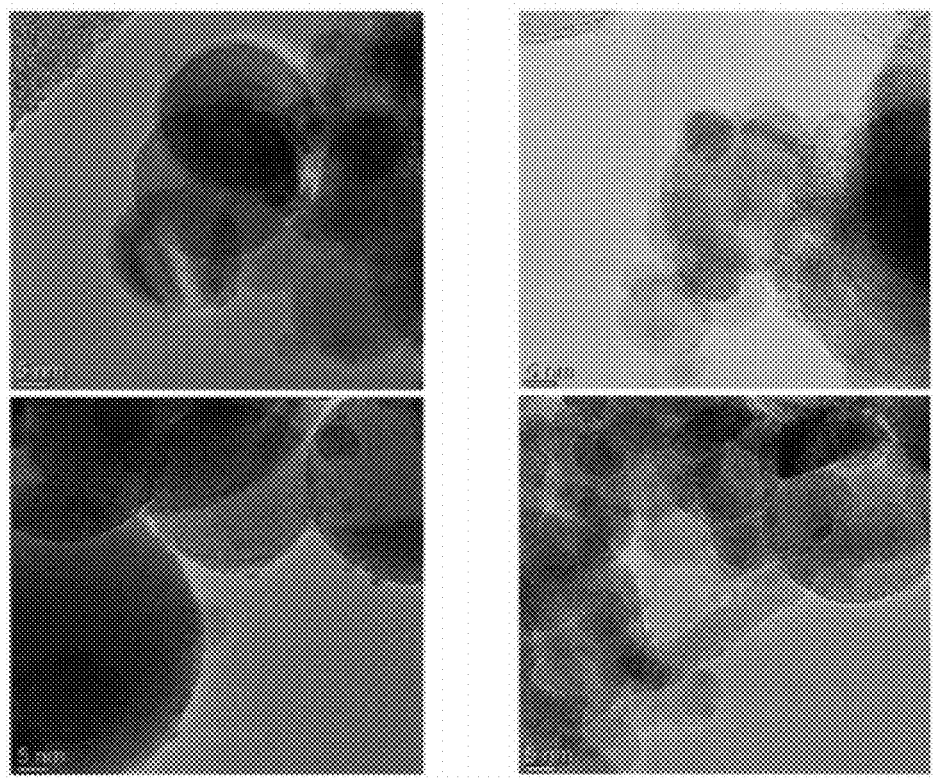
FIG. 8 is an image as a result of observation with an electron microscope in Example TP2.

FIG. 8 shows the high-resolution image of the resultant powder with a TEM.

In the high-resolution image with a TEM of FIG. 8, an amorphous phase having a thickness of 0.5 nm to 5 nm was observed on the surface of crystalline silicon having a diameter of 5 nm to 100 nm.

Comparison between the results of X-ray photoelectron spectroscopy (XPS) of Examples TP1 and TP2 (see FIG. 17) showed that the amount of silicon oxide of Example TP2 was small, and that an increase in the amount of zirconia $ZrO_2$ as a raw material could suppress the oxidation of silicon.

Metal zirconium can also be used as a raw material for the Zr element of each of Examples TP1 and TP2 described above, though zirconia cheaper than the metal was used in the Examples.

Example TP3

Nanoparticles were obtained by the same operations as in Example TP1 described above except that a powder raw material obtained by mixing 97 parts by weight of a silicon powder having an average particle diameter of 4 μm and 3 parts by weight of lanthanum oxide having an average particle diameter of 10 μm was used instead of the powder raw material obtained by mixing 97 parts by weight of a silicon powder having an average particle diameter of 4 μm and 3 parts by weight of zirconia having an average particle diameter of 1 μm.

Figure 9:
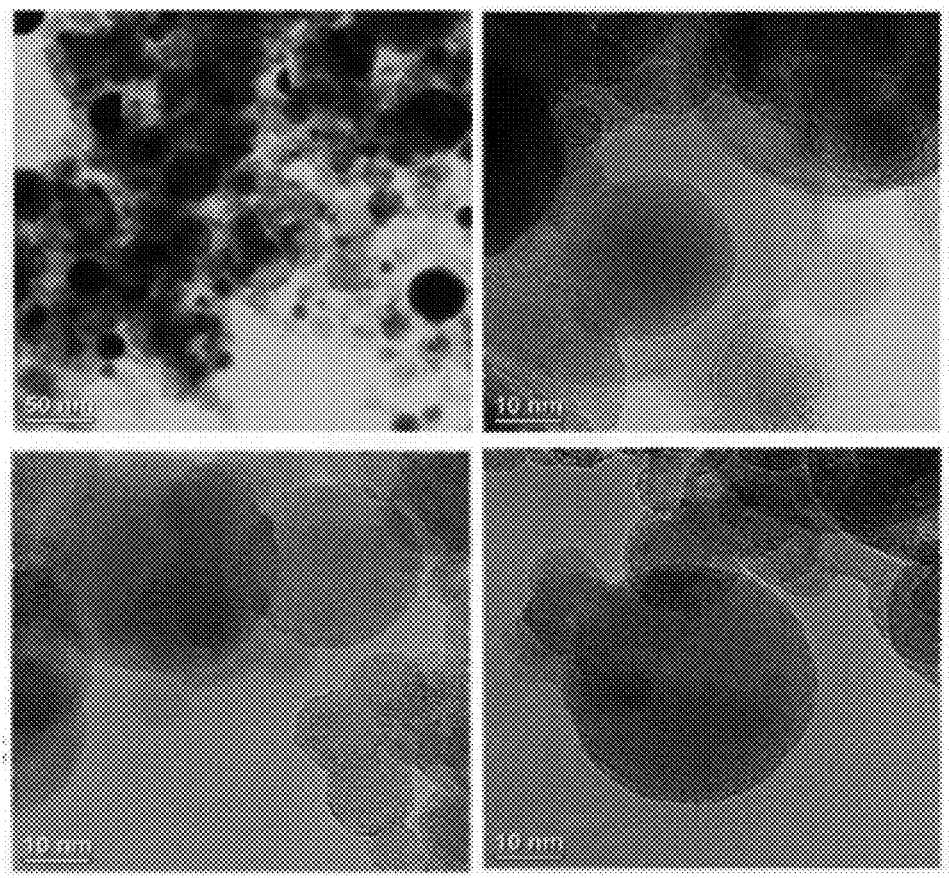
FIG. 9 is an image as a result of observation with an electron microscope in Example TP3.

FIG. 9 shows the bright field image and high-resolution image of the resultant powder with a TEM. In the high-resolution image with a TEM of FIG. 9, an amorphous phase having a thickness of 1 nm to 5 nm was observed on the surface of crystalline silicon having a diameter of 10 nm to 50 nm.

Example TP4

Nanoparticles were obtained by the same operations as in Example TP1 described above except that a powder raw material obtained by mixing 97 parts by weight of a silicon powder having an average particle diameter of μm and 3 parts by weight of calcium oxide having an average particle diameter of 5 μm was used instead of the powder raw material obtained by mixing 97 parts by weight of a silicon powder having an average particle diameter of 4 μm and 3 parts by weight of zirconia having an average particle diameter of 1 μm.

Figure 10:
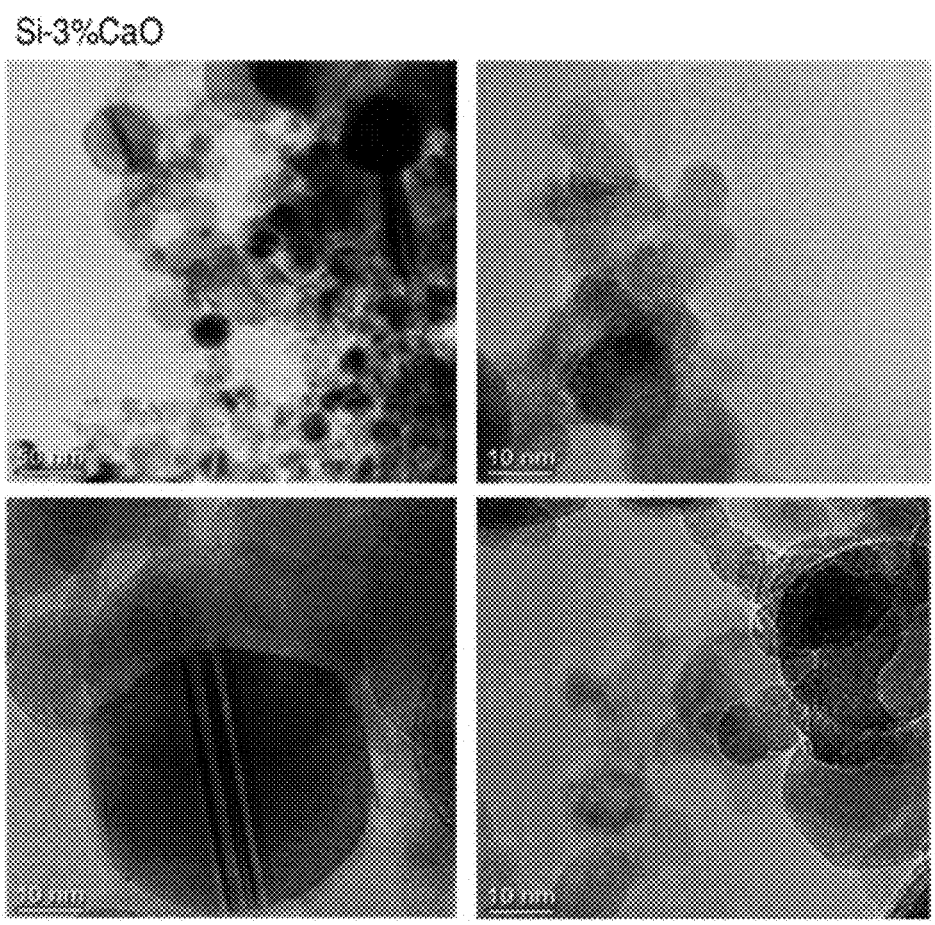
FIG. 10 is an image as a result of observation with an electron microscope in Example TP4.

FIG. 10 shows the bright field image and high-resolution image of the resultant powder with a TEM. In the high-resolution image with a TEM of FIG. 10, an amorphous phase having a thickness of several nanometers was observed on the surface of crystalline silicon having a diameter of 10 nm to 50 nm.

Example TP5

Nanoparticles were obtained by the same operations as in Example TP1 described above except that a powder raw material obtained by mixing 97 parts by weight of a silicon powder having an average particle diameter of 4 μm and 3 parts by weight of magnesia having an average particle diameter of 10 μm was used instead of the powder raw material obtained by mixing 97 parts by weight of a silicon powder having an average particle diameter of 4 μm and 3 parts by weight of zirconia having an average particle diameter of 1 μm.

Figure 11:
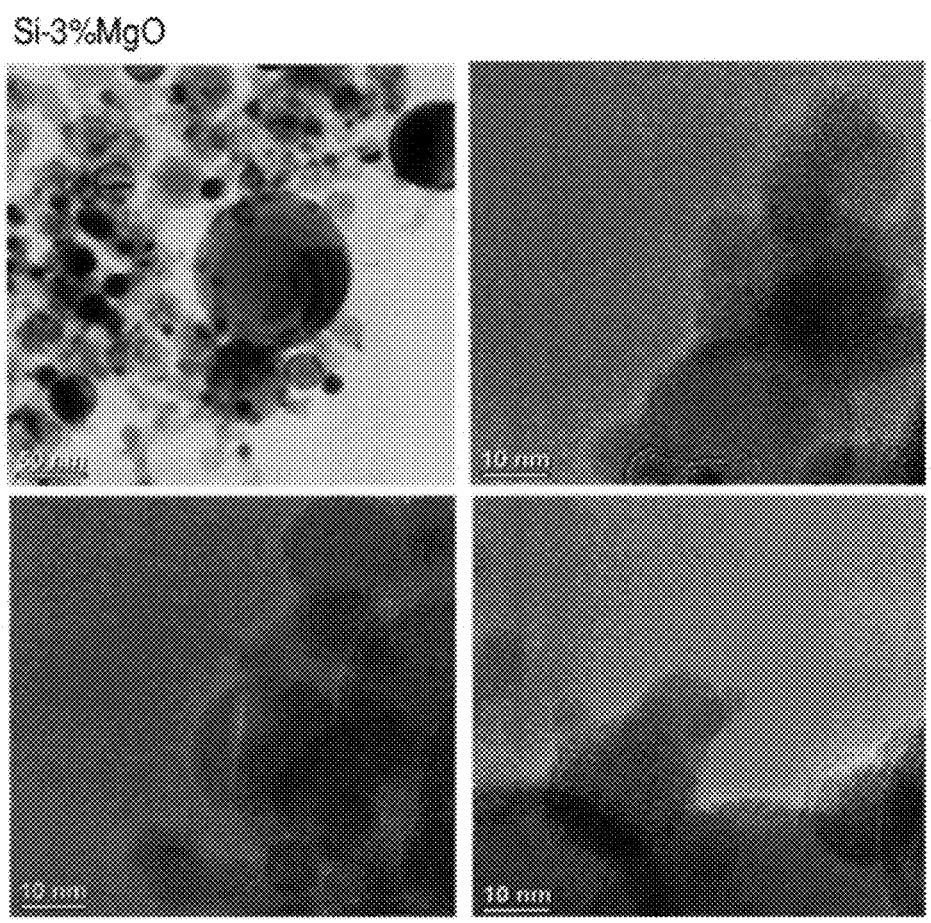
FIG. 11 is an image as a result of observation with an electron microscope in Example TP5.

FIG. 11 shows the bright field image and high-resolution image of the resultant powder with a TEM. In the high-resolution image with a TEM of FIG. 11, an amorphous phase having a thickness of several nanometers was observed on the surface of crystalline silicon having a diameter of 10 nm to 100 nm.

Example TP6

Nanoparticles were obtained by the same operations as in Example TP1 described above except that a powder raw material obtained by mixing 95 parts by weight of a silicon powder having an average particle diameter of 4 μm and 5 parts by weight of alumina having an average particle diameter of 1 μm was used instead of the powder raw material obtained by mixing 97 parts by weight of a silicon powder having an average particle diameter of 4 μm and 3 parts by weight of zirconia having an average particle diameter of 1 μm.

Figure 12A:
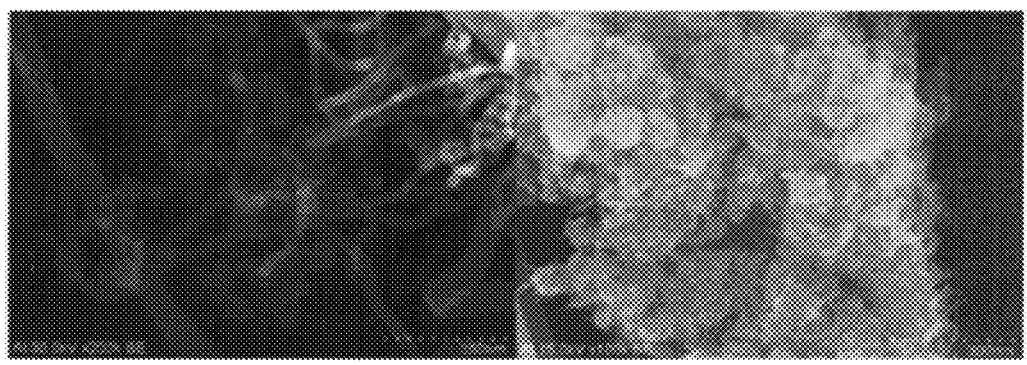
FIGS. 12A and 12B are each an image as a result of observation with an electron microscope in Example TP6.
Figure 12A:
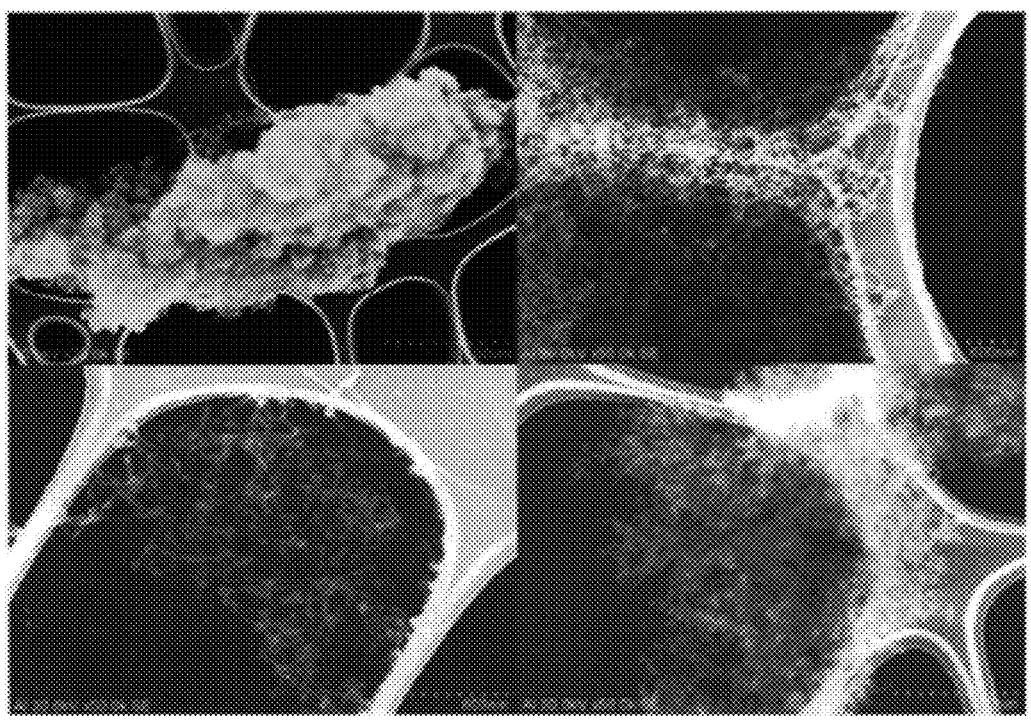
Figure 12B:
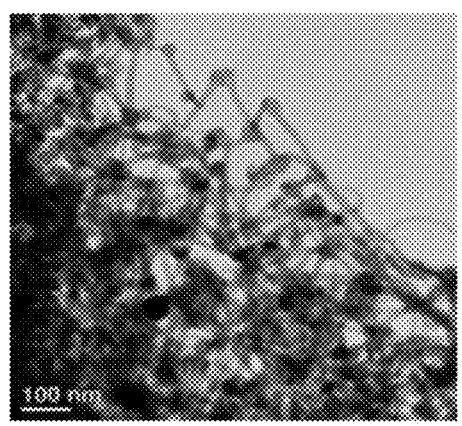
Figure 12B:
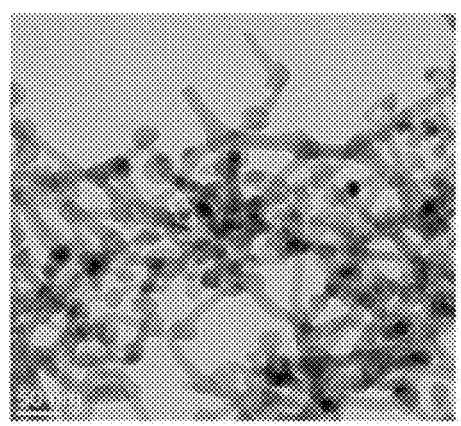
Figure 12B:
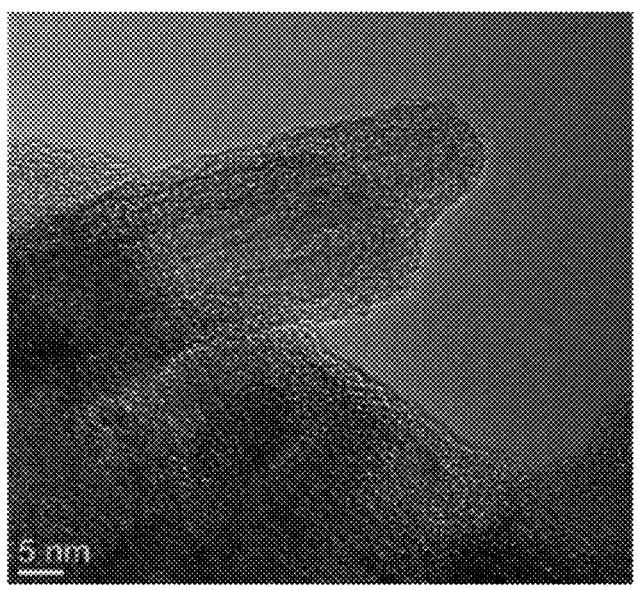

FIG. 12A shows a secondary electron image of the resultant powder with an SEM, and FIG. 12B shows the bright field image and high-resolution image of the powder with a TEM at its upper stage and lower stage, respectively. Fibrous substances each connecting a silicon crystal particle and another silicon crystal particle were observed. From analysis with the energy dispersive X-ray spectrometer (EDX) of the TEM, it was inferred that most of the fibrous substances in the resultant powder were each formed of amorphous silicon oxide $SiO_2$, but lattice fringes of silicon were observed as shown in the lower stage of FIG. 12B, and at some sites, a core portion was formed of a silicon crystal and a shell portion outside the core portion was formed of an amorphous silicon oxide. Probably, fibrous silicon was initially produced, and then fibrous silicon having a large surface area was oxidized by slow oxidation to form amorphous silicon oxide in consideration of: an estimate that the amount of oxygen atoms in 5 parts by weight of introduced alumina could not result in the production of such amount of silicon oxide as described above; and the high-resolution image with the TEM at the lower stage of FIG. 12B.

In the SEM image and TEM image of FIGS. 12A and 12B, an amorphous phase having a thickness of several nanometers was observed on the surface of crystalline silicon having a diameter of 20 nm to 50 nm. In addition, the amorphous fibrous substances each had a diameter of 10 nm to 70 nm and a length of 100 nm to 2 μm.

Example TP7

A powder was obtained by the same operations as in Example TP1 described above except that a powder raw material obtained by mixing 90 parts by weight of a silicon powder having an average particle diameter of 4 μm and 10 parts by weight of metal aluminum having an average particle diameter of 1 μm was used instead of the powder raw material obtained by mixing 97 parts by weight of a silicon powder having an average particle diameter of 4 μm and 3 parts by weight of zirconia having an average particle diameter of 1 μm.

Figure 13:
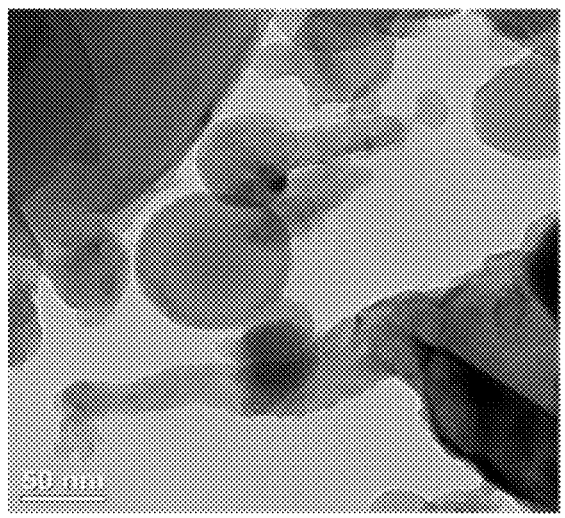
FIG. 13 is an image as a result of observation with an electron microscope in Example TP7.
Figure 13:
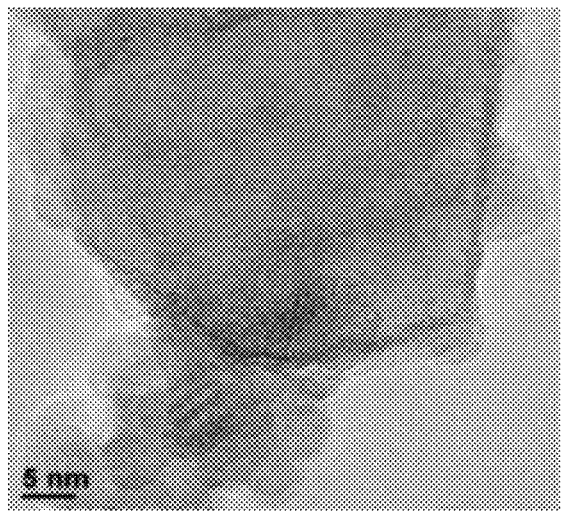

FIG. 13 shows the bright field image and high-resolution mage of the resultant powder with a TEM at its upper stage and lower stage, respectively. Although fibrous portions were partly observed with the TEM, most of the observed products were particles each obtained by providing an amorphous phase having a thickness of 1 nm to 10 nm on the surface of crystalline silicon having a diameter of 20 nm to 200 nm. In addition, analysis with the EDX of the TEM showed that aluminum oxide was formed on the surface of each of the particles.

Example TP8

Nanoparticles were obtained by the same operations as in Example TP1 described above except that a powder raw material obtained by mixing 95 parts by weight of silicon dioxide (Quartz) powder having an average particle diameter of 4 μm and 5 parts by weight of metal aluminum having an average particle diameter of 1 μm was used instead of the powder raw material obtained by mixing 97 parts by weight of a silicon powder having an average particle diameter of 4 μm and 3 parts by weight of zirconia having an average particle diameter of 1 μm.

A peak in the X-ray diffraction chart of the resultant powder showed that Si crystals were produced.

Comparative Example TP1

Particles were obtained by the same operations as in Example TP1 described above except that a powder raw material obtained by mixing 90 parts by weight of a silicon powder having an average particle diameter of 4 μm and 10 parts by weight of titanium dioxide having an average particle diameter of 1 μm was used instead of the powder raw material obtained by mixing 97 parts by weight of a silicon powder having an average particle diameter of 4 μm and 3 parts by weight of zirconia having an average particle diameter of 1 μm.

A peak in the X-ray diffraction chart of the resultant powder showed that $SiO_2$ was produced, though Si remained. $SiO_2$ was considered to be produced by a reaction between atomic oxygen produced by the decomposition reaction of $TiO_2$ in high-temperature plasma and part of Si atoms probably because Gibbs free energy in the oxidation reaction of Si was close to that in the oxidation reaction of Ti.

It should be noted that although silicon and alumina were used as raw materials in Example TP6 described above, and silicon and aluminum were used as raw materials in Example TP7 described above, silane tetrachloride, silane trichloride, silane dichloride, silane monochloride, silane or disilane can be used instead of silicon as one raw material, and aluminum chloride can be used instead of alumina or aluminum as another raw material.

Although silicon is used as a raw material in each of Examples TP1 to TP8 described above, tin nanoparticles can be prepared by using metal tin instead of silicon as a raw material. Of course, a tin compound can be used instead of metal tin.

B. Preparation by Heat Treatment

In addition, a specific method of obtaining silicon or tin nanoparticles by heating a silicon compound (a silicon elementary substance is also included in the category of the "silicon compound") or a tin compound (a tin elementary substance is also included in the category of the "tin compound"), and a metal compound containing a metal elementary substance other than silicon and tin is as described below; provided that Gibbs free energy at the time of the production of the oxide of the metal is smaller than Gibbs free energy when silicon or tin is oxidized, and the metal oxide has higher thermodynamic stability than silicon oxide or tin oxide.

One specific example is as follows: a fine powder of an alloy formed of at least silicon or tin and the metal is subjected to heat treatment under an inert gas or hydrogen gas atmosphere at a temperature equal to or higher than the melting point of the metal and lower than the melting point of silicon (1,412° C.). Since tin has a melting point as low as 232° C., a carbon powder of graphite or the like is mixed into the powder before the above heat treatment is performed in order that tin may be dispersed.

Example MAT1

100 parts by weight of a silicon powder having an average particle diameter of 0.2 μm obtained by pulverizing metal silicon with a bead mill and 15 parts by weight of an aluminum powder having an average particle diameter of 3 μm were subjected to mechanical alloying treatment in a planetary ball mill apparatus using a ball made of zirconia and a pot made of zirconia at 800 rpm for 90 minutes, whereby a silicon-aluminum powder was obtained. Next, the resultant powder was subjected to heat treatment in a high-temperature reactor, which had been evacuated to a vacuum, in a stream of an argon gas at atmospheric pressure (0.1 MPa) and 900° C. for 1 hour, whereby a silicon-aluminum heat-treated powder was obtained. The surfaces of the silicon powder as a raw material turned into fine particles by pulverization with the bead mill are oxidized so that a silicon oxide layer is formed on the surface, but are reduced by aluminum.

Figure 14:
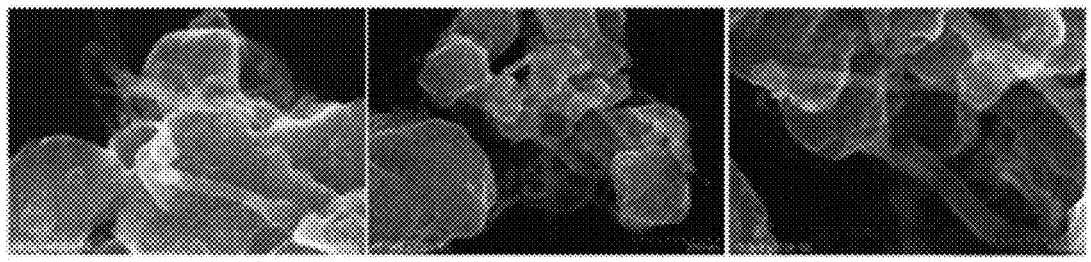
FIG. 14 is an image as a result of observation with an electron microscope in Example MAT1.
Figure 14:
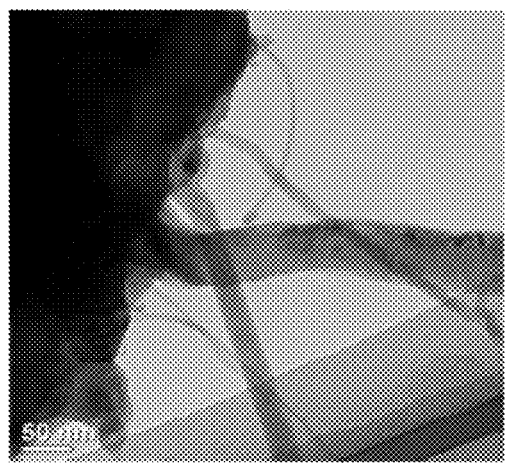
Figure 14:
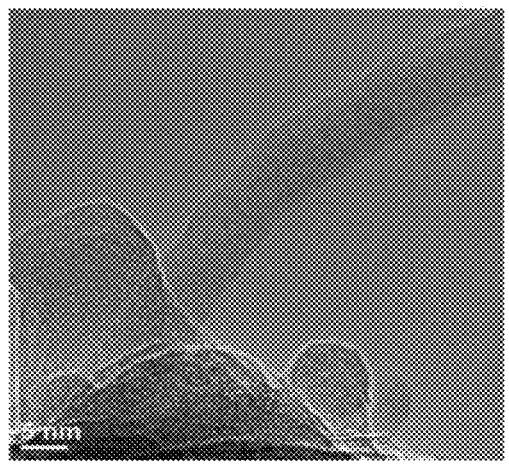

FIG. 14 shows a secondary electron image of the resultant powder with an SEM at its upper stage, and shows the bright field image and high-resolution image of the powder with a TEM at its middle stage and lower stage, respectively. Fibrous substances each connecting a silicon crystal particle and another silicon crystal particle were observed. Fibrous substances each connecting a silicon nanoparticle and another silicon nanoparticle were observed. Analysis with the EDX of the TEM showed that each of the above fibrous substances was a crystal mainly formed of the following elements: Al, N, and O. In addition, in X-ray photoelectron spectroscopy (XPS), alumina and silicon oxide were detected at the surface layer of the resultant powder. In view of the foregoing, it is considered that fibrous (filamentous) aluminum oxynitride connecting a silicon crystal particle and another silicon crystal particle has grown by virtue of heat treatment using as a catalyst the aluminum element of the Si—Al alloy powder obtained by mechanical alloying treatment. In view of the decrease in the amount of silicon oxide, aluminum is considered to have reacted with the oxygen of silicon oxide. In addition, as for the nitrogen element, it is considered that nitrogen in the air was included to react with Al during the mechanical alloying.

Production Method Example MAT2

100 parts by weight of a silicon powder having an average particle diameter of 0.2 μm obtained by pulverizing metal silicon (having a purity of 99%) with a bead mill and 15 parts by weight of an aluminum powder having an average particle diameter of 3 μm are subjected to mechanical alloying treatment in a planetary ball mill apparatus using a ball made of zirconia and a pot made of zirconia at 800 rpm for 90 minutes, whereby a silicon-aluminum alloy powder is obtained. Next, the resultant powder is formed into pellets with a high-pressure press under reduced pressure. The pellets are inserted into a reaction chamber of a laser ablation apparatus, and the chamber is evacuated to a vacuum. The pellets are heated to 450° C. The atmosphere in the chamber is replaced with an argon gas, and the argon gas is flowed so that the pressure in the chamber is adjusted to 0.65 MPa. Next, the silicon-aluminum alloy pellets are irradiated with an excimer laser pulse, whereby a fine powder is obtained on the inner wall of the reaction chamber. Next, the argon gas is flowed so that the fine powder is slowly oxidized with impurity oxygen in the argon gas. After that, the fine powder is taken out.

The amount of silicon oxide to be produced can be made extremely small because aluminum reacts with oxygen more readily than silicon.

The above pellets as the target of laser ablation is produced by the mechanical alloying and the press molding; an ingot produced by mixing and melting silicon and metal aluminum as raw materials may be used. Although an example in which excimer laser light is used has been described here, $CO_2$ laser light or YAG laser light can also be used as long as laser light to be used has power sufficient for the evaporation of silicon.

Production Method Example MAT3

100 parts by weight of a silicon powder having an average particle diameter of 0.2 μm obtained by pulverizing metal silicon with a bead mill, 15 parts by weight of an aluminum powder having an average particle diameter of 3 μm, and 2 parts by weight of a silicon dioxide powder having an average particle diameter of 1 μm are subjected to mechanical alloying treatment in a planetary ball mill apparatus using a ball made of zirconia and a pot made of zirconia at 800 rpm for 90 minutes, whereby a silicon-aluminum-silicon dioxide composite powder is obtained. Next, the resultant powder is placed into the graphite mold of a spark plasma sintering apparatus and pressed, and the apparatus is evacuated to a vacuum. After that, the pressed powder is heated to 600° C. After that, a current pulse of 10 V and 200 A is applied across the graphite mold at intervals of microseconds so that spark plasma is generated across the powder to sinter the powder. The resultant sintered pellets are pulverized, whereby a silicon composite powder is obtained.

Another method example is as follows: a silicon compound and a compound of the metal, or a tin compound and a compound of the metal are subjected to a heat treatment at a temperature equal to or higher than the boiling point of the above compound and lower than the melting point of silicon (1,412° C.)

Specific examples of the preparation of a silicon powder are given below.

A silicon powder can be obtained also by the heat decomposition reaction of a silicon compound.

Production Method Example TC1

A silicon-aluminum composite fine powder can be obtained by the heat decomposition reaction of a mixture obtained by mixing 12 parts by weight of aluminum trichloride and 87 parts by weight of silane tetrachloride, the mixture being introduced in advance with a hydrogen gas as a carrier gas into a heat decomposition reactor in which an argon gas set at 900° C. is flowed. The fine powder is slowly oxidized, whereby a silicon-aluminum oxide composite fine powder is obtained.

Table 1 collectively shows the diameters of the primary particles of the powder materials obtained in the above Examples, determined from images as a result of observation with an electron microscope.

TABLE 1

Observation with electron microscope

| Example | Raw material | Diameter of spherical primary particle | Thickness of amorphous surface layer | Fibrous substance Diameter | Fibrous substance Length |
|---|---|---|---|---|---|
| TP1 | Si—3%$ZrO_2$ | 10-80 nm | 2-10 nm | — | — |
| TP2 | Si—5%$ZrO_2$ | 5-100 nm | 0.5-5 nm | — | — |
| TP3 | Si—3%$La_2O_3$ | 10-50 nm | 1-5 nm | — | — |
| TP4 | Si—3%CaO | 10-50 nm | 2-3 nm | — | — |
| TP5 | Si—3%MgO | 10-100 nm | 2-3 nm | — | — |
| TP6 | Si—5%$Al_2O_3$ | 20-50 nm | 2-3 nm | 10-70 nm | 100 nm-2 µm |
| TP7 | Si—10%Al | 20-200 nm | 1-10 nm | — | — |
| MAT1 | Pulverized Si—13%Al | 5-100 nm | 0.5-10 nm | 5-100 nm | 100-500 nm |

Further, each of the above composite powders can be evaluated for its crystallite size from the half width of a peak in a chart obtained by the X-ray diffractometry of the powder and Scherrer's equation described above.

FIGS. 16A to 16I show various X-ray diffraction charts of the powders obtained in Examples TP1 to TP7, Comparative Example TP1, and Example TP8 measured with a Cu tube. The axis of abscissa indicates 2θ (θ represents the Bragg angle of a diffraction beam), and the axis of ordinate indicates X-ray intensity. FIGS. 16A to 16G show that Si crystals are produced in each of Examples TP1 to TP7.

Figure 16A:
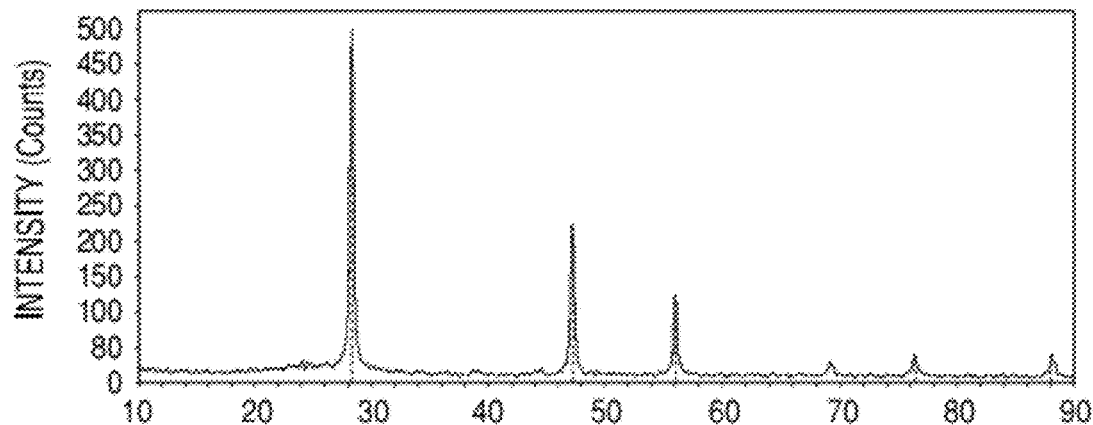
FIGS. 16A, 16B, 16C, 16D, 16E, 16F, 16G, 16H and 16I are various X-ray diffraction charts of Examples TP1 to TP7, Comparative Example TP1, and Example TP8.
Figure 16B:
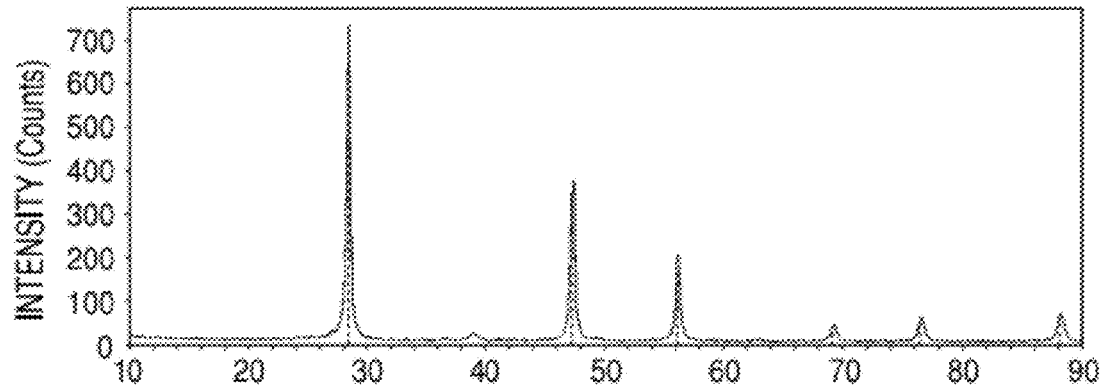
Figure 16C:
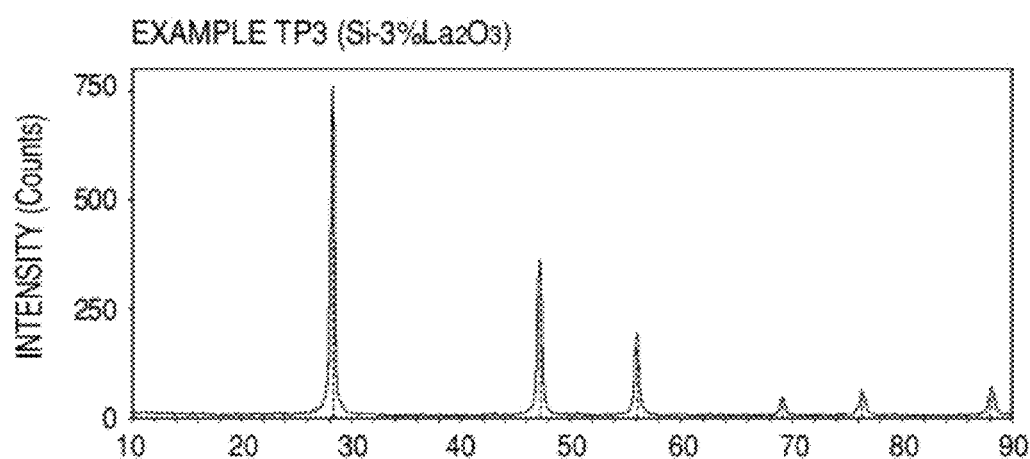
Figure 16D:
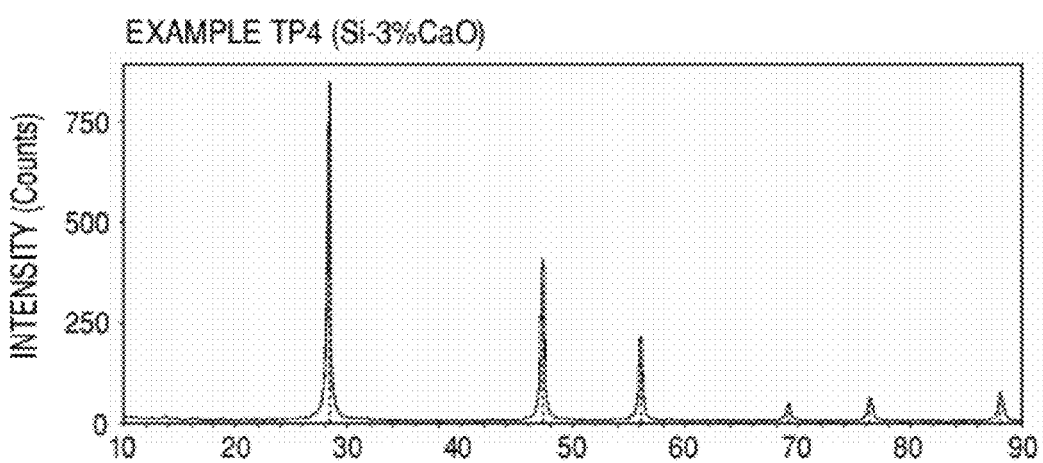
Figure 16E:
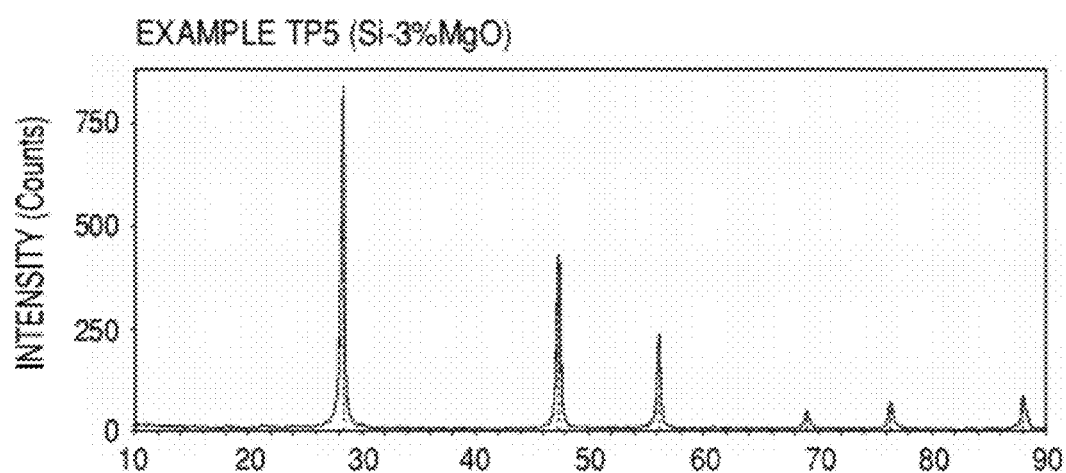
Figure 16F:
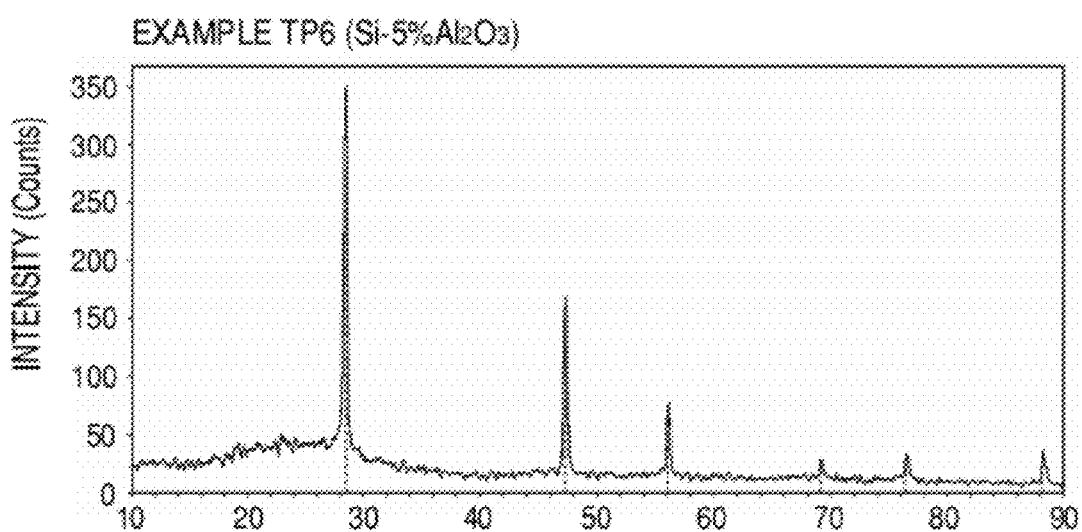
Figure 16G:
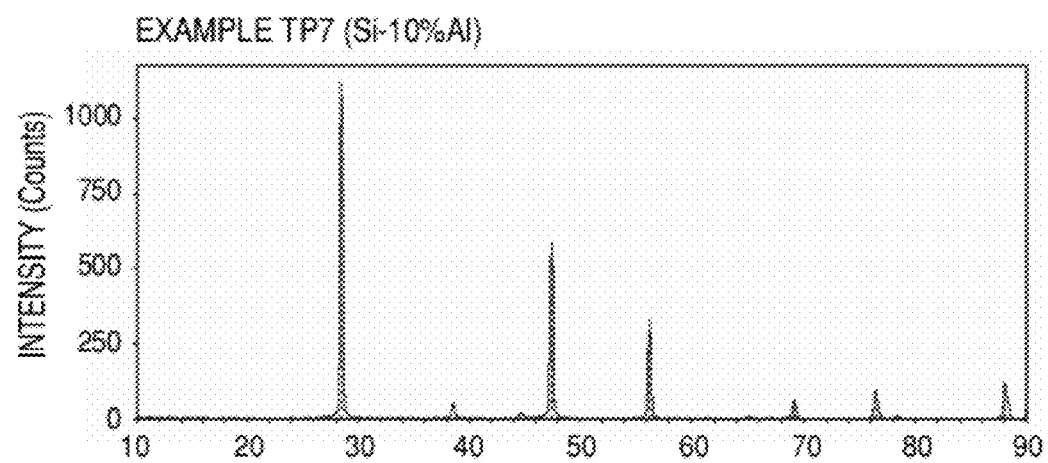
Figure 16H:
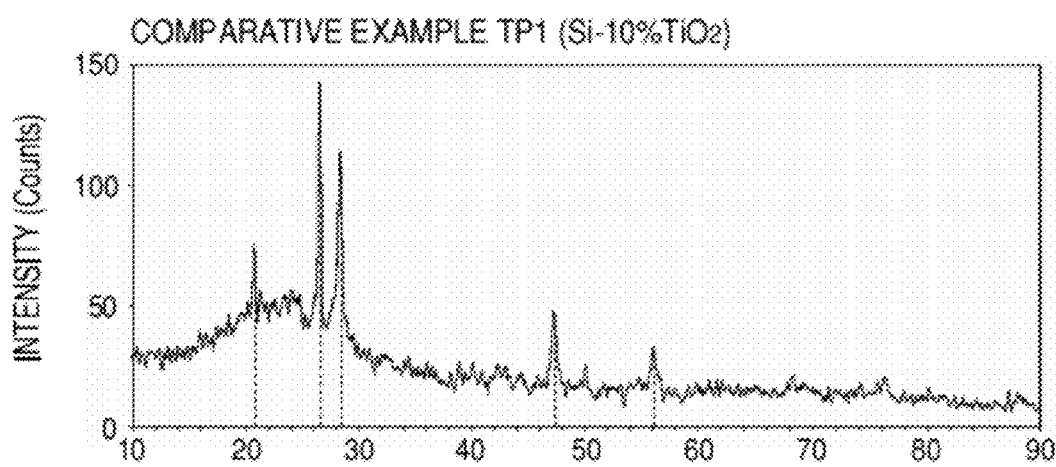
Figure 16I:
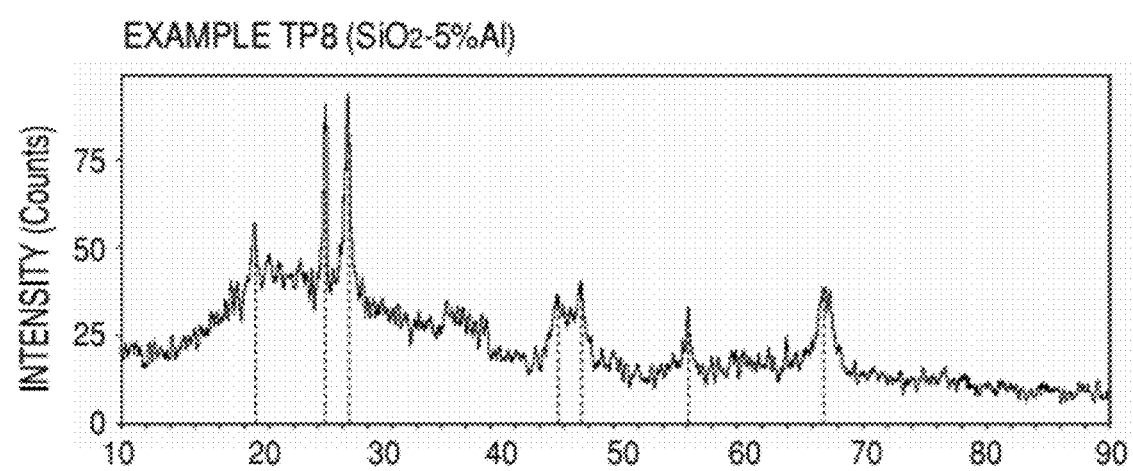

In the chart of the powder material obtained in Comparative Example TP1 shown in FIG. 16H, the peak of $SiO_2$ as well as the peak of Si was observed around 2θ=26.6°, so it was found that $SiO_2$ was also produced by a reaction between Si and $TiO_2$ in thermal plasma. The production of $SiO_2$ and the production of $TiO_2$ are considered to occur simultaneously because the Gibbs free energy of the production of $SiO_2$ and that of the production of $TiO_2$ in Ellingham plots are substantially equal to each other. In a reaction in thermal plasma caused by the addition of any other oxide stabler than $SiO_2$, almost no $SiO_2$ to be detected by X-ray diffractometry is produced. In the chart of the powder material obtained in Example TP8 shown in FIG. 16I, the peak of Si was observed around 2θ=28.4°, so it was found that Si was produced by a reaction between $SiO_2$ and Al in thermal plasma.

In addition, Table 2 collectively shows crystallite sizes each calculated from the half width of an Si(111) peak in the X-ray diffraction chart of each of the powder materials obtained in the above examples and Scherrer's equation.

TABLE 2

| Example | Raw material | Peak position 2θ(°) | Half width 2θ(°) | Half width (rad) | Crystallite size (nm) |
|---|---|---|---|---|---|
| TP1 | Si—3%$ZrO_2$ | 28.39 | 0.35 | 0.006108 | 24.5 |
| TP2 | Si—5%$ZrO_2$ | 28.43 | 0.34 | 0.005934 | 25.2 |
| TP3 | Si—3%$La_2O_3$ | 28.43 | 0.34 | 0.005934 | 25.2 |
| TP4 | Si—3%CaO | 28.44 | 0.31 | 0.00541 | 27.6 |
| TP5 | Si—3%MgO | 28.44 | 0.33 | 0.002729 | 25.9 |
| TP6 | Si—5%$Al_2O_3$ | 28.77 | 0.32 | 0.005585 | 26.8 |
| TP7 | Si—10%Al | 28.47 | 0.34 | 0.005931 | 25.2 |
| MAT1 | Pulverized Si—13%Al | 28.47 | 0.19 | 0.003299 | 54.2 |

Further, Table 3 collectively shows the results of the analysis of the powder materials obtained in the above Examples with the EDX of an STEM.

TABLE 3

Analysis with EDX of STEM

| Example | Raw material | Wt % Si | Wt % O | Wt % Metal element | Atomic % Si | Atomic % O | Atomic % Metal element | Molar ratio O/Si |
|---|---|---|---|---|---|---|---|---|
| TP1 | Si—3%$ZrO_2$ | 72.23 | 26.6 | 1.16 | 60.55 | 39.14 | 0.3 | 0.64 |
| TP2 | Si—5%$ZrO_2$ | 85.26 | 11.67 | 3.06 | 79.91 | 19.2 | 0.88 | 0.24 |
| TP3 | Si—3%$La_2O_3$ | 88.05 | 10.41 | 1.52 | 82.56 | 17.14 | 0.28 | 0.20 |
| TP4 | Si—3%CaO | 82.06 | 16.12 | 1.80 | 73.50 | 25.36 | 1.13 | 0.34 |
| TP5 | Si—3%MgO | 81.2 | 18.06 | 0.73 | 71.37 | 27.87 | 0.74 | 0.39 |
| TP6 | Si—5%$Al_2O3$ | 68.22 | 29.67 | 2.09 | 55.69 | 42.52 | 1.78 | 0.76 |
| TP7 | Si—10%Al | 77.61 | 4.18 | 18.20 | 74.70 | 7.06 | 18.23 | 0.09 |
| MAT1 | Pulverized Si—13%Al | 51.93 | 9.66 | 28.81 | 43.96 | 14.36 | 25.39 | 0.32 |

In addition, Table 4 collectively shows $SiO_x$/Si ratios based on Si2p peaks in the XPS of the powder materials obtained in the above Examples. It should be noted that each $SiO_x$/Si ratio was calculated on the assumption that an Si2p peak was formed of two peaks, i.e., the peak of metal Si and the peak of $SiO_x$, and $SiO_x$ and metal Si were uniformly distributed.

TABLE 4

$SiO_x$/Si ratio based on Si2p peak in XPS

| Example | Raw material | $SiO_x$/Si |
|---|---|---|
| TP1 | Si—3%$ZrO_2$ | 1.39 |
| TP2 | Si—5%$ZrO_2$ | 0.37 |

TABLE 4-continued

SiO$_x$/Si ratio based on Si2p peak in XPS

| Example | Raw material | SiO$_x$/Si |
|---|---|---|
| TP3 | Si—3%La$_2$O$_3$ | 0.42 |
| TP4 | Si—3%CaO | 0.64 |
| TP5 | Si—3%MgO | 0.51 |
| TP6 | Si—5%Al$_2$O$_3$ | 7.14 |
| TP7 | Si—10%Al | 0.28 |
| MAT1 | Pulverized Si—13% Al (900° C.) | 1.16 |

Figure 17:
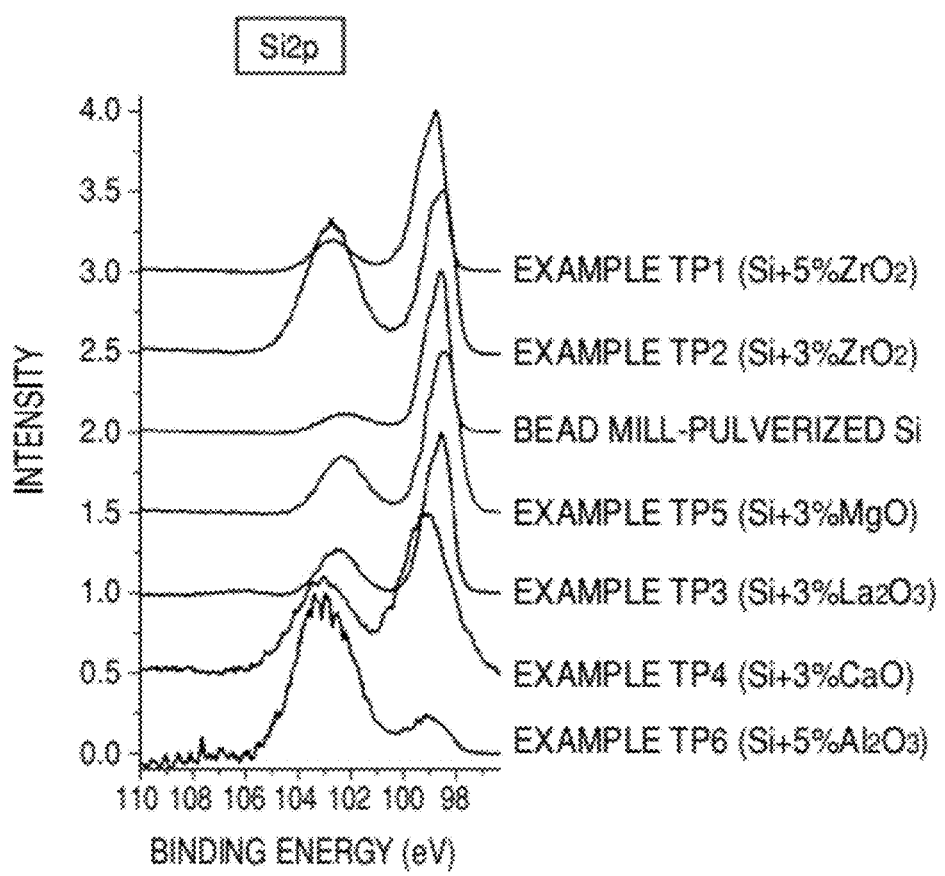
FIG. 17 shows Si2p spectra according to XPS.

Further, FIG. 17 shows Si2p peaks in the XPS of the material powders obtained in Examples TP1 to TP6 and powder silicon obtained by pulverizing metal silicon with a bead mill. A peak at lower binding energy is considered to be the peak of Si, and a peak at higher binding energy is considered to be the peak of silicon oxide SiO$_x$ mainly formed of SiO$_2$. The results of the XPS are considered to reflect information about the surfaces of the measurement samples.

Comparison between the results of the X-ray photoelectron spectroscopy (XPS) of Examples TP1 and TP2 (see FIG. 17 and Table 4) showed that the amount of silicon oxide in Example TP2 was small, and that an increase in the amount of zirconia ZrO$_2$ as a raw material could suppress the oxidation of silicon. Since zirconia ZrO$_2$ as a raw material is decomposed into atoms or ions in thermal plasma, the above increase is a de facto increase in the amount of Zr.

In addition, an SiO$_x$/Si ratio in any other measurement sample obtained under the production conditions in Example TP7 was as low as 0.06.

[Production of Electrode Structure for Negative Electrode of Energy Storage Device]

Example EA1 to EA7

100 parts by weight of each of the composite powders prepared in Examples TP1 to TP4, Example TP6, Example TP7, and Example MAT1, 70 parts by weight of artificial graphite having an average particle diameter of 5 μm, and 3 parts by weight of acetylene black are mixed by means of a planetary ball mill apparatus using a ball made of agate at 300 rpm for 20 minutes. Next, 132 parts by weight of a solution of N-methyl-2-pyrrolidone containing 15 wt % of polyamideimide and 130 parts by weight of N-methyl-2-pyrrolidone are added to the resultant mixture, and the whole is mixed by means of the planetary ball mill apparatus at 300 rpm for 10 minutes, whereby slurry for the formation of an electrode active material layer is prepared. The resultant slurry is applied onto copper foil having a thickness of 10 μm with an applicator, and is then dried at 110° C. for 0.5 hour. Further, the resultant is dried under reduced pressure at 200° C., and its thickness and density are adjusted with a roll press, whereby an electrode structure in which an electrode active material layer having a thickness in the range of 20 to 40 μm and density in the range of 0.9 to 1.9 g/cm$^3$ has been formed on a current collector made of the copper foil is obtained.

It should be noted that electrode structures each produced from any one of the respective composite powders prepared in Examples TP1 to TP4, Example TP6, Example TP7, and Example MAT1 by the above operations are defined as the electrodes of Examples EA1 to EA7.

Comparative Example EA1

Figure 15:
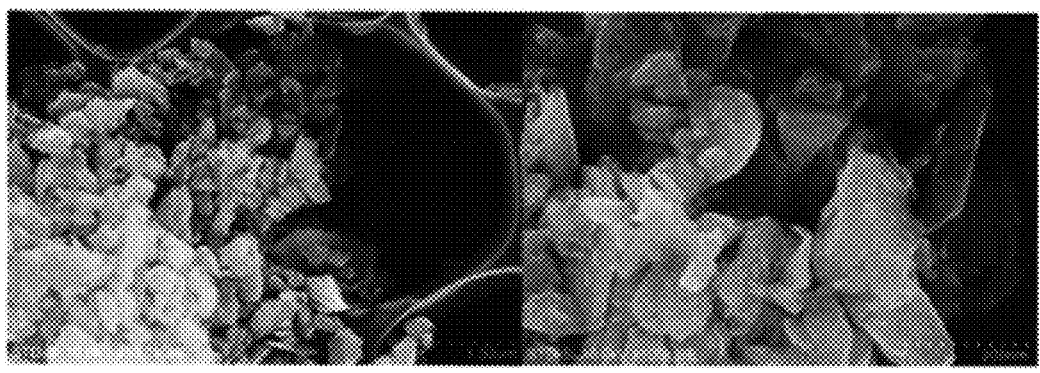
FIG. 15 is an image as a result of the observation of a bead mill-pulverized silicon powder used as an active material for the electrode of Comparative Example EA1 with a scanning electron microscope (SEM).

100 parts by weight of a silicon powder obtained by pulverizing metal silicon with a bead mill in isopropyl alcohol and having an average particle diameter of 0.2 μm, 70 parts by weight of artificial graphite, and 3 parts by weight of acetylene black are mixed by means of a planetary ball mill apparatus using a ball made of agate at 300 rpm for 20 minutes. It should be noted that FIG. 15 is an image as a result of the observation of the bead mill-pulverized silicon powder with a scanning electron microscope (SEM). Next, 132 parts by weight of a solution of N-methyl-2-pyrrolidone containing 15 wt % of polyamideimide and 130 parts by weight of N-methyl-2-pyrrolidone are added to the resultant mixture, and the whole is mixed by mean of the planetary ball mill apparatus at 300 rpm for 10 minutes, whereby slurry for the formation of an electrode active material layer is prepared. The resultant slurry is applied onto copper foil having a thickness of 10 μm with an applicator, and is then dried at 110° C. for 0.5 hour. Further, the resultant is dried under reduced pressure at 200° C., and its thickness and density are adjusted with a roll press, whereby an electrode structure in which an electrode active material layer having a thickness of 20 μm and a density of 1.3 g/cm$^3$ has been formed on a current collector made of the copper foil is obtained.

It should be noted that the electrode active material layer can be formed on the copper foil by the following method as well: after the viscosity of the slurry obtained by the above procedure has been adjusted, a high voltage is applied between the copper foil as a current collector and a nozzle of an electrospinning apparatus.

[Evaluation of the Electrode Structure for the Negative Electrode of the Energy Storage Device for Amount of Lithium to be Electrochemically Inserted]

Each of the above electrode structures for the negative electrodes of the energy storage devices was evaluated for the amount of lithium to be electrochemically inserted by the following procedure.

Each of the above electrode structures of Examples EA1 to EA7 and Comparative Example EA1 is cut into a predetermined size, and a lead made of a nickel ribbon is connected to the above electrode structure by spot welding, whereby an electrode as a working electrode is produced. A cell is produced by combining the produced electrode and metal lithium as a counter electrode, and is evaluated for the amount of lithium to be electrochemically inserted.

The lithium electrode is produced by pressure-adhering metal lithium foil having a thickness of 140 μm to copper foil to which a lead made of a nickel ribbon connected by spot welding and whose one surface is roughened.

An evaluation cell is produced by the following procedure. That is, a polyethylene film of a micropore structure having a thickness of 17 μm and a porosity of 40% as a separator is sandwiched between an electrode produced from each of the above electrode structures and the above lithium electrode under a dry atmosphere having a dew point of −50° C. or lower. A set of the electrode (working electrode), the separator, and the lithium electrode (counter electrode) is inserted into a battery case obtained by forming an aluminum laminated film of a polyethylene/aluminum foil/nylon structure into a pocket shape. An electrolyte solution is dropped to the above battery case, and the laminated film at the opening portion of the battery case is thermally welded in a state in which the lead is taken out of the battery case, whereby the evaluation cell is produced. A solution obtained by dissolving lithium hexafluorophosphate (LiPF$_6$) in a solvent prepared by mixing ethylene carbonate from which moisture has been sufficiently removed and diethyl carbonate from which moisture has been sufficiently removed at a volume ratio of 3:7 so that the solution has a concentration of 1 mol/l (M), is used as the above electrolyte solution.

Evaluation for the amount of lithium to be electrochemically inserted is performed by: discharging the above cell thus produced with the lithium electrode of the cell as a negative electrode and each produced working electrode as a positive electrode until the voltage of the cell comes to be 0.01 V; and charging the cell until the voltage of the cell comes to be 1.80 V. That is, the quantity of discharged electricity is defined as an electrical quantity utilized for the insertion of lithium, and the quantity of charged electricity is defined as an electrical quantity utilized for the release of lithium.

[Evaluation for Insertion/Extraction of Li of Electrode]

The cell was charged and discharged 50 times at a current density of 0.48 mA/cm$^2$, and an electrode formed of any one of the various active materials was evaluated for insertion/extraction of Li on the basis of the amount of Li to be inserted (electrical quantity) for the first charging and discharging, the amount of Li to be extracted (electrical quantity) for the first charging and discharging, a ratio (%) of the amount of Li to be extracted to the amount of Li to be inserted for the first charging and discharging, a ratio of the amount of Li to be extracted (electrical quantity) for the tenth charging and discharging to the amount of Li to be released for the first charging and discharging, and a ratio of the amount of Li to be extracted (electrical quantity) for the fiftieth charging and discharging to the amount of Li to be extracted for the tenth charging and discharging.

Table 4 collectively shows the evaluation results.

TABLE 5

| | | Li insertion/extraction performance of electrode | | | | |
|---|---|---|---|---|---|---|
| Example | Raw material for preparation of electrode material | 1st Li insertion mAh/g | 1st Li extraction mAh/g | 1st Li extraction/ insertion % | Li extraction 10th/1st | Li extraction 50th/10th |
| Example EA1 | Si—3%ZrO$_2$ | 1,509 | 865 | 57.3 | 0.74 | 0.82 |
| Example EA2 | Si—5%ZrO$_2$ | 1,829 | 1,457 | 79.1 | 0.49 | 0.22 |
| Example EA3 | Si—3%La$_2$O$_3$ | 1,895 | 1,520 | 80.2 | 0.79 | 0.47 |
| Example EA4 | Si—3%CaO | 1,734 | 1,353 | 78.0 | 0.56 | 0.22 |
| Example EA5 | Si—5%Al$_2$O$_3$ | 1,331 | 673 | 50.6 | 0.83 | 0.98 |
| Example EA6 | Si—10%Al | 1,935 | 1,671 | 86.4 | 0.82 | — |
| Example EA7 | Pulverized Si—13% Al | 1,629 | 1,411 | 86.6 | — | — |
| Comparative Example EA1 | Bead mill-pulverized Si | 1,745 | 1,398 | 80.1 | 0.53 | — |

The results of the evaluation of the above electrode for electrochemical insertion/extraction of lithium, and the results previously shown in Tables 3 and 4 show that an electrode using a material having a small silicon oxide content as an active material shows a high ratio of the amount of lithium to be released to the amount of lithium to be inserted for the first charging and discharging. The foregoing suggests that the present invention allows the production of a material having a small silicon oxide content, and an energy storage device adopting an electrode formed of the material as its negative electrode shows improved initial charge and discharge coulombic efficiency. Therefore, according to the method of the present invention, silicon or tin fine particles in which a silicon oxide or tin oxide content is reduced can be obtained, and as a result, a material showing high lithium extraction/insertion efficiency can be obtained.

In addition, the electrode of Example EA5 produced from the material powder obtained in Example TP6 contains a large amount of silicon oxide owing to slow oxidation, and shows low initial lithium extraction/insertion efficiency. In this case, however, the amount of lithium to be extracted shows a small change, and is stable over a long time period (see "Li extraction 50th/10th" in Table 5), so silicon particles formed into a network structure with fibrous (filamentous) substances is considered to be effective in lengthening the lifetime of the electrode. Further, there is a possibility that silicon oxide content can be reduced, and hence initial lithium extraction/insertion efficiency can be improved by changing the production conditions of Example TP6 (such as an increase in the raw material ratio of Al$_2$O$_3$ or the addition of Al to the raw materials).

When making reference to Example EA6 as an example of the above electrode structure of the present invention, since the content of the active material produced in Example TP7 in the electrode material layer is 51.9 wt %, the amount of Li to be inserted for the first discharging in the active material and the amount of Li to be extracted for the first charging in the active material are 3,730 mAh/g and 3,221 mAh/g, respectively, which are about ten times as much as the amount of lithium to be inserted/extracted in graphite.

[Production of Electrode Structure for Positive Electrode of the Energy Storage Device]

An example of a method of preparing the electrode structure of the present invention to be used in the positive electrode active material of the energy storage device will be given below.

Example EC1

100 parts by weight of a lithium nickel cobalt manganate LiNi$_{1/3}$Co$_{1/3}$Mn$_{1/3}$O$_2$ powder and 4 parts by weight of acetylene black are mixed with a planetary ball mill apparatus using a ball made of agate at 300 rpm for 10 minutes. Further, 50 parts by weight of a solution of N-methyl-2-pyrrolidone containing 10 wt % of polyvinylidene fluoride and 50 parts by weight of N-methyl-2-pyrrolidone are added to the resultant mixture, and the whole is mixed with the planetary ball mill apparatus at 300 rpm for 10 minutes, whereby slurry for the formation of an electrode active material layer is prepared.

The resultant slurry was applied onto aluminum foil having a thickness of 14 μm with a coater, and was then dried at 110° C. for 1 hour. Further, the resultant was dried under reduced pressure at 150° C. Subsequently, the thickness of the resultant was adjusted with a roll press, whereby an electrode structure in which an electrode active material layer having a thickness of 82 μm and a density of 3.2 g/cm$^3$ had been formed on a current collector made of the aluminum foil was obtained.

The resultant electrode structure was cut into a predetermined size, and a lead made of an aluminum ribbon was connected to the above electrode structure by ultrasonic welding, whereby a LiNi$_{1/3}$Co$_{1/3}$Mn$_{1/3}$O$_2$ electrode was produced.

[Example of Procedure for Production of the Energy Storage Devices]

Assembling was carried out totally under a dry atmosphere in which moisture was controlled so that a dew point was −50° C. or lower.

Each of the electrode structures of Examples EA1 to EA7 and Comparative Example EA1 is cut into a predetermined size, and a lead made of a nickel ribbon is connected to the above electrode structure by spot welding, whereby a negative electrode is produced.

A separator was sandwiched between the negative electrode prepared by the above operations and the positive electrode of Example EC1, and the group of electrodes, i.e., the negative electrode, the separator, and the positive electrode was inserted into a cell case obtained by forming an aluminum laminated film of a polyethylene/aluminum foil/nylon structure into a pocket shape. An electrolyte solution was injected into the case, an electrode lead was taken out, and the resultant was heat-sealed, whereby a cell for evaluation with its positive electrode capacity limited was produced. The outside of the above aluminum laminated film is made of a nylon film, and the inside of the laminated film is made of a polyethylene film.

In addition, for example, a polyethylene microporous film having a thickness of 17 μm was used as the above separator.

An electrolyte solution prepared by, for example, the following procedure was used as the above electrolyte solution. First, a solvent was prepared by mixing ethylene carbonate from which moisture had been sufficiently removed and diethyl carbonate from which moisture had been sufficiently removed at a volume ratio of 3:7. Next, a lithium hexafluorophosphate (LiPF$_6$) was dissolved in the above solvent thus obtained so as to have a concentration of 1 mol/l (M), whereby the electrolyte solution was prepared.

[Charging and Discharging Test]

Each of the above energy storage devices was charged at a constant current density of 0.48 mA/cm$^2$ until its cell voltage reached 4.2 V. After that, the device was charged at a constant voltage of 4.2 V. After 10 minutes pause, the device was discharged at a constant current density of 0.48 mA/cm$^2$ until its cell voltage was lowered to 2.7 V. After that, the device was caused to pause for 10 minutes. Such charging and discharging was repeated twice, and then the device was repeatedly charged and discharged at a current density of 1.6 mA/cm$^2$.

Figure 18:
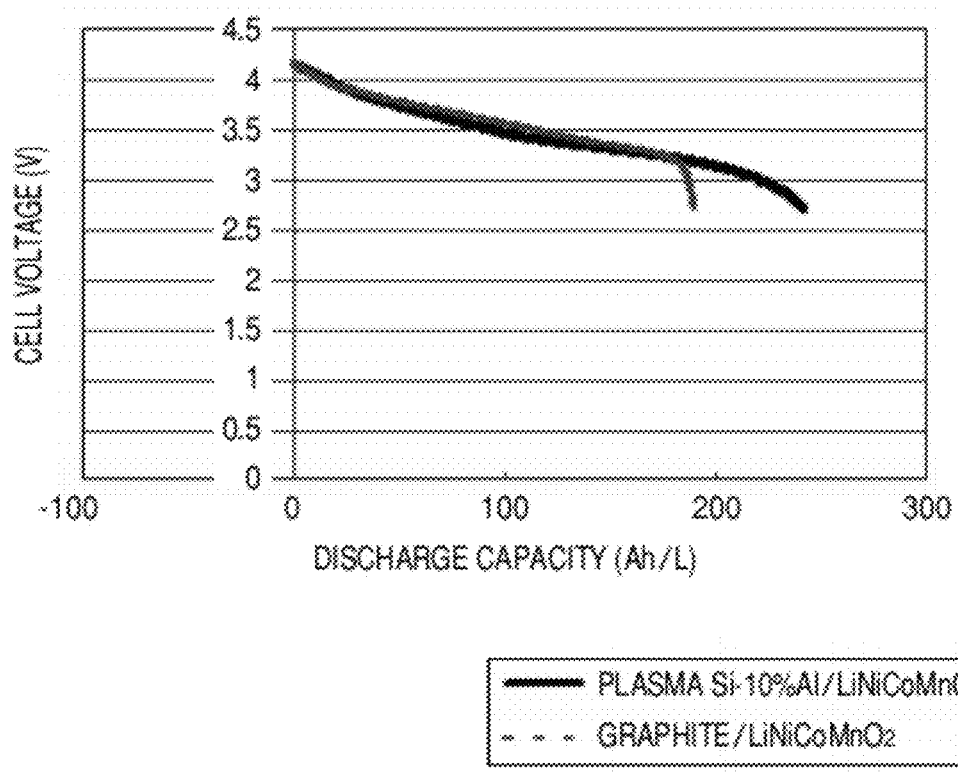
FIG. 18 shows a discharge curve of a cell of Example EA6 and a discharge curve of a cell obtained by combining a graphite electrode and a positive electrode.

FIG. 18 shows the discharge characteristics of a cell using the electrode of Example EA6 as a negative electrode and the electrode of Example EC1 as a positive electrode for the first charging and discharging.

[Method for Evaluation Test for Power Density and Energy Density]

Each of the above energy storage devices was charged at a constant current and a constant voltage. After that, the device was discharged at predetermined power until its cell voltage was lowered to a predetermined value, and the energy which had been discharged was measured. The device was charged at a constant current density of 1.6 mA/cm$^2$ until its cell voltage reached 4.2 V. After that, the device was further charged at a constant voltage of 4.2 V. After 5 minutes pause, the device was discharged at constant power until its cell voltage was lowered to 2.7 V, and then discharged energy was measured.

Each energy storage device was evaluated for its power-energy characteristics with the so-called Ragon plots as a view showing power density (W/kg) with respect to energy density (Wh/kg) or specific power (W/L) with respect to specific energy (Wh/L). The density was calculated by using the volume and weight of each of the negative electrode, the separator, and the positive electrode. The calculation was made on the assumption that the respective electrode material layers were formed on both sides of current collector foil.

Figure 19A:
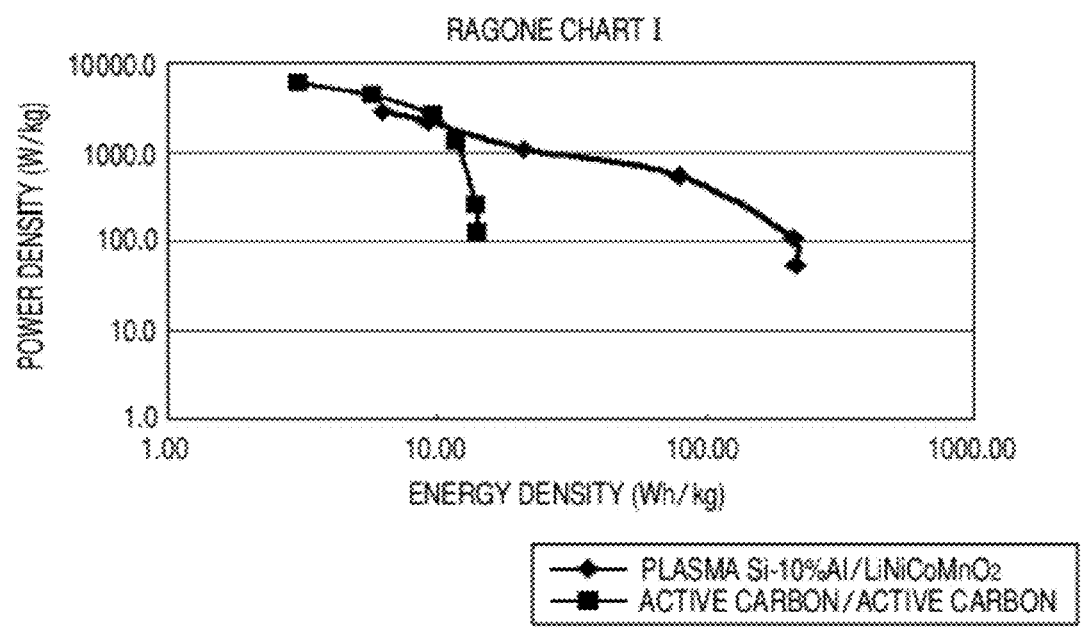
FIG. 19A shows a Ragone plot of a cell obtained by combining the electrode of Example EA6 and a positive electrode per weight and FIG. 19B shows a Ragone plot of the cell per volume.
Figure 19B:
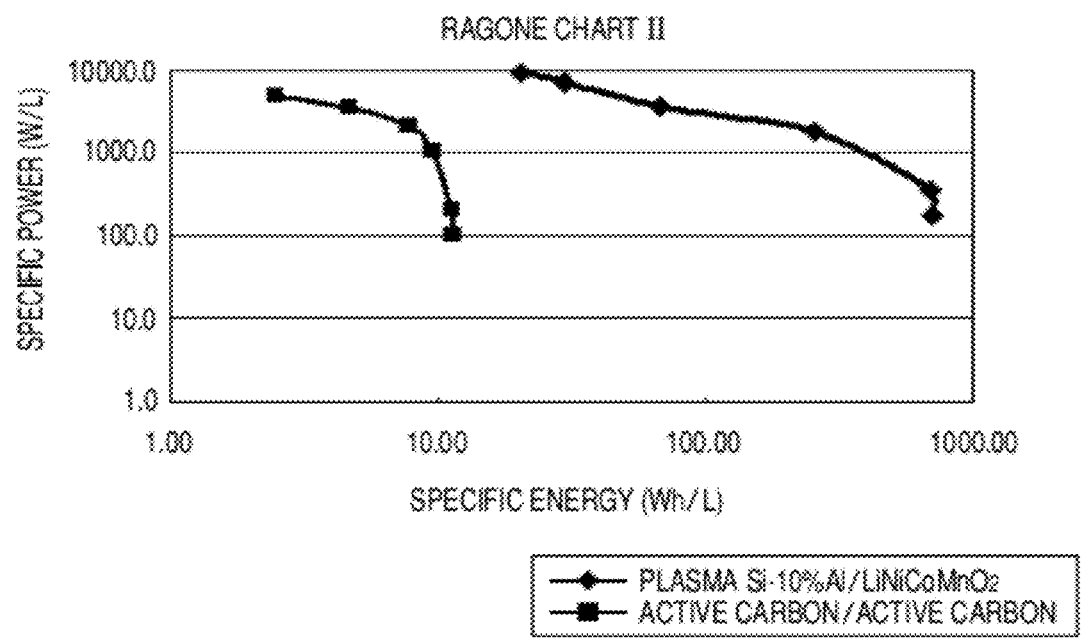

FIGS. 19A and 19B show the Ragone plots of a cell using the electrode of Example EA6 as a negative electrode and the electrode of Example EC1 as a positive electrode with reference to those of a capacitor using an active carbon electrode as each of its positive electrode and negative electrode.

FIG. 19A shows power density (W/kg) with respect to energy density (Wh/kg), and FIG. 19B shows specific power (W/L) with respect to specific energy (Wh/L).

FIG. 19A showed that the cell (energy storage device) of the present invention using the negative electrode of Example EA6 and the positive electrode of Example EC1 had power density comparable to that of the capacitor using an active carbon electrode as both electrodes. In addition, FIG. 19B showed that the energy storage device of the present invention using the negative electrode of Example EA6 and the positive electrode of Example EC1 had specific power higher than that of the capacitor using an active carbon electrode as both electrodes. Although not shown here, it was found that the cell of the present invention using the negative electrode of Example EA6 and the positive electrode of Example EC1 had power density and energy density higher than those of a cell using a graphite electrode as a negative electrode and the electrode of Example EC1 as a positive electrode.

A secondary battery and a capacitor using the above graphite negative electrode can be produced by the following procedure.

(Secondary Battery Using Graphite Negative Electrode and LiNi$_{1/3}$Co$_{1/3}$Mn$_{1/3}$O$_2$ Positive Electrode)

Production of Graphite Electrode 1 part by weight of carboxymethylcellulose and 1.5 parts by weight of a styrene-butadiene rubber (in the form of a water dispersion of the styrene-butadiene rubber) are added to 100 parts by weight of an artificial graphite powder having an average particle diameter of 20 μm, and the whole is mixed with a planetary ball mill apparatus at 300 rpm for 10 minutes, whereby slurry for the formation of an electrode active material layer is prepared.

The resultant slurry is applied onto copper foil having a thickness of 10 μm with a coater, and is then dried at 110° C. for 1 hour. Further, the resultant is dried under reduced pressure at 150° C. Subsequently, the thickness of the resultant is adjusted with a roll press, whereby an electrode structure in which an electrode active material layer having a thickness of 62 μm and a density of 1.67 g/cm$^3$ has been formed on a current collector made of the copper foil is obtained.

The resultant electrode structure is cut into a predetermined size, and a lead made of a nickel ribbon is connected to the above electrode structure by spot welding, whereby an electrode as a negative electrode is obtained.

A cell (secondary battery) is assembled by using the electrode of Example EC1 as a positive electrode in the same manner as in "Example of procedure for production of the energy storage device" described above.

An electrolyte solution obtained by dissolving a lithium hexafluorophosphate (LiPF$_6$) in a solvent prepared by mixing ethylene carbonate and diethyl carbonate at a volume ratio of 3:7 so that the solution has a concentration of 1 mol/l (M) is used.

The above secondary battery is charged and discharged in the cell voltage range of 4.2 V to 2.7 V, and is then evaluated.

(Capacitor)

Production of Active Carbon Electrode 1.7 parts by weight of carboxymethylcellulose and 2.7 parts by weight of a styrene-butadiene rubber (in the form of a water dispersion of the styrene-butadiene rubber) are added to 100 parts by weight of active carbon having a specific surface area of 2,500 m$^2$/g as measured by a BET method, and the whole is mixed with a planetary ball mill apparatus at 300 rpm for 10 minutes, whereby slurry for the formation of an electrode active material layer is prepared.

The resultant slurry is applied onto aluminum foil having a thickness of 28 µm with a coater, and is then dried at 110° C. for 1 hour. Further, the resultant is dried under reduced pressure at 150° C. Subsequently, the thickness of the resultant is adjusted with a roll press, whereby an electrode structure in which an electrode active material layer having a thickness of 95 µm and a density of 0.53 g/cm$^3$ has been formed on a current collector made of the aluminum foil is obtained.

The resultant electrode structure is cut into a predetermined size, and a lead made of an aluminum ribbon is connected to the above electrode structure by ultrasonic welding, whereby an active carbon electrode is produced.

A cell (capacitor) is assembled by using the above active carbon electrode as its positive electrode and negative electrode in the same manner as in "Example of procedure for production of the energy storage device" described above.

An electrolyte solution is used which is obtained by dissolving a tetraethylammonium tetrafluoroborate ($(C_2H_5)_4NBF_4$) in propylene carbonate from which moisture has been removed so that the solution has a concentration of 1 mol/l (M).

The above capacitor is charged and discharged in the cell voltage range of 2.7 V to 1.3 V, and is then evaluated.

(Energy Storage Device 1 of Another Structure)

A material layer capable of electrochemically storing and releasing lithium ions is formed by the above-mentioned production method (F) of the present invention.

First, a tungsten layer having a thickness of 100 nm is formed as a collecting electrode on a silicon wafer substrate by electron-beam deposition.

Next, an aluminum layer having a thickness of 50 nm, a silicon layer having a thickness of 50 nm, an aluminum oxide layer having a thickness of 50 nm, a silicon layer having a thickness of 50 nm, and an aluminum layer having a thickness of 50 nm are sequentially formed on the above tungsten layer with a sputtering apparatus.

After that, the resultant is subjected to treatment in a heat treatment furnace under an argon gas at 1,000° C. for 2 hours, whereby a negative electrode material layer is formed.

Subsequently, $Li_{3.25}Ge_{0.25}P_{0.75}S_4$ is formed into a layer having a thickness of 50 nm by sputtering. $LiCoO_2$ is deposited onto the layer by laser ablation to form a positive electrode material layer having a thickness of 300 nm. Then, an aluminum layer having a smaller area than that of the negative electrode current collector layer and a thickness of 100 nm is formed as a positive electrode current collector by using a positive mask by electron-beam deposition.

Further, the resultant is subjected to heat treatment in a vacuum at 200° C., whereby an all-solid energy storage device is produced.

Although a silicon wafer has been used as a substrate material in the above operations, an insulating substrate such as a quartz substrate can also be used. Although an electron beam has been used as means for vapor deposition, means such as sputtering can also be adopted.

As can be inferred from the evaluation of the device produced by the above operations, an electrode formed of the particles of a composite material capable of electrochemically storing and releasing lithium ions produced by the production method of the present invention shows high lithium insertion/extraction efficiency, and an energy storage device obtained by combining the electrode as a negative electrode and a positive electrode formed of a transition metal compound such as a transition metal lithium oxide has larger energy density and larger power density than a conventional energy storage device.

In addition, an energy storage device having desired power and desired energy can be designed by appropriately turning the negative electrode of the energy storage device of the present invention into a composite further with a material having a large specific surface area such as active carbon or a material having high conductivity such as graphite.

As described above, according to the present invention, an energy storage device can be provided having high power density and high energy density and being capable of being repeatedly used a large number of times.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2007-232090, filed Sep. 6, 2007, and No. 2007-321373, filed Dec. 12, 2007, which are hereby incorporated by reference herein in their entirety.

What is claimed is:

1. An electrode material for a negative electrode of an energy storage device capable of electrochemically storing and releasing lithium ions, the electrode material comprising silicon primary particles composed of crystal particles each having a diameter of 5 nm to 200 nm and an amorphous surface layer having a thickness of 1 nm to 10 nm, wherein the amorphous surface layer of each of the primary particles is formed of at least a metal oxide;

Gibbs free energy when the metal oxide is produced by oxidation of a metal is smaller than Gibbs free energy when silicon is oxidized; and the metal oxide has higher thermodynamic stability than silicon oxide, wherein the crystal particles of the silicon primary particles are formed into a network structure with fibrous (filamentous) substances, and a surface of each of the fibrous (filamentous) materials is coated with at least an oxide, and wherein the fibrous (filamentous) substances each have a core-shell structure, the core portion comprises a silicon crystal, and the shell portion comprises an amorphous silicon oxide or an amorphous metal oxide.

2. An electrode material for a negative electrode of an energy storage device capable of electrochemically storing and releasing lithium ions, the electrode material comprising silicon primary particles composed of crystal particles each having a diameter of 5 nm to 200 nm and an amorphous surface layer having a thickness of 1 nm to 10 nm, wherein the amorphous surface layer of each of the primary particles is formed of at least a metal oxide;

Gibbs free energy when the metal oxide is produced by oxidation of a metal is smaller than Gibbs free energy when silicon is oxidized; and the metal oxide has higher thermodynamic stability than silicon oxide, wherein the crystal particles of the silicon primary particles are formed into a network structure with fibrous (filamentous) substances, and a surface of each of the fibrous (filamentous) materials is coated with at least an oxide, and wherein the fibrous (filamentous) substances comprise amorphous silicon oxide.

3. An electrode material for a negative electrode of an energy storage device capable of electrochemically storing and releasing lithium ions, the electrode material comprising silicon primary particles composed of crystal particles each having a diameter of 5 nm to 200 nm and an amorphous surface layer having a thickness of 1 nm to 10 nm, wherein the amorphous surface layer of each of the primary particles is formed of at least a metal oxide;

Gibbs free energy when the metal oxide is produced by oxidation of a metal is smaller than Gibbs free energy when silicon is oxidized; and the metal oxide has higher thermodynamic stability than silicon oxide, wherein the crystal particles of the silicon primary particles are formed into a network structure with fibrous (filamentous) substances, and a surface of each of the fibrous (filamentous) materials is coated with at least an oxide, and wherein the fibrous (filamentous) substances comprise crystalline aluminum oxynitride.

* * * * *